(12) United States Patent
Hayashi et al.

(10) Patent No.: US 11,673,043 B2
(45) Date of Patent: Jun. 13, 2023

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventors: Yugo Hayashi, Kyoto (JP); Issei Takahashi, Kyoto (JP); Shigeto Murata, Tokyo (JP); Shinya Nakano, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/933,673

(22) Filed: Sep. 20, 2022

(65) Prior Publication Data

US 2023/0008755 A1 Jan. 12, 2023

Related U.S. Application Data

(63) Continuation of application No. 17/038,185, filed on Sep. 30, 2020, now Pat. No. 11,484,783, which is a
(Continued)

(30) Foreign Application Priority Data

May 2, 2018 (JP) .............................. JP2018-088782

(51) Int. Cl.
*A63F 13/2145* (2014.01)
*G06F 3/01* (2006.01)
(Continued)

(52) U.S. Cl.
CPC .......... *A63F 13/2145* (2014.09); *G06F 3/011* (2013.01); *G06F 3/0346* (2013.01)

(58) Field of Classification Search
CPC ..... A63F 13/2145; G06F 3/011; G06F 3/0346
See application file for complete search history.

(56) References Cited

U.S. PATENT DOCUMENTS 5,689,669 A * 11/1997 Lynch .................. G06F 3/0481
715/848
6,002,853 A * 12/1999 de Hond .............. G06F 16/954
709/219
(Continued)

FOREIGN PATENT DOCUMENTS

| CN | 104915134 | | 9/2015 |
| CN | 105511631 A | | 4/2016 |

(Continued)

OTHER PUBLICATIONS

International Search Report for PCT/JP2019/010823 dated Apr. 6, 2019, 4 pages.
(Continued)

*Primary Examiner* — Nicholas Augustine
(74) *Attorney, Agent, or Firm* — Nixon & Vanderhye PC

(57) ABSTRACT

A movement direction of a moving object moving in a virtual space is changed based on at least a component in a first axial direction of a coordinate change of a user's input continuously performed and indicating a coordinate input, with reference to a first reference coordinate point determined by the user's input. A game operation different from a movement of the moving object in the virtual space is determined based on at least a component of the user's input in a second axial direction different from the first axial direction, and is executed.

18 Claims, 23 Drawing Sheets

Related U.S. Application Data continuation of application No. PCT/JP2019/010823, filed on Mar. 15, 2019.

(51) Int. Cl.
*G06F 3/0346* (2013.01)
*A63F 13/214* (2014.01)

(56) References Cited

U.S. PATENT DOCUMENTS

| | | | | |
|---|---|---|---|---|
| 6,079,982 A * | 6/2000 | Meader | A63F 13/54 | 434/30 |
| 6,119,147 A * | 9/2000 | Toomey | H04L 12/1831 | 719/329 |
| 6,179,619 B1 * | 1/2001 | Tanaka | A63G 7/00 | 472/60 |
| 6,219,045 B1 * | 4/2001 | Leahy | H04L 67/131 | 709/204 |
| 6,243,091 B1 * | 6/2001 | Berstis | G06F 3/04815 | 715/205 |
| 6,271,843 B1 * | 8/2001 | Lection | G06T 15/00 | 715/848 |
| 6,362,817 B1 * | 3/2002 | Powers | G06T 17/00 | 345/428 |
| 6,396,522 B1 * | 5/2002 | Vu | G06F 3/04845 | 715/848 |
| 6,414,679 B1 * | 7/2002 | Miodonski | G06T 13/00 | 707/999.005 |
| 6,570,563 B1 * | 5/2003 | Honda | A63F 13/352 | 345/473 |
| 6,573,903 B2 * | 6/2003 | Gantt | G06F 30/00 | 345/619 |
| 6,590,593 B1 * | 7/2003 | Robertson | G06F 3/04815 | 715/848 |
| 6,621,508 B1 * | 9/2003 | Shiraishi | G06F 3/0481 | 715/764 |
| 6,690,393 B2 * | 2/2004 | Heron | G06T 19/00 | 715/848 |
| 6,784,901 B1 * | 8/2004 | Harvey | H04L 67/02 | 715/848 |
| 6,961,055 B2 * | 11/2005 | Doak | A63F 13/52 | 345/677 |
| 7,382,288 B1 * | 6/2008 | Wilson | G08G 5/0021 | 340/972 |
| 7,414,629 B2 * | 8/2008 | Santodomingo | G06T 17/05 | 345/582 |
| 7,467,356 B2 * | 12/2008 | Gettman | G06Q 30/02 | 715/850 |
| 7,653,877 B2 * | 1/2010 | Matsuda | G06F 16/957 | 463/32 |
| 7,663,625 B2 * | 2/2010 | Chartier | G06T 19/20 | 700/182 |
| 7,746,343 B1 * | 6/2010 | Charaniya | G06T 17/05 | 345/428 |
| 7,788,323 B2 * | 8/2010 | Greenstein | G06Q 10/10 | 715/744 |
| 7,804,507 B2 * | 9/2010 | Yang | H04N 13/344 | 345/633 |
| 7,814,429 B2 * | 10/2010 | Buffet | G06F 30/00 | 715/763 |
| 7,817,150 B2 * | 10/2010 | Reichard | G06T 15/20 | 715/705 |
| 7,844,724 B2 * | 11/2010 | Van Wie | H04L 67/131 | 709/227 |
| 9,005,002 B2 | 4/2015 | Oochi et al. | | |
| 2001/0018667 A1 * | 8/2001 | Kim | G06Q 30/0277 | 705/14.73 |
| 2002/0095463 A1 * | 7/2002 | Matsuda | G06F 16/957 | 709/204 |
| 2002/0113820 A1 * | 8/2002 | Robinson | G06F 16/954 | 715/764 |
| 2004/0113887 A1 * | 6/2004 | Pair | G09B 25/08 | 345/156 |
| 2004/0193441 A1 * | 9/2004 | Altieri | A63F 13/216 | 709/203 |
| 2005/0054402 A1 | 3/2005 | Noguchi et al. | | |
| 2005/0093719 A1 * | 5/2005 | Okamoto | G01C 21/3697 | 705/14.62 |
| 2005/0128212 A1 * | 6/2005 | Edecker | G06T 17/05 | 345/581 |
| 2006/0128468 A1 * | 6/2006 | Yoshikawa | A63F 13/92 | 463/36 |
| 2008/0030429 A1 * | 2/2008 | Hailpern | G06T 7/73 | 345/8 |
| 2008/0125218 A1 * | 5/2008 | Collins | G06Q 90/00 | 463/31 |
| 2008/0235570 A1 * | 9/2008 | Sawada | G06Q 10/10 | 356/3 |
| 2008/0246693 A1 * | 10/2008 | Hailpern | G06T 7/246 | 345/8 |
| 2009/0076791 A1 * | 3/2009 | Rhoades | A63F 13/12 | 703/21 |
| 2009/0091583 A1 * | 4/2009 | McCoy | A63F 13/25 | 345/419 |
| 2010/0060604 A1 * | 3/2010 | Zwart | G06F 1/1626 | 345/173 |
| 2014/0004934 A1 | 1/2014 | Peterson et al. | | |
| 2014/0171039 A1 * | 6/2014 | Bjontegard | H04L 67/535 | 455/414.1 |
| 2014/0213332 A1 | 7/2014 | Otsuka et al. | | |
| 2015/0094127 A1 * | 4/2015 | Canose | G06F 3/04842 | 463/2 |
| 2015/0253952 A1 | 9/2015 | Shikata et al. | | |
| 2016/0171835 A1 | 6/2016 | Washington et al. | | |
| 2016/0242010 A1 * | 8/2016 | Parulski | H04W 4/30 | |
| 2017/0060286 A1 * | 3/2017 | Gasselin de Richebourg | A63F 13/2145 | |
| 2017/0205962 A1 | 7/2017 | Li et al. | | |
| 2021/0008445 A1 | 1/2021 | Hayashi et al. | | |

FOREIGN PATENT DOCUMENTS

| | | |
|---|---|---|
| CN | 107684720 A | 2/2018 |
| EP | 1 671 685 A2 | 6/2006 |
| EP | 2 918 440 | 9/2015 |
| EP | 3 196 736 A1 | 7/2017 |
| JP | 2005-34277 A | 2/2005 |
| JP | 2005-349174 | 12/2005 |
| JP | 2007-185479 A | 7/2007 |
| JP | 2013-165877 | 8/2013 |
| JP | 2014-61021 A | 4/2014 |
| JP | 2014-144239 | 8/2014 |
| JP | 2015-123244 | 7/2015 |
| JP | 2015-170282 | 9/2015 |
| JP | 2016-51266 | 4/2016 |
| JP | 2016-218774 | 12/2016 |
| JP | 2017-35215 | 2/2017 |
| JP | 2017-148481 | 8/2017 |
| JP | 6205474 | 8/2017 |
| JP | 2018-15541 | 2/2018 |
| JP | 2018-506086 | 3/2018 |
| KR | 10-2017-0132264 | 12/2017 |
| WO | 2012/133254 A2 | 10/2012 |
| WO | 2013/191043 A1 | 12/2013 |
| WO | 2017/124773 | 7/2017 |

OTHER PUBLICATIONS

U.S. Appl. No. 16/394,176 to Yabuki, et al., filed Apr. 25, 2019.
U.S. Appl. No. 16/394,319 to Hayashi, et al., filed Apr. 25, 2019.
"Super Mario 64 DS Instruction Booklet", Nintendo Co., Ltd., Mar. 11, 2005 (37 pages).
Trista/Mokudai, Masanori, Play Report on "Spider-Man Unlimited", Running Action Game for Smartphones. Many "Spideys" Gather from a Parallel Universe! 4Gamer, [online] Sep. 9, 2014 [retrieved: May 15, 2019]. Internet: <URL: https://www.4gamer.net/games/269/G026933/20140909023/> (7 pgs.).

(56) References Cited

OTHER PUBLICATIONS

"Spider-Man Unlimited", A New-Style Running Game Where Players Sprint through Space with Spider Action! FamitsuApp., [online] Aug. 13, 2014 [retrieved: May 22, 2019]. Internet: <URL:https://app.famitsu.com/20140813_423889/> (3 pgs.).

Mario Kart DS, first Edition, Mainichi Communications Inc., Mar. 10, 2006, pp. 2, 9-10, 12 (7 pgs.).

"Karts-Mario Kart 7 for Nintendo 3DS", [online], Nintendo of America Inc., searched on Mar. 8, 2018, internet, (URL: http://mariokart7.nintendo.com/karts/), printed Sep. 30, 2020, 5 pages.

"Mario Kart 8 Deluxe for Nintendo Switch Official Site", [online], Nintendo of America Inc., searched on Mar. 8, 2018, internet, (URL: https://mariokart8.nintendo.com/?section=items&), printed Sep. 30, 2020, 14 pages.

Item/Consumables, PSO2 Strategies Summary Wiki [online], Jul. 12, 2016, [searched on Nov. 26, 2020], 17 pages. http://pso2.net/%E3%82%A2%E3%82%A4%E3%83%86%E3%83%A0/%E6%B6%88%E8%80%97%E5%93%81>.

Tank member UC (3/4) which completely won WoT by the premium account, ASCII.jp [online], Jan. 17, 2014, [searched on Nov. 26, 2020], 6 pages. https://ascii.jp/elem/000/000/857/857014/3/>.

Notice of Reasons for Refusal dated Dec. 3, 2020 for Japanese Patent Application No. 2018-088784 with English machine translation, 13 pages.

Let's Master the Copy Palette!, [Nintendo Official Guidebook] Hoshino Kirby Visit! Droche Dan, Shogakukan Co., Ltd., Jan. 10, 2007, 6 pages.

Notice of Reasons for Refusal dated Dec. 7, 2020 in Japanese Patent Application No. 2018-088783 with English machine translation, 8 pages.

Blur: A Comprehensive Guide to Gameplay by Grant Johnson at al., uploaded to (https://luisvillarreal.weebly.com/uploads/4/3/0/3/43036481/blur_manual.pdf), released May 25, 2010, 38 pages.

Blur gameplay HD published to YouTube at (https://www.youtube.com/watch?v=G2sv2SqTyJ4) on May 28, 2010, 1 page.

Mario Kart 8 Item Distribution System Analysis-Racing Tips published to YouTube at (https://www.youtube.com/watch?v=7ZgInbKFD90) on Jan. 25, 2017, 1 page.

Tyler Miller, "Subway Surfers Game Review", XP No. 55868989, retrieved from the Internet on Dec. 3, 2021, <URL:https://www.youtube.com/watch?v=WXnWTK1JmWY>, two pages, online publication date Jan. 29, 2013.

Wikipedia, "Subway Surfers", retrieved from the Internet on Dec. 3, 2021, <URL:https://en.wikipedia.org/w/index.php?title=Subway_Surfers&oldid=838767716>, seven pages, Apr. 29, 2018.

Windows Central, "Spider-Man Unlimited: Windows Phone review", XP No. 55869040, retrieved from the Internet on Dec. 3, 2021, <URL:https://www.youtube.com/watch?v=hiuFIFbRVMs>, two pages, online publication date Sep. 20, 2014.

[Claroa capture] Summary of treasure chests, "Clash Royale", Famitsu App [online] Jan. 30, 2017, <https://app.famitsu.com/20160317_674354/>, searched on Sep. 22, 2022.

Kazumasa Mori, Mario Kart DS Perfect Explosive Guidebook, First Edition, Enterbrain Co., Ltd., Jan. 24, 2006, pp. 7-9 and pp. 22-24.

How to Use Clash Royale Emeralds! Is there a time limit for treasure chests?, clakone.net [online], Mar. 31, 2016, <https://clackakoneta.net/cr-eme>, searched on Sep. 22, 2022.

Notice of Reason for Refusal dated Sep. 30, 2022 for Japanese Patent Application No. 2021-157476 and its machine translation in English.

\* cited by examiner

F I G. 7
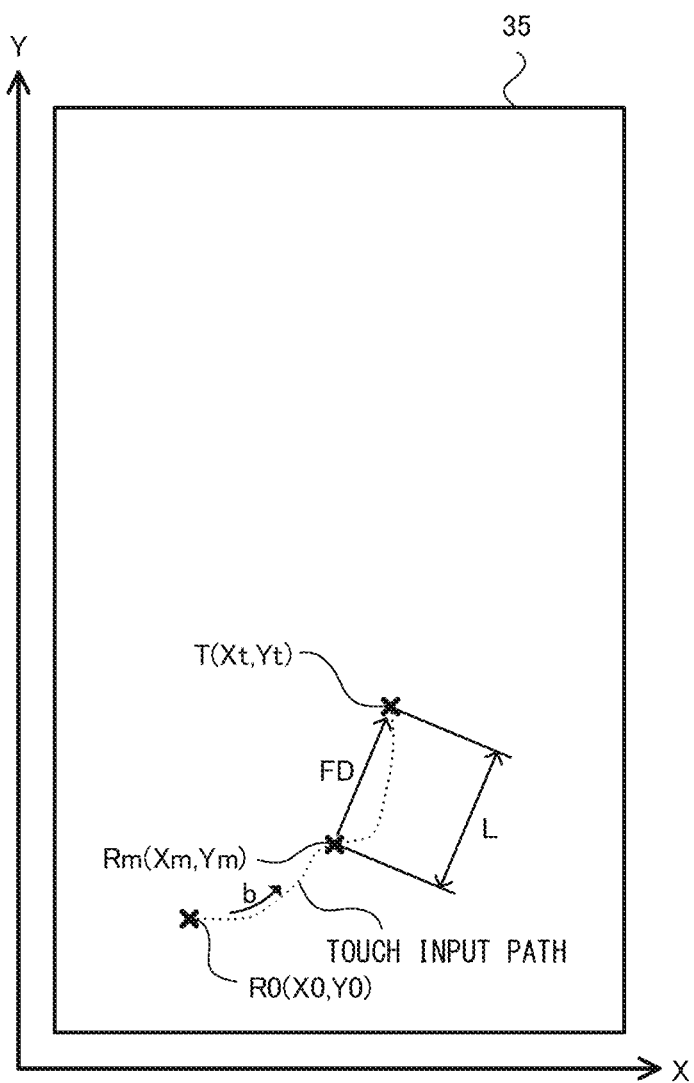

F I G. 1 4

LOTTERY TABLE

| TYPE OF LOTTERY | ITEM | WINNING PROBABILITY | TOTAL WINNING PROBABILITY |
|---|---|---|---|
| ALL-FRAME ROTATION | CARAPACE | 10% | 30% |
| | BANANA | 10% | |
| | MUSHROOM | 10% | |
| NON-ALL-FRAME ROTATION (CARAPACE REMAINING) | CARAPACE | 10% | 10% |
| | BANANA | 0% | |
| | MUSHROOM | 0% | |
| NON-ALL-FRAME ROTATION (BANANA REMAINING) | CARAPACE | 0% | 10% |
| | BANANA | 10% | |
| | MUSHROOM | 0% | |
| NON-ALL-FRAME ROTATION (MUSHROOM REMAINING) | CARAPACE | 0% | 10% |
| | BANANA | 0% | |
| | MUSHROOM | 10% | |

F I G. 1 6
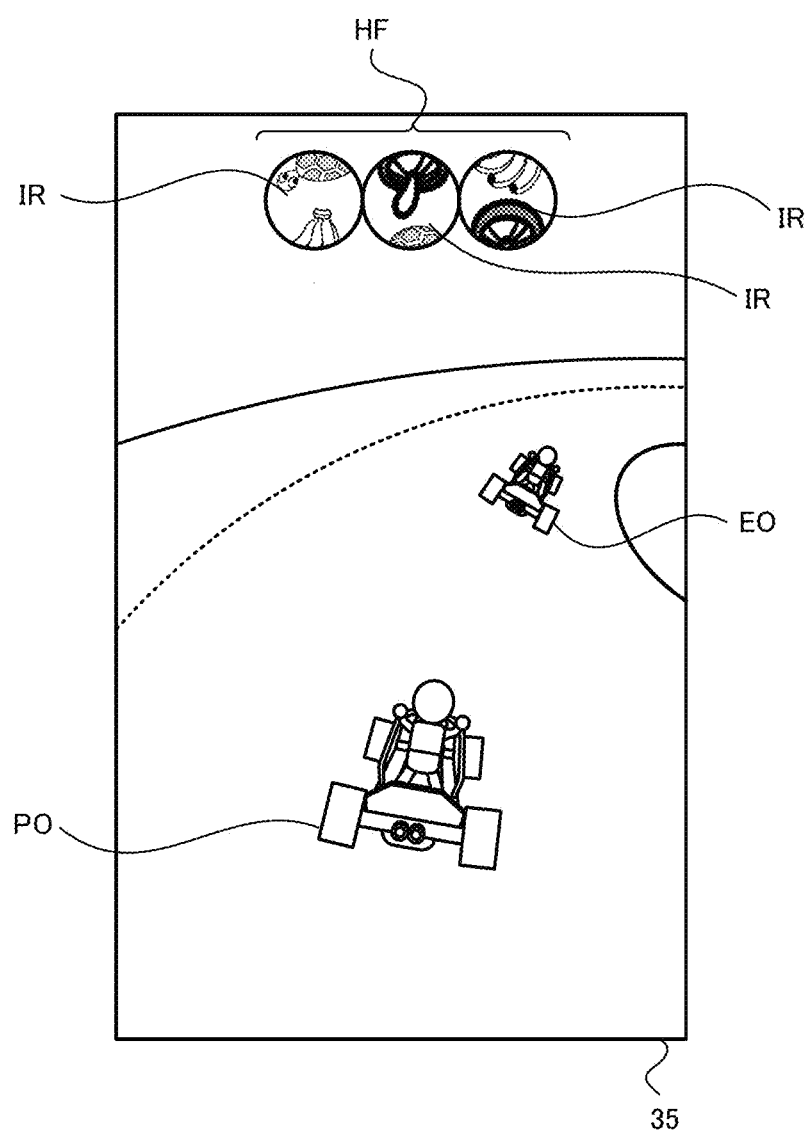

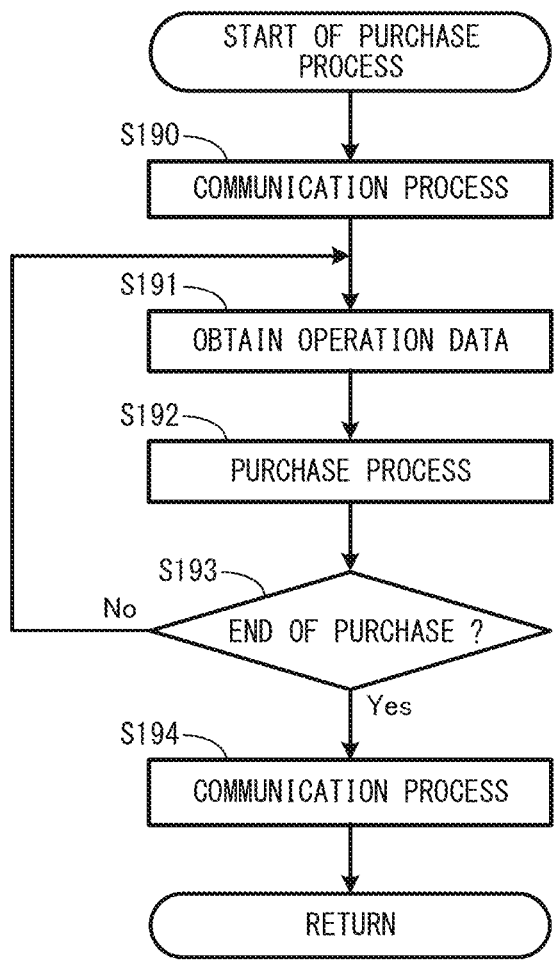
F I G. 2 4

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATIONS

This application is a continuation of U.S. patent application Ser. No. 17/038,185, filed Sep. 30, 2020, now allowed; which is a continuation of International Patent Application PCT/JP2019/010823, filed Mar. 15, 2019, which claims priority to JP Patent Application No. 2018-088782 filed May 2, 2018, the entire contents of each of which are hereby incorporated herein by reference.

FIELD

The technology disclosed herein relates to storage media storing information processing programs, information processing apparatuses, information processing systems, and information processing methods. More specifically, the present invention relates to, for example, a storage medium storing an information processing program, information processing apparatus, information processing system, and information processing method that execute a process based on a user's operation.

BACKGROUND AND SUMMARY

There is conventionally a game system that performs a game process of controlling a movement of an object based on a user's operation. In such a game system, a movement direction of an object is controlled with respect to a leftward and a rightward direction, depending on the user's operation performed on the leftward and rightward directions of a cross-switch, and a movement speed of the object is controlled, depending on the user's operation performed on the forward and backward directions of the cross-switch.

However, there is room for improvement in the versatility of processes with respect to a user's operation.

With this in mind, it is an object of this non-limiting example to provide an information processing program, information processing apparatus, information processing system, and information processing method that can improve, for example, the versatility of processes with respect to a user's operation using a single operational user interface.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

A non-limiting example configuration of a storage medium storing an information processing program according to this non-limiting example is executed in a computer included in an apparatus for performing a process based on a user's operation. The program causes the computer to execute receiving a coordinate input from the user, changing a movement direction of a moving object moving in a virtual space, based on at least a component in a first axial direction of a coordinate change of the user's input continuously performed, with reference to a first reference coordinate point determined by the user's input indicating the coordinate input, and determining a direction of a game operation different from a movement of the moving object in the virtual space, based on at least a component of the user's input in a second axial direction different from the first axial direction, and executing the game operation.

With the above configuration, an operation of controlling the movement direction of the moving object can be performed using the user's coordinate input, and the direction of the game operation different from the movement of the moving object can also be controlled, resulting in an increase in the versatility of processes with respect to the user's operation.

The direction of the game operation may be determined, depending on a direction of a change in the user's input, and the game operation may be executed, when the coordinate change of the user's input with reference to a second reference coordinate point determined by the user's input indicating the coordinate input is greater than or equal to a reference value, and the direction of the change in the user's input calculated from the component in the first axial direction and the component in the second axial direction of the user's input meets an angle condition.

With the above configuration, a change in the coordinate input meeting the angle condition is required in order to determine the direction of the game operation, and therefore, erroneous determination due to a change in the coordinate input which does not meet the angle condition can be prevented.

The direction of the game operation may be determined, depending on a direction of the coordinate change of the user's input, and the game operation may be executed, when the second axial component of the coordinate change of the user's input with reference to the second reference coordinate point is greater than or equal to a reference value.

With the above configuration, a change in the coordinate input having the second axial component greater than or equal to the reference value is required in order to determine the direction of the game operation, and therefore, erroneous determination due to a coordinate input change in the second axial direction which is not intended by the user can be prevented.

The direction of the game operation may be determined and the game operation may be executed when the direction of the change in the user's input with reference to the second reference coordinate point meets an angle condition.

With the above configuration, a change in the coordinate input meeting the second axial component greater than or equal to the reference value and the angle condition is required in order to determine the direction of the game operation, and therefore, erroneous determination due to a coordinate input change in the second axial direction which is not intended by the user can be prevented.

The angle condition may be changed, depending on a direction of the moving object.

With the above configuration, the coordinate input operation can be performed, depending on the direction of the moving object.

A different value may be used as the reference value, depending on whether the direction of the change in the user's input with reference to the second reference coordinate point is a positive direction or a negative direction in the second axial direction.

With the above configuration, the determination can be performed, taking into account a direction in which it is difficult to perform the coordinate input operation.

A coordinate point on a path whose coordinate points are input by the user's input may be used as the second reference coordinate point.

With the above configuration, the position input by the user is used as the reference coordinate point, and therefore, the coordinate input operation can be performed without confirming a reference position.

The second reference coordinate point may be moved on the path toward a more recent coordinate input on the path during continuation of the user's input.

With the above configuration, the reference coordinate point follows the path of the user's input, and therefore, a most recent operational direction intended by the user can be determined.

As the second reference coordinate point, a coordinate point at which the user's input has been started may be used.

With the above configuration, a position where the user has started the coordinate input is used as the reference coordinate point, and therefore, the coordinate input operation can be performed without confirming a reference position.

When the first axial direction component of the coordinate change of the user's input with reference to the first reference coordinate point is greater than or equal to a threshold, the reference value may be changed by comparing the case where the first axial direction component is smaller than the threshold.

With the above configuration, the influence of the coordinate input operation in the first axial direction on the coordinate input operation in the second axial direction can be reduced, and the influence of the coordinate input operation in the second axial direction on the coordinate input operation in the first axial direction can be reduced.

The first axial direction may be changed, depending on a direction of the moving object.

With the above configuration, the coordinate input operation can be performed by the user, depending on the direction of the moving object.

When a rate of the change in the user's input is higher than or equal to a threshold, a direction of the game operation may be determined based on at least the component of the user's input in the second axial direction, and the game operation may be executed.

With the above configuration, in the user's coordinate input, an operation can be performed, depending on the speed of an operation of moving a coordinate input position.

Another object may be moved in a direction away from the moving object, as the game operation, where the movement of the other object is started at a position which is the same as or near a position of the moving object.

With the above configuration, a game operation of moving the other object away from the moving object can be controlled using the user's coordinate input.

When an input is performed to specify a position where the other object is to be displayed, the other object may be moved in an initial direction specified for the other object.

With the above configuration, the other object can be operated only by performing an input to specify a position where the other object is to be displayed, resulting in an increase in the versatility of the user's coordinate input operation.

Before the start of the movement of the other object, the other object may be displayed at or near the moving object.

With the above configuration, the other object for which an operation instruction is to be performed using the user's coordinate input can be clearly indicated.

Before the start of the movement of the other object, the other object may be displayed away from the moving object.

With the above configuration, the other object for which an operation instruction is to be performed using the user's coordinate input can be set at a position away from the moving object, and therefore, can be clearly indicated.

The other object may be moved in a direction corresponding to an input direction of the user's input with reference to the second reference coordinate point.

With the above configuration, a direction in which the other object is moved can be controlled by the user's coordinate input.

A movement speed of the other object may be set based on an input speed of the user's input with reference to the second reference coordinate point.

With the above configuration, a movement speed of the other object can be controlled by the operation speed of the user's coordinate input.

The other object may be an attack item which decelerates or stops an object when the object collides therewith.

With the above configuration, an item attacking an object can be controlled, depending on the user's coordinate input.

The moving object may be moved irrespective of whether or not there is the user's input.

With the above configuration, the moving object is moved without the user's coordinate input, and therefore, the difficulty of the coordinate input operation can be reduced.

The moving object may be moved from the back to the front of a virtual camera for viewing the moving object in the virtual space with respect to a line-of-sight direction of the virtual camera.

With the above configuration, the feeling of controlling the moving object can be enhanced by the user's coordinate input operation.

The first axial direction may be a leftward and a rightward direction as viewed from the user. The second axial direction may be an upward and a downward direction as viewed from the user.

With the above configuration, the movement direction of the moving object can be controlled by the user's coordinate input in the leftward and rightward directions, and a game operation different from the movement of the moving object can be controlled by the user's coordinate input in the upward and downward directions, resulting in an increase in the versatility of processes with respect to the user's operation.

This non-limiting example may be carried out in the form of an information processing apparatus, information processing system, and information processing method.

According to this non-limiting example, a movement direction of a moving object can be controlled using a user's coordinate input, and a direction of a game operation different from the movement of the moving object can also be controlled, resulting in an increase in the versatility of processes with respect to the user's operation.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 7 is a diagram showing a non-limiting example in which an action of an item I that is fired is controlled with reference to the display screen;

FIG. 14 is a diagram showing a non-limiting example of a lottery table;

FIG. 16 is a diagram showing a non-limiting example game image displayed on the display unit 35 of the information processing apparatus 3;

FIG. 24 is a subroutine showing a detailed non-limiting example of a purchase process in step S116 of FIG. 20.

DETAILED DESCRIPTION OF NON-LIMITING EXAMPLE EMBODIMENTS

An information processing system according to this non-limiting example will be described with reference to FIG. 1.

Figure 1:
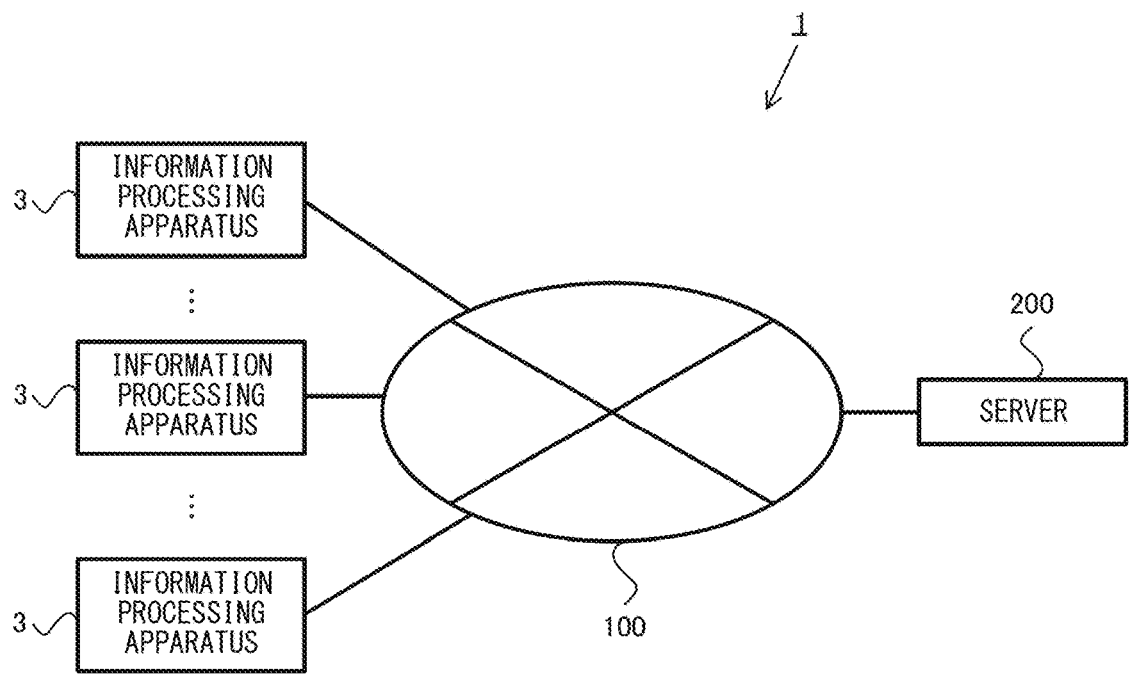
FIG. 1 is a diagram showing an information processing system 1 according to this non-limiting example.

As shown in FIG. 1, an information processing system 1 that is a non-limiting example of the information processing system of the non-limiting example, includes information processing apparatuses 3 and a server 200, which are connected together through a network 100. Although FIG. 1 shows a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone, handheld game console, personal digital assistant (PDA), etc.

Figure 2:
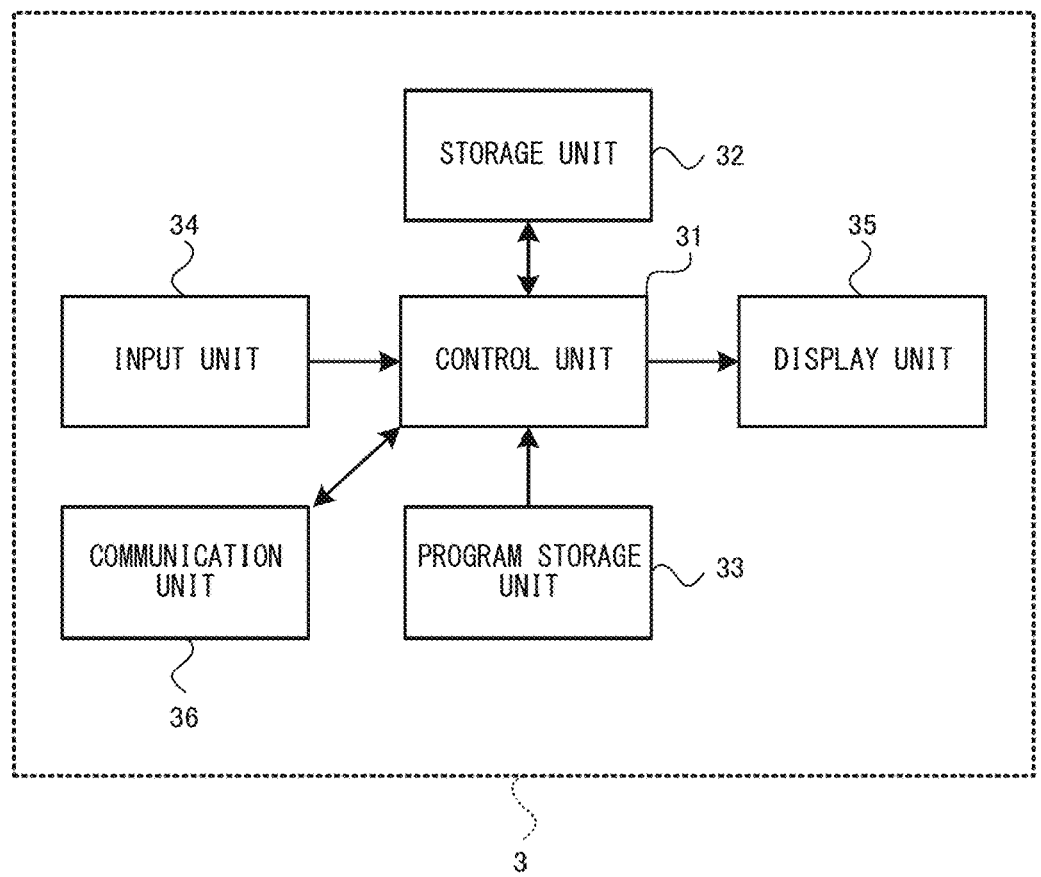
FIG. 2 is a block diagram showing a non-limiting example of a configuration of an information processing apparatus 3.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device. As a non-limiting example, the input unit 34 may be a touch panel provided on a screen of the display unit 35. For example, the touch panel may be of any type. The touch panel may be either of a type that allows a multi-touch input (e.g., a capacitive type) or of a type that allows a single-touch input (e.g., a resistive type).

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
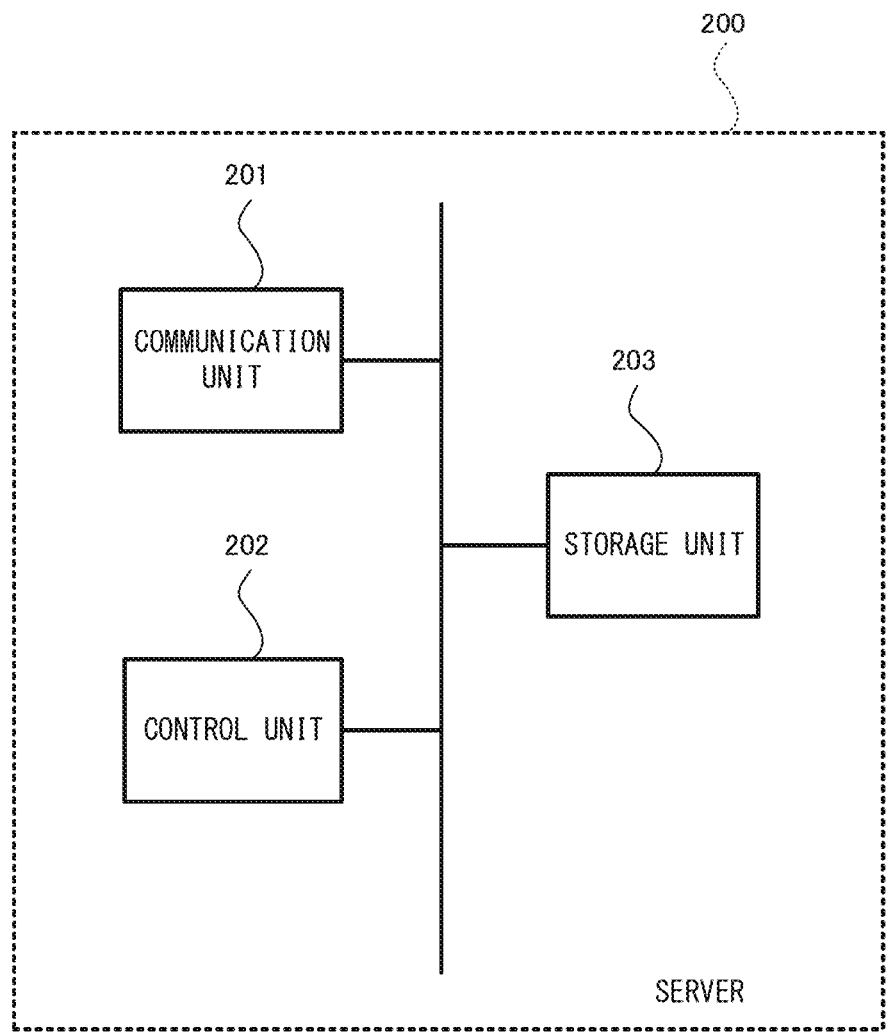
FIG. 3 is a block diagram showing a non-limiting example of a configuration of a server 200.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. As a non-limiting example, the control unit 202 performs a process of managing the progression of a game performed along with the information processing apparatus 3, a process of managing in-game money (e.g., coins), game items, and game objects (e.g., pieces of equipment used in a game), etc., that are purchased by the user, a process of managing the probability of winning a slot lottery, and a process of managing information about payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
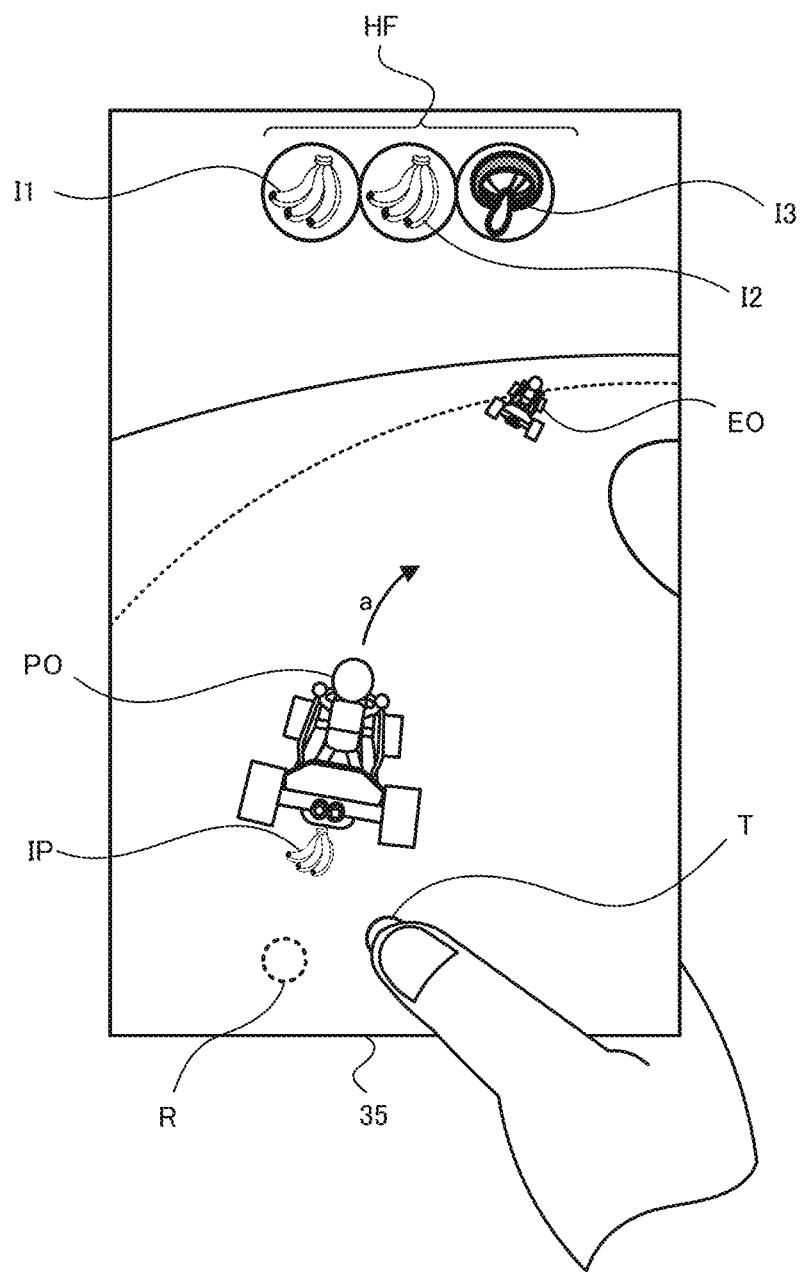
FIG. 4 is a diagram showing a non-limiting example game image displayed on a display unit 35 of the information processing apparatus 3.
Figure 5:
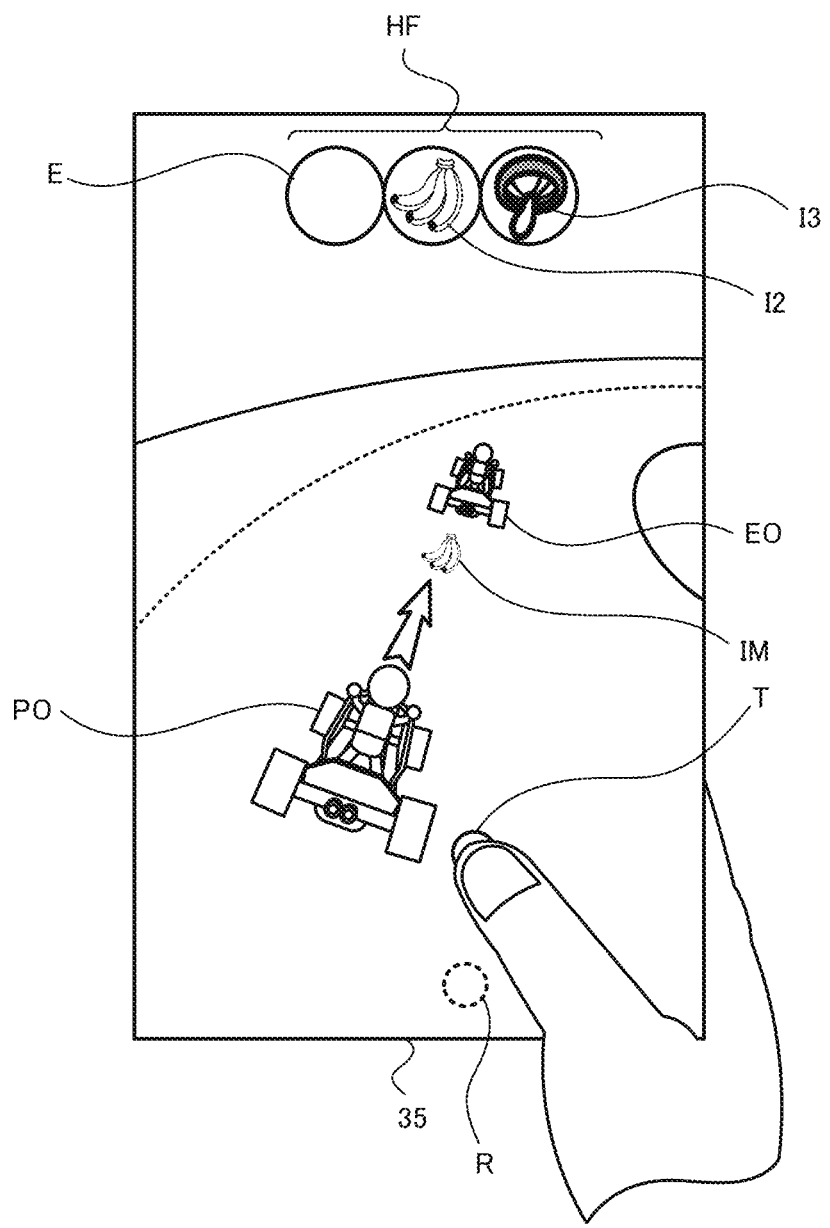
FIG. 5 is a diagram showing a non-limiting example game image displayed on the display unit 35 of the information processing apparatus 3.
Figure 6:
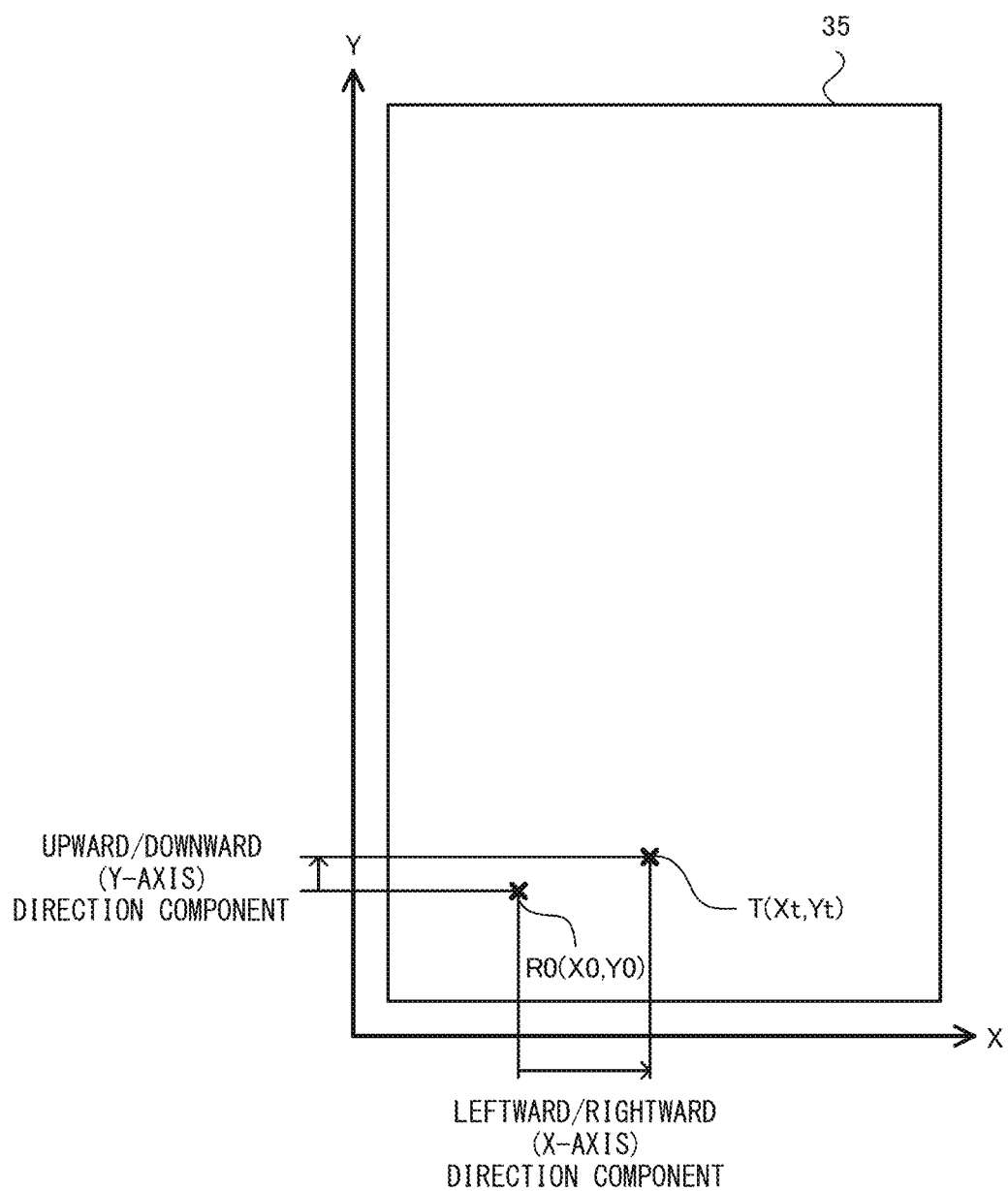
FIG. 6 is a diagram showing a non-limiting example in which a movement direction of a player object PO is controlled with reference to a display screen.
Figure 8:
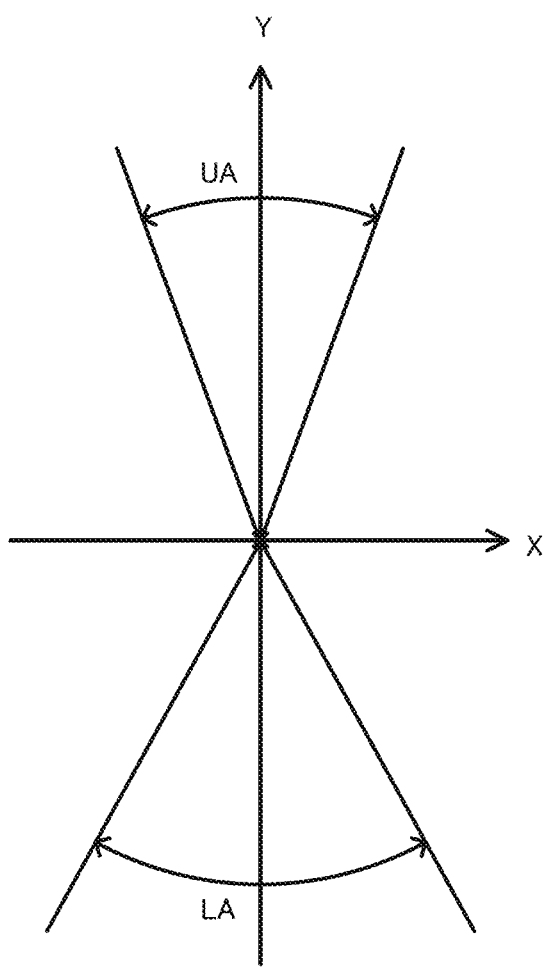
FIG. 8 is a diagram for describing a non-limiting example of determination regions for determining an operation of firing an item I with reference to the display screen.
Figure 9:
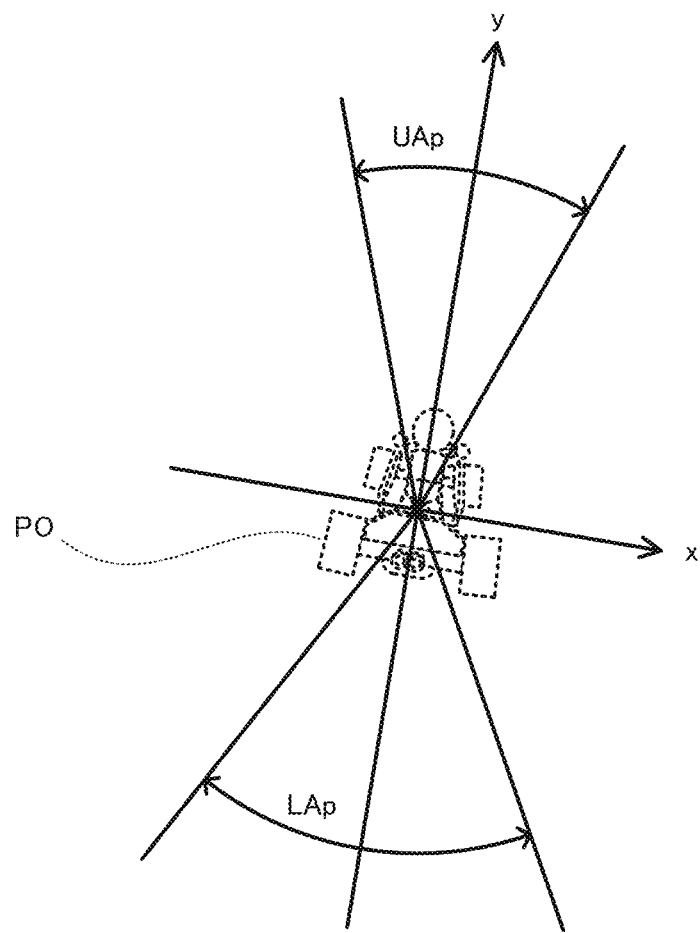
FIG. 9 is a diagram for describing a non-limiting example of determination regions for determining an operation of firing an item I with reference to the player object PO.

Next, before describing specific processes performed by the information processing apparatus 3 and the server 200, a non-limiting example movement process and firing process performed in the information processing system 1 will be outlined with reference to FIGS. 4-9. In the non-limiting example movement and firing processes, the information processing system 1 is used to operate a movement direction of a player object PO (movable object) and firing of an item I (another object). Note that FIG. 4 is a diagram showing a non-limiting example game image displayed on the display unit 35 of the information processing apparatus 3. FIG. 5 is a diagram showing a non-limiting example game image displayed on the display unit 35 of the information processing apparatus 3. FIG. 6 is a diagram showing a non-limiting example in which the movement direction of the player object PO is controlled with reference to a display screen. FIG. 7 is a diagram showing a non-limiting example in which an action of an item I that is fired is controlled with reference to the display screen. FIG. 8 is a diagram for describing non-limiting example determination regions for determining an operation of firing an item I with reference to the display screen. FIG. 9 is a diagram for describing non-limiting example determination regions for determining an operation of firing an item I with reference to the player object PO. Although, in the description that follows, a game is used as a non-limiting example application executed in the information processing apparatus 3, other applications may be executed in the information processing apparatus 3.

The display unit 35 of the information processing apparatus 3 displays a game image corresponding to a game played in the information processing apparatus 3. As a non-limiting example of such a game image, FIG. 4 shows a scene in which the player object PO performs a racing game. For example, in the game, the player object PO sits on a cart and drives the cart on a course provided in a virtual world. On the course, an opponent object(s) EO sits on and drives another cart. These objects compete to be first to reach a goal provided on the course. A virtual camera for generating a game image is disposed behind the player object PO traveling on the course. Note that when the player object PO deviates from the travel direction of the course due to spinning, drifting, etc., the virtual camera may be still disposed at a position where the player object PO is seen from behind the player object PO (i.e., the virtual camera is aimed toward the player object PO), or may be disposed at a position where the player object PO is seen from behind along the travel direction of the course (i.e., the virtual camera is aimed in the travel direction of the course). Note that the player object PO corresponds to a non-limiting example of a moving object moving in a virtual space.

As shown in FIG. 4, the movement direction of the player object PO can be controlled by performing an operation of touching the touch panel (input unit 34) provided on the screen of the display unit 35. As a non-limiting example, the player object PO is controlled to automatically travel forward along the course, and the leftward/rightward movement direction of the player object PO is controlled by the user's operation (e.g., a steering operation). Specifically, when a touch operation of swiping rightward is performed with reference to the position where the touch panel was first touched (initial touch position), the movement direction of the player object PO is changed to a rightward direction. When a touch operation of swiping leftward is performed with reference to an initial touch position, the movement direction of the player object PO is changed to a leftward direction. For example, in FIG. 4, the display unit 35 displays a reference image R showing an initial touch position on the touch panel, and a touch position image T showing a current touch position. Because the touch position image T is located to the right of the reference image R, the movement direction of the player object PO is changed to a rightward direction (direction "a" in FIG. 4). Note that the player object PO may not be controlled to automatically travel forward along the course, and may be caused to travel according to the user's acceleration operation. The player object PO may also be controlled to be automatically steered to turn left and right along the course. For example, when the course curves to the right, the movement direction of the player object PO may be changed to a rightward direction to some extent even without the user's steering operation, and in this case, when the user performs a rightward steering operation, the movement direction of the player object PO may be changed to a rightward direction to a further extent.

In addition, an item I possessed by the player object PO can be fired by performing a touch operation. For example, the display unit 35 is provided with a plurality of possession frames HF each showing an item I possessed by the player object PO. In the non-limiting example possession frames HF of FIG. 4, three items I1, I2, and I3 can be possessed by the respective possession frames. One of the items I in the possession frames HF possessed by the player object PO is displayed, as a ready-to-use item IP, at a ready-to-use position behind the cart of the player object PO. For example, the ready-to-use item IP is one of the items I in the possession frames HF that was acquired earliest. In the non-limiting example of FIG. 4, the item I1 (a bunch of bananas) displayed in the leftmost possession frame HF is displayed as the ready-to-use item IP at the ready-to-use position.

In FIG. 5, when a touch operation of swiping the touch panel upward is performed, then if the ready-to-use item IP disposed at the ready-to-use position of the player object PO is fireable, the item IP is fired as a projectile item IM toward the front of the player object PO. Note that the ready-to-use item IP and the projectile item IM are typically the same object, and alternatively may be different objects. Some types of ready-to-use items IM (e.g., a banana item) disposed at the ready-to-use position may be fired as the projectile item IM toward the back of the player object PO when a touch operation of swiping the touch panel downward is performed. Note that if the direction in which the ready-to-use item IP disposed at the ready-to-use position of the player object PO is fired is fixed, the item IP may be fired as the projectile item IM in the fixed firing direction no matter whether a touch operation of swiping the touch panel is performed upward or downward. Some types of ready-to-use items IP disposed at the ready-to-use position may not be fired from the player object PO and may be used by the player object PO itself. In this case, when a touch operation of swiping the touch panel upward or downward is performed, the ready-to-use item IP disposed at the ready-to-use position of the player object PO is used by the player object PO. Note that the possession frames HP may be disposed in the virtual space, or may be disposed, overlaying the display screen. A direction of a game operation by using the item I corresponds to a non-limiting example of a direction of a game operation different from a movement of a moving object. The projectile item IM (item I) corresponds to a non-limiting example of another object moving in a direction away from a moving object.

When the player object PO fires the projectile item IM, an effect that is advantageous to the progression of a race performed by the player object PO can be obtained, depending on the type of the projectile item IM. For example, when the projectile item IM indicating a carapace collides with the opponent object EO, the collision may decelerate or stop, i.e., obstruct, the traveling of the opponent object EO, and may cause damage to the opponent object EO, depending on the extent of the collision. When the projectile item IM indicating a bunch of bananas collides with the opponent object EO, the projectile item IM may affect the opponent object EO such that the opponent object EO slips on a road, so that the traveling of the opponent object EO is decelerated or stopped. Note that the projectile item IM representing a carapace and the projectile item IM representing a banana correspond to a non-limiting example of an attack item that decelerates or stops an object colliding therewith.

Alternatively, the use of the ready-to-use item IP may temporarily increase the ability of the player object PO itself for a predetermined period of time. For example, when the ready-to-use item IP indicating a mushroom is used, the speed of the player object PO is increased for a predetermined period of time. Note that the use of the ready-to-use item IP may provide an effect of increasing the size of the player object PO itself for a predetermined period of time or an effect of increasing in-game coins possessed by the player object PO.

When an item I has been used, the item I is not currently possessed by the player object PO, and therefore, the ready-to-use item IP displayed at the ready-to-use position is erased, and the item I in the possession frame HF corresponding to the ready-to-use item IP is also erased (in the non-limiting example of FIG. 5, the item I1 displayed in the leftmost possession frame HF). As a result, the possession frame HF that has displayed the item I that was fired as the projectile item IM is changed to an empty frame E in which no item I is displayed.

As described above, in the non-limiting example movement and firing processes performed in the information processing system 1, the movement direction of the player object PO is changed when an input of swiping the touch panel is performed leftward or rightward, and the firing operation of the item I is controlled when an input of swiping the touch panel is performed upward or downward. A non-limiting example in which the direction of a swiping input is determined will now be described with reference to FIGS. 6 and 7.

In FIG. 6, the leftward/rightward movement direction of the player object PO is set according to the leftward/rightward component in the display screen of an input of swiping the touch panel. Specifically, in a touch operation on the touch panel, a reference coordinate point R0 where the touch panel is first touched, and a current touch position coordinate point T of a swipe operation performed following the initial touch, are set based on the display screen coordinate system of the display unit 35. For example, as shown in FIG. 6, in the display screen of the display unit 35, defined is a display screen coordinate system in which the X-axis (the rightward direction is the positive direction of the X-axis) is a first axis that extends in the leftward/rightward direction of the display screen, and the Y-axis (the upward direction is the positive direction of the Y-axis) is a second axis which extends in the upward/downward direction of the display screen and is orthogonal to the first axis. In this case, the reference coordinate point is set as R0(X0, Y0), and the current touch position coordinate point T is set as T(Xt, Yt). In this case, the leftward/rightward component (X-axis-direction component) in the display screen of a swipe input is calculated by Xt−X0, and the upward/downward component (Y-axis-direction component) in the display screen of the swipe input is calculated by Yt−Y0. In the non-limiting example, if the X-axis-direction component Xt−X0 has a positive value, the movement direction of the player object PO is changed to a rightward direction by a steering wheel angle corresponding to the absolute value of Xt−X0. If the X-axis-direction component Xt−X0 has a negative value, the movement direction of the player object PO is changed to a leftward direction by a steering wheel angle corresponding to the absolute value of Xt−X0. Thereafter, when the touch is released from the touch panel, the reference coordinate point R0 and the current touch position coordinate point T are initialized, and the movement direction of the player object PO is changed such that the steering wheel angle is returned to the straight-ahead position by a predetermined change amount. Note that the reference coordinate point R0 corresponds to a non-limiting example of a first reference coordinate point determined by a user's input indicating a coordinate input. The X-axis corresponds to a non-limiting example of a first axis, and the Y-axis corresponds to a second axis.

Note that the steering wheel angle corresponding to the absolute value of Xt−X0 may be changed, depending on the position of the player object PO on the course. For example, when the player object PO is traveling at a center of the course, the steering wheel angle set according to the user's operation may be relatively increased, and when the player object PO is traveling at an end of the course, the steering wheel angle set according to the user's operation may be relatively decreased. The cart being driven by the player object PO may slip, i.e., drift, depending on the steering wheel angle set according to the user's operation, the course conditions, the performance of the cart, etc. In this case, the movement direction of the cart of the player object PO is not consistent with the steering wheel angle, and as a result, the movement direction of the player object PO may not completely be consistent with the magnitude of the leftward/rightward component of an input of swiping the touch panel.

In FIG. 7, an action of an item I that is fired is controlled according to the upward/downward component in the display screen of an input of swiping the touch panel. Specifically, in a touch operation on the touch panel, a reference coordinate point Rm where the touch panel is first touched (the same position as that of the reference coordinate point R0 when the touch panel is first touched), and a current touch position coordinate point T of a swipe operation performed following the initial touch, are set based on the display screen coordinate system of the display unit 35. For example, as shown in FIG. 7, as in FIG. 6, in the display screen of the display unit 35, defined is a display screen coordinate system in which the X-axis (the rightward direction is the positive direction of the X-axis) is a first axis that extends in the leftward/rightward direction of the display screen, and the Y-axis (the upward direction is the positive direction of the Y-axis) is a second axis that extends in the upward/downward direction of the display screen and is orthogonal to the first axis. In this case, the reference coordinate Rm is set as Rm(Xm, Ym), and the current touch position coordinate point T is set as T(Xt, Yt). Thereafter, a vector FD from the reference coordinate point Rm to the current touch position coordinate point T is calculated, and based on the direction of the vector FD, it is determined whether the direction of the input of swiping the touch panel is upward or downward.

In the process of determining the upward/downward component in the display screen of an input of swiping the touch panel, a positional relationship between the reference coordinate point Rm and the current touch position coordinate point T is maintained to satisfy a predetermined condition. If the condition fails to be satisfied, the reference coordinate point Rm is moved so as to satisfy the condition. For example, the length of a path of touch positions (touch input path) formed between the reference coordinate point Rm and the current touch position coordinate point T is greater than a threshold L, the reference coordinate point Rm is moved on the touch input path toward the current touch position coordinate point T (a direction "b" in FIG. 7) such that the length becomes smaller than or equal to the threshold L. Note that the reference coordinate point Rm that is moved on the touch input path toward the current touch position coordinate point T such that the length becomes smaller than or equal to the threshold L, may be moved until the length becomes equal to the threshold L, at a predetermined rate corresponding to the time it takes for the length to become smaller than or equal to the threshold L. Alternatively, the reference coordinate point Rm may be moved such that the length instantaneously becomes smaller than or equal to the threshold L. In the process of moving the reference coordinate point Rm toward the current touch position coordinate point T, touch position coordinate points T that were recorded in the past and are the threshold L or greater away from the current touch position coordinate point T may be successively erased based on the predetermined rate, and the touch position coordinate point T that becomes most previous due to the erasing process may be set as the reference coordinate point Rm. Thus, by causing the reference coordinate point Rm to move along the touch input path, the positional relationship between the reference coordinate point Rm and the current touch position coordinate point T is maintained such that the touch input path length therebetween is smaller than or equal to L, and the vector FD from the moved reference coordinate point Rm to the current touch position coordinate point T is calculated. Note that while a touch input is being performed, the reference coordinate point Rm may be moved on the touch input path such that the reference coordinate point Rm invariably approaches the current touch position coordinate point T even when the length of the touch input path between the reference coordinate point Rm and the current touch position coordinate point T is smaller than the threshold L.

If the length of the vector FD is greater than or equal to a predetermined length and the direction of the vector FD is within a determination region, it is determined that an input of swiping the touch panel in the upward or downward direction of the display screen has been performed, and the ready-to-use item IP is fired as the projectile item IM in a direction based on the determination. For example, as shown in FIG. 8, a predetermined angle range around the positive direction of the Y-axis as a center thereof is set as a forward-direction determination region UA, and a predetermined angle range around the negative direction of the Y-axis as a center thereof is set as a backward-direction determination region LA. If the length of the vector FD is greater than or equal to the predetermined length and the direction of the vector FD is within the forward-direction determination region UA, the ready-to-use item IP is fired as the projectile item IM toward the front of the player object PO (e.g., directly toward the front of the player object PO). In the case where the ready-to-use item IP is fireable toward the back of the player object PO, if the length of the vector FD is greater than or equal to the predetermined length and the direction of the vector FD is within the backward-direction determination region LA, the ready-to-use item IP is fired as the projectile item IM toward the back of the player object PO (e.g., directly toward the back of the player object PO). Note that the determination that the length of the vector FD is greater than or equal to a predetermined length corresponds to a non-limiting example of a determination that a coordinate change of a user's input with reference to a second reference coordinate point is greater than or equal to a reference value. The determination that the direction of the vector FD is within the determination region corresponds to a non-limiting example of a determination that a direction of a change in a user's input meets a predetermined angle condition with reference to a second axial direction.

Note that the angle range of the backward-direction determination region LA may be set greater than the angle range of the forward-direction determination region UA. Typically, the downward swipe input using a touch panel is more difficult than the upward swipe input. This is particularly significant when a touch operation is performed using the thumb of a hand holding the information processing apparatus 3. Therefore, if the condition for determining the relatively difficult swipe input is relatively relaxed, operability can be improved. In addition, the predetermined length for determining the length of the touch input path formed between the reference coordinate point Rm and the current touch position coordinate point T may be a threshold that is changed, depending on the direction in which the length is determined. In order to relax the condition for determining the relatively difficult swipe input for the above reason, the length of the touch input path required for determination of whether or not a swipe input is within the backward-direction determination region LA may be smaller than the length of the touch input path required for determination of whether or not a swipe input is within the forward-direction determination region UA. While, in the above process, the reference coordinate point Rm is assumed to move along the touch input path, the movement of the reference coordinate point Rm is not limited to this. For example, the reference coordinate point Rm may be moved on a straight line connecting between the reference coordinate point Rm and the current touch position coordinate point T toward the current touch position coordinate point T such that the linear distance therebetween becomes smaller than or equal to a threshold L. Alternatively, the reference coordinate point Rm may be fixed to the same position as that of the reference coordinate point R0, i.e., an initial touch position. Note that the forward-direction determination region UA and the backward-direction determination region LA set within different angle ranges correspond to a non-limiting example of a reference value having a different value.

The length of the touch input path formed between the reference coordinate point Rm and the current touch position coordinate point T, which is used in the input determination, may be replaced with other parameters. As a first non-limiting example, the length of the touch input path formed between the reference coordinate point Rm and the current touch position coordinate point T may be replaced with the linear distance between the reference coordinate point Rm and the current touch position coordinate point T. As a second non-limiting example, the length of the touch input path formed between the reference coordinate point Rm and the current touch position coordinate point T may be replaced with the length of the Y-axis component of the vector FD. As a third non-limiting example, the length of the touch input path formed between the reference coordinate point Rm and the current touch position coordinate point T may be replaced with the length of the vector FD.

The process of determining the upward/downward component in the display screen of an input of swiping the touch panel may be performed without the use of the reference coordinate point Rm. As a first non-limiting example, when the change rate of a touch position in swiping to the current touch position coordinate point T (e.g., the length between the previously detected touch position coordinate point T to the currently detected touch position coordinate point T, or the length of a touch input path immediately previously detected for a predetermined period of time) is greater than or equal to a reference value, then if the direction of the swipe input whose change rate has been detected is within the forward-direction determination region UA or the backward-direction determination region LA, it may be determined that the input of swiping the touch panel has been performed in the upward direction or the downward direction of the display screen. As a second non-limiting example, when the change rate of a touch position in swiping to the current touch position coordinate point T is greater than or equal to the reference value, then if the length of the Y-axis-direction component of the swipe input whose change rate has been detected is greater than or equal to the predetermined length, it may be determined that the input of swiping the touch panel has been performed in the upward direction or the downward direction of the display screen.

The predetermined length that is a reference value for determining the length of the touch input path formed between the reference coordinate point Rm and the current touch position coordinate point T may be changed, depending on the user's swipe input. For example, if the magnitude of the leftward/rightward component Xt−X0 of the swipe input is greater than or equal to a predetermined threshold, the predetermined length that is the reference value may be changed. As a non-limiting example, when the magnitude of the leftward/rightward component Xt−X0 of the swipe input is greater than or equal to the predetermined threshold, then if the predetermined length that is the reference value is increased, the player object PO's operation of greatly turning the steering wheel to the left or right, or the player object PO's operation of performing so-called drifting, i.e., an operation of performing a swipe input having a great change amount, can be prevented from being determined to be an operation of firing an item forward or backward, which is not actually intended by the user. As another non-limiting example, when the magnitude of the leftward/rightward component Xt−X0 of a swipe input is greater than or equal to the predetermined threshold, then if the predetermined length that is the reference value is decreased, an operation of firing an item I can be performed during the player object PO's operation of greatly turning the steering wheel to the left or right, or the player object PO's operation of performing so-called drifting, without a significant influence of the firing operation on the leftward/rightward movement direction.

In the above non-limiting example, if the conditions that the length of the touch input path formed between the reference coordinate point Rm and the current touch position coordinate point T is greater than or equal to a predetermined length, and the direction of the vector FD is within a determination region, are satisfied, the projectile item IM is fired directly toward the front or back of the player object PO. This can avoid the situation that if only the upward/downward component of a swipe input is used in the determination, it may be determined that the user instructs to fire even when the user intends to and actually performs a leftward/rightward swipe input, because the swipe input contains an upward/downward component. By setting the above conditions, an input can be correctly determined. In addition, by limiting the firing direction to the direct forward direction or direct backward direction of the player object PO, an input error from that direction can be accommodated, and therefore, the difficulty of the operation can be taken into consideration. However, in the case where such an effect is not desired, the direction in which the projectile item IM is fired may deviate from the direct forward direction or direct backward direction of the player object PO. For example, if the direction of the vector FD is within the forward-direction determination region UA, the projectile item IM may be fired in a direction deviating from the direct forward direction of the player object PO by an angle difference between the positive direction of the Y-axis and the direction of the vector FD. Also, if the direction of the vector FD is within the backward-direction determination region LA, the projectile item IM may be fired in a direction deviating from the direct backward direction of the player object PO by an angle difference between the negative direction of the Y-axis and the direction of the vector FD.

The direction in which the projectile item IM is fired may be varied, depending on the type of the player object PO or a piece of equipment used by the player object PO (e.g., a cart driven by the player object PO).

In the process of determining an input of swiping the touch panel, the touch input direction is determined with reference to the coordinate axes (X- and Y-axes) defined in the display screen of the display unit 35. Alternatively, the touch input direction may be determined with reference to other coordinate axes. For example, as shown in FIG. 9, the touch input direction may be determined with reference to coordinate axes defined in the player object PO.

In FIG. 9, the player object PO is displayed, facing rightward in the display screen of the display unit 35. A player object coordinate system is defined in which the x-axis (the rightward direction of the player object PO is the positive direction of the x-axis) is a first axis that is the leftward/rightward direction of the player object PO, and the y-axis (the forward direction of the player object PO is the positive direction of the y-axis) is a second axis that is the forward/backward direction of the player object PO and is orthogonal to the first axis. Even in the case where such a coordinate system is used, the reference coordinate point R0 for determining the leftward/rightward direction of a swipe operation is set as R0(x0, y0), and the current touch position coordinate point T is set as T(xt, yt). As a result, the magnitude of the leftward/rightward component (x-axis-direction component) of a swipe input with reference to the player object PO can be calculated by xt−x0, and the magnitude of the forward/backward direction component (y-axis-direction component) of a swipe input with reference to the player object PO can be calculated by yt−y0. If the x-axis-direction component xt−x0 has a positive value, the movement direction of the player object PO is changed to a rightward direction by a steering wheel angle corresponding to the absolute value of xt−x0. If the x-axis-direction component xt−x0 has a negative value, the movement direction of the player object PO is changed to a leftward direction by a steering wheel angle corresponding to the absolute value of xt−x0. When a touch is released from the touch panel, the reference coordinate point R0 and the current touch position coordinate point T are initialized, and the movement direction of the player object PO is changed such that the steering wheel angle is returned to the straight-ahead position by a predetermined change amount.

In the player object coordinate system, the reference coordinate point Rm for determining the forward/backward direction of a swipe operation with reference to the player object PO is set as Rm(xm, xm). A vector FD from the reference coordinate point Rm to the current touch position coordinate point T is calculated, and based on the direction of the vector FD, it is determined whether the input of swiping the touch panel corresponds to the forward direction or the backward direction of the player object PO. If the length of a touch input path formed between the reference coordinate point Rm and the current touch position coordinate point T is greater than a threshold L, the reference coordinate point Rm is moved along the touch input path toward the current touch position coordinate point T such that the length becomes smaller than or equal to the threshold L. If the length of the vector FD is greater than or equal to a predetermined length, and the direction of the vector FD is within a determination region, it is determined that the input of swiping the touch panel has been performed in the forward direction or backward direction of the player object PO, and the ready-to-use item IP is fired as the projectile item IM in the direction based on the determination.

For example, in the player object coordinate system, determination regions shown in FIG. 9 are used. For example, in the player object coordinate system, a predetermined angle range around the positive direction of the y-axis that is the forward direction of the player object PO, as a center thereof, is set as a forward-direction determination region UAp, and a predetermined angle range around the negative direction of the y-axis that is the backward direction of the player object PO, as a center thereof, is set as a backward-direction determination region LAp. If the length of the vector FD is greater than or equal to a predetermined length and the direction of the vector FD is within the forward-direction determination region UAp, the ready-to-use item IP is fired as the projectile item IM toward the front of the player object PO (e.g., in the direct forward direction of the player object PO). If the ready-to-use item IP is fireable toward the back of the player object PO, the length of the vector FD is greater than or equal to a predetermined length, and the direction of the vector FD is within the backward-direction determination region LAp, the ready-to-use item IP is fired as the projectile item IM toward the back of the player object PO (e.g., in the direct backward direction of the player object PO). The x-axis corresponds to another non-limiting example of a first axis, and the y-axis corresponds to another non-limiting example of a second axis. Note that the direct forward direction of the player object PO may be either the direction in which the front of the player object PO faces or the direct upward screen direction of the display screen (i.e., the direction in which the virtual camera and the player object PO are connected together).

Note that when the player object PO is turned and displayed, the forward-direction determination region UAp and the backward-direction determination region Lap set for the player object coordinate system are turned by an angle corresponding to the turn of the player object PO displayed, and are set for the display screen. In this case, the ranges of the forward-direction determination region UAp and the backward-direction determination region Lap may be increased or decreased when these regions are turned and set for the display screen.

Thus, in the player object coordinate system, when the orientation of the player object PO displayed in the display screen is changed, the coordinate axes (x- and y-axes) for determining a swipe direction are changed. Therefore, in the case where the player object coordinate system is used, the user who performs a touch operation on the touch panel can perform a swipe operation having high reality with reference to the orientation of the player object PO, resulting in an intuitive touch operation with reference to the direction of the player object PO being displayed. Note that the orientation of the player object PO which is a reference in the player object coordinate system, may be either the orientation of the cart driven by the player object PO or the orientation of the player object PO driving the cart. When the player object PO is driving the cart, the player object PO and the cart may have different orientations. The forward-direction determination region UAp and the backward-direction determination region Lap may be set with reference to any of these orientations. Meanwhile, the coordinate axes (X- and Y-axes) defined in the display screen of the display unit 35 remain fixed to the display screen even when the direction of the player object PO displayed in the display screen is changed. Therefore, in the case where the coordinate axes defined in the display screen are used, the user who performs a touch operation on the touch panel can perform a swipe operation using the fixed coordinate axes, and therefore, can perform a touch operation using a simple operation method that is fixed irrespective of the direction of the player object PO. In the case where the coordinate axes defined in the display screen are used, the coordinate axes for determining a touch operation are fixed, and therefore, the load of a process for the determination can be reduced.

Note that in the process of determining the touch input direction, different coordinate axes may be used for different touch input directions to be determined. As a non-limiting example, the magnitude of the leftward/rightward component of an input of swiping the touch panel may be detected and determined using the display screen coordinate system of the display unit 35, and the upward/downward direction (the forward/backward direction of the player object PO) of an input of swiping the touch panel may be detected using the player object coordinate system. As another non-limiting example, the magnitude of the leftward/rightward component of an input of swiping the touch panel may be detected and determined using the player object coordinate system, the upward/downward direction of an input of swiping the touch panel may be detected using the display screen coordinate system of the display unit 35. Even in such a case where the touch input direction is determined using different coordinate systems in parallel, the touch input direction can be similarly determined by setting the reference coordinate points R0 and Rm and the current touch position coordinate point T in the respective coordinate systems.

While, in the above description, the operation determination using the display screen coordinate system and the operation determination using the player object coordinate system are used, the user may be allowed to select one of the coordinate systems for each object to be operated. Because both of the coordinate systems have respective advantages as described above, if the user is allowed to select depending on their preference, operability can be further improved.

Concerning the use of an item, an item I in a possession frame HF or the ready-to-use item IP at the ready-to-use position, which is displayed on the display screen, may be used by performing a touch operation (e.g., tap operation) on that item displayed on the touch panel. Specifically, the ready-to-use item IP is used at the timing that that item on the touch panel is first touched or at the timing that a touch is released from that item on the touch panel after being first touched thereon. In this case, if the item operated by such a touch operation is a type of object that is fireable from the player object PO, the direction in which the item is to be fired may be set to a default direction. Note that even when an item I in a possession frame HF or the ready-to-use item IP at the ready-to-use position, which is displayed on the display screen, is used by performing a touch operation on that item on the touch panel, the direction in which that item is fired may be changed, depending on the direction of a swipe operation (drag operation) (e.g., the upward direction or downward direction of the display screen).

The sizes of the determination regions for determining the input direction (the forward-direction determination region UA, the backward-direction determination region LA, the forward-direction determination region UAp, and the backward-direction determination region LAp) may be changed, depending on the action of the player object PO. For example, when the player object PO performs an action of facing in a direction different from the direction of the steering wheel angle (e.g., a drifting action, a spinning action, etc.), the sizes of the determination regions may be changed and reduced. When the player object PO performs an action of facing in a direction different from the direction of the steering wheel angle, the direction input by the user may fall within a determination region despite the operating user's intention. Therefore, by reducing the determination regions according to the action of the player object PO, the operation determination can be less likely to be contrary to the user's intention.

In the above description, the movement direction of the player object PO is controlled based on the magnitude of the leftward/rightward component of an input of swiping the touch panel. As long as at least the magnitude of the leftward/rightward component is used, other operations and other direction components may additionally be used. As a non-limiting example, only if a predetermined operation (e.g., an operation of pressing down a predetermined operation button, or a touch operation on a predetermined operation button image) is being performed, the movement direction of the player object PO may be controlled based on the magnitude of the leftward/rightward component of an input of swiping the touch panel. As another non-limiting example, the movement direction of the player object PO may be controlled based on the magnitudes of the leftward/rightward component and upward/downward component of an input of swiping the touch panel. In this case, the leftward/rightward movement direction of the player object PO is controlled based on the upward/downward component and leftward/rightward component of a swipe input. As a non-limiting example, a rightward steering amount may be set to 2 if the leftward/rightward component and upward/downward component of a swipe input are +1.73 and +1.00, respectively.

The action of an item I is controlled based on the upward/downward component of an input of swiping the touch panel. As long as at least the upward/downward component is used, other operations and other direction components may additionally be used. As a non-limiting example, only if a predetermined operation (e.g., an operation of pressing down a predetermined operation button, or a touch operation on a predetermined operation button image) is being performed, the action of an item I may be controlled based on the magnitude of the upward/downward component of an input of swiping the touch panel. As another non-limiting example, the action of an item I may be controlled based on the upward/downward component and leftward/rightward component of an input of swiping the touch panel. In this case, the firing of an item I may be controlled based on the upward/downward component of a swipe input, and the direction of the item I fired may be controlled based on the leftward/rightward component of the swipe input.

While, in the above description, the movement direction of the player object PO is controlled based on the magnitude of the leftward/rightward component of an input of swiping the touch panel, other elements may be controlled. For example, in the case where a game image as viewed from the player object PO (i.e., a subjective view) is displayed, the movement direction of a virtual camera for generating the game image may be controlled based on the magnitude of the leftward/rightward component of an input of swiping the touch panel. In addition, although the action of an item I is controlled based on the upward/downward component of an input of swiping the touch panel, other elements may be controlled. For example, actions such as an action of firing a beam, an action of changing pieces of equipment, an action of changing targets, and an action of changing viewing fields or viewing directions, may be controlled based on the upward/downward component of an input of swiping the touch panel.

In the above non-limiting example, if the conditions that the length of the vector FD is greater than or equal to a predetermined length and the direction of the vector FD is within a determination region, the ready-to-use item IP is fired as the projectile item IM in a direction based on the determination. Alternatively, the ready-to-use item IP may be fired as the projectile item IM with other timing. For example, if the conditions that the length of the vector FD is greater than or equal to a predetermined length and the direction of the vector FD is within a determination region are satisfied, then when a touch is released from the touch panel, the ready-to-use item IP may be fired as the projectile item IM in a direction based on the determination.

While, in the non-limiting example, the position (ready-to-use position) where an item I is fired as the projectile item IM is set to a rear portion of the cart driven by the player object PO, an item I may be fired at other positions. As a non-limiting example, the projectile item IM may be fired from other portions of the cart driven by the player object PO, such as a front portion of the cart driven by the player object PO, or from near the cart. As another non-limiting example, the ready-to-use position may be set at a firing position provided at an upper or lower end of the display screen or outside the course, and the projectile item IM may be fired from such a position away from the cart driven by the player object PO.

The speed at which the fired projectile item IM moves may be set according to the type of the projectile item IM, or may be changed according to the user's input. For example, the speed at which the fired projectile item IM moves may be changed according to the speed of a swipe input for firing the projectile item IM (the speed at which a touch position is moved during the swipe input).

In the above description, if the length of the vector FD is greater than or equal to a predetermined length and the direction of the vector FD is within a determination region, it is determined that a swipe input has been performed on the touch panel in the upward direction or downward direction of the display device, and the ready-to-use item IP is fired as the projectile item IM in a direction based on the determination. Alternatively, the direction of a swipe input may be determined using the touch input path. For example, if the length of the touch input path formed between the reference coordinate point Rm and the current touch position coordinate point T is greater than or equal to a predetermined length, and the direction of the vector FD is within a determination region, it may be determined that a swipe input has been performed on the touch panel in the upward direction or downward direction of the display device. In that case, the determination that the length of the touch input path formed between the reference coordinate point Rm and the current touch position coordinate point T is greater than or equal to a predetermined length corresponds to another non-limiting example of a determination that a coordinate change of a user's input with reference to a second reference coordinate point is greater than or equal to a reference value.

Here, in the case where the direction of a swipe input is determined using the difference between a touch position coordinate point T a predetermined time before and a current touch position coordinate point T, the determination of the swipe input direction is not completed until the predetermined time has passed since the initial touch. As a non-limiting example, in the case where the determination of the swipe input direction is performed using a condition that the difference between the touch position coordinate point T of a touch performed 0.5 sec before and the current touch position coordinate point T is greater than or equal to a predetermined value, the swipe input determination may not be performed for 0.5 sec even when great swiping is performed immediately after the initial touch. This may reduce responsiveness for firing an item, which may feel unnatural to the user. Meanwhile, in the case where the swipe input direction is determined using the length of the touch input path formed between the reference coordinate point Rm and the current touch position coordinate point T, when great swiping is performed immediately after the initial touch, the swipe input direction is immediately determined, and therefore, responsiveness for firing an item is improved, so that the user does not feel unnatural.

Note that as described above, when the length of the touch input path is greater than the threshold L, more previous records are deleted from the records of touch position coordinate points T at a predetermined rate until the length of the touch input path is smaller than the threshold L, and after the deletion, the most previous touch position coordinate point T is set as the reference coordinate point Rm. Thus, when the length of the touch input path is greater than the threshold L, the process of resetting a more recent touch position coordinate point T of the records of touch position coordinate points T as a new reference coordinate point Rm is repeatedly performed until the length of the touch input path is smaller than or equal to the threshold L. The resultant touch input path and reference coordinate point Rm are used to perform the above determination of the swipe input direction. In the case where the process of resetting a more recent touch position coordinate point T of the records of touch position coordinate points T as a new reference coordinate point Rm is thus performed, it is desirable that the "predetermined length" in the above condition that the length of the touch input path formed between the reference coordinate point Rm and the current touch position coordinate point T is greater than or equal to a predetermined length, which is a determination condition for determining that a swipe input has been performed, should be set smaller than the threshold L.

Alternatively, the reference coordinate point Rm may be reset based on a period of time for which a touch input is being performed. For example, only a portion of the records of touch position coordinate points T stored as the touch input path formed between the reference coordinate point Rm and the current touch position coordinate point T that corresponds to a predetermined number of times of processing (e.g., five records of touch position coordinate points T corresponding to five frames) may be stored, and the swipe input direction may be determined using the portion of the records. As a non-limiting example, a value obtained by comparing a touch position coordinate point T that is the most previous of the records and the current touch position coordinate point T that is the most recent record may be used as the touch input path. In this case, the touch position coordinate point T that is the most previous record serves as the reference coordinate point Rm. Thus, when the length of a touch input time for which a touch operation is continued to generate a touch input path is greater than a predetermined time (e.g., five frames), the process of resetting a newer touch position coordinate point T of the records of touch position coordinate points T as a new reference coordinate point Rm is repeatedly performed so that the time it takes to generate the touch input path becomes smaller than or equal to the predetermined period of time, and the resultant touch input path and reference coordinate point Rm are used to perform the above determination of the swipe input direction. Note that if the records are not many enough for the predetermined number of times of processing, a value obtained by comparing a touch position coordinate point T that is the most previous record and the current touch position coordinate point T that is the most recent record may be used as the touch input path. Note that these features of resetting of the reference coordinate point Rm based on the period of time for which a touch input is being performed can be applied, as appropriate, to either the process using the "vector FD" or the process using the "touch input path."

The predetermined length that is a threshold for determining the length of the vector FD or the length of the touch input path may be set differently between the determination of an upward swipe operation and the determination of a downward swipe operation. As a non-limiting example, the predetermined length set for the determination of a downward swipe operation may be smaller than the predetermined length set for the determination of an upward swipe operation so that a downward swipe operation that is relatively difficult can be more easily determined.

The predetermined length that is a threshold for determining the length of the vector FD or the length of the touch input path may be changed, depending on a period of time that has passed since the initial touch. As a non-limiting example, if the period of time for which a touch operation is continued is less than 0.2 sec, that period of time may be 0.25 times as long as the threshold that is set when the period of time is longer than or equal to 0.2 sec. As a result, when a swipe operation is performed immediately after the initial touch, the swipe operation can be easily determined.

The predetermined length that is a threshold for determining the length of the vector FD or the length of the touch input path may be set differently between the determination of a swipe operation in one direction and the subsequent determination of a swipe operation in the other direction. As a non-limiting example, when a touch operation is continued even after it is determined that a swipe operation has been performed in one of the upward direction and the downward direction, the predetermined length for determining a swipe operation in the other of the upward direction and the downward direction may be increased by a factor of 1.5. As a result, even in the case where the user tends to move their finger performing a touch operation backward to return the finger to the original touch position after performing a swipe operation in one direction, the determination of a swipe operation performed despite the user's intention can be prevented. Note that when the predetermined length that is a threshold for determining the length of the vector FD or the length of the touch input path is changed and increased, the threshold L for maintaining the length of the touch input path formed between the reference coordinate point Rm and the current touch position coordinate point T may also be changed and increased (e.g., the threshold L may be increased by a factor of 1.5).

An information processing program executed in the information processing apparatus 3 that determines the above swipe operation may have the following configuration.

The information program is executed by a computer included in an apparatus for performing a process based on a user's operation. The information processing program causes the computer to function as input reception means, coordinate storage means, reference coordinate setting means, path calculation means, and direction determination means. The input reception means receives a coordinate input from the user. The coordinate storage means sequentially stores coordinate points of the coordinate input continuously performed. The reference coordinate setting means sets, as a reference coordinate point, one of the coordinate points stored in the coordinate storage means. The path calculation means calculates the length of a coordinate input path, where the reference coordinate point is the start point. The direction determination means determines a direction indicated by a coordinate input using at least two coordinate points input after the reference coordinate point, of the coordinate points stored in the coordinate storage means. The reference coordinate setting means, when the length of the path is greater than a predetermined threshold, repeats a process of setting a more recent coordinate point as the reference coordinate point, of the coordinate points stored in the coordinate storage means, until the length of the path is smaller than or equal to the predetermined threshold.

The information processing program may cause the computer to further function as game operation execution means. The game operation execution means may determine a direction of a predetermined game operation, based on a direction determined by the direction determination means, and execute the game operation.

The game operation execution means may determine a direction of a game operation and execute the game operation when a difference between two coordinate points input after the reference coordinate point, of the coordinate points stored in the coordinate storage means, is greater than or equal to a predetermined value.

The two coordinate points may be the reference coordinate point and the most recent coordinate point of the coordinate input.

The game operation execution means may determine a direction of a game operation and execute the game operation when the length of the path is greater than or equal to a predetermined value.

Figure 10:
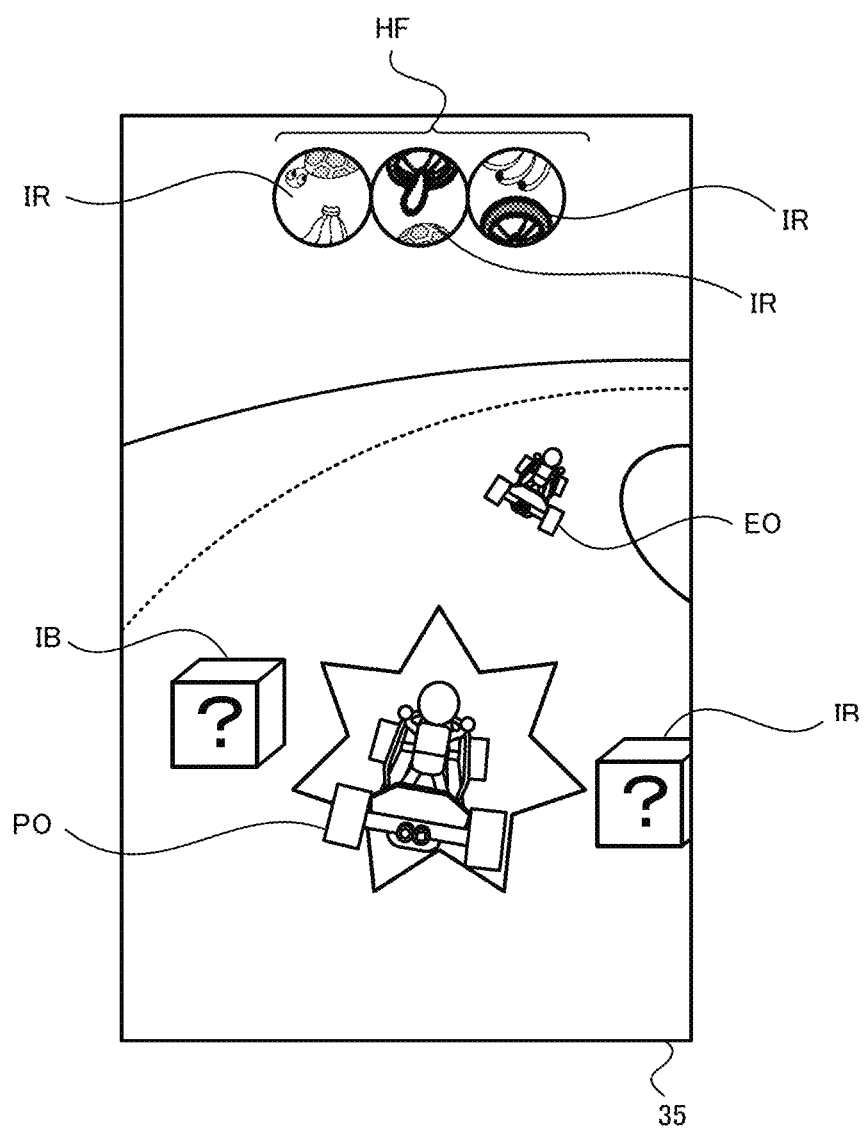
FIG. 10 is a diagram showing a non-limiting example game image displayed on the display unit 35 of the information processing apparatus 3.
Figure 11:
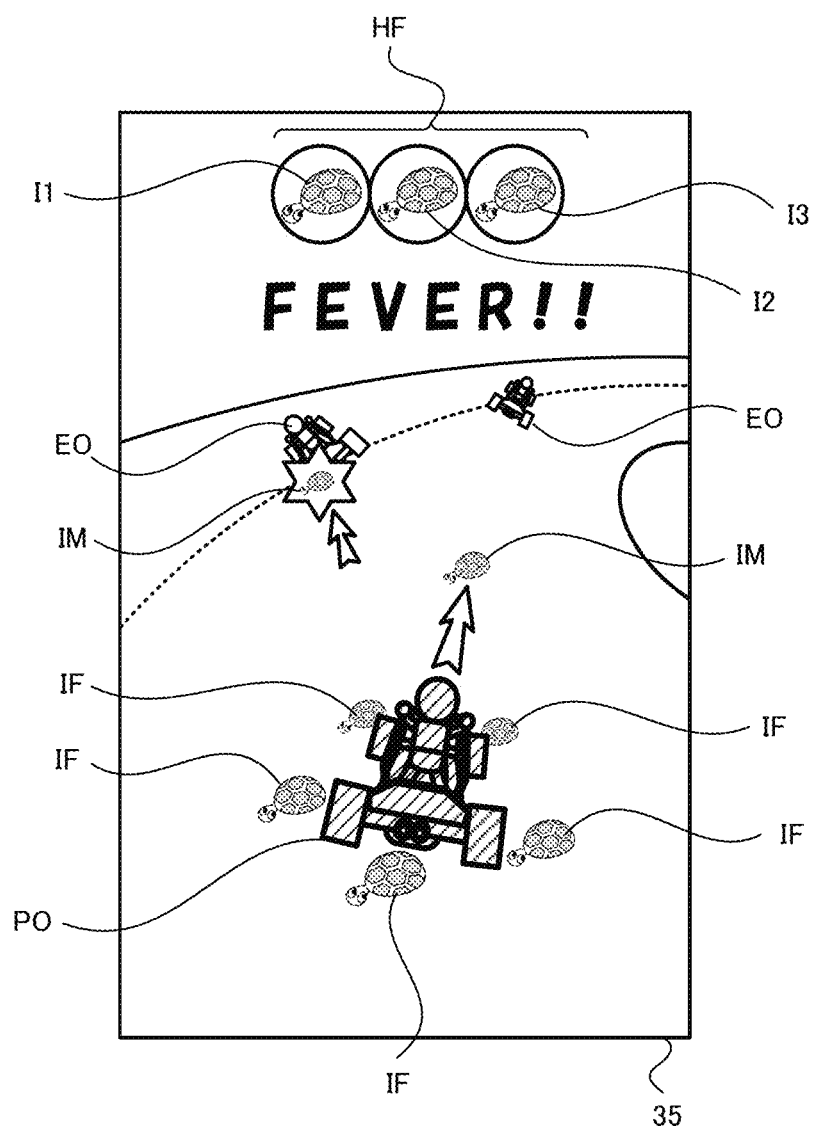
FIG. 11 is a diagram showing a non-limiting example game image displayed on the display unit 35 of the information processing apparatus 3.
Figure 12:
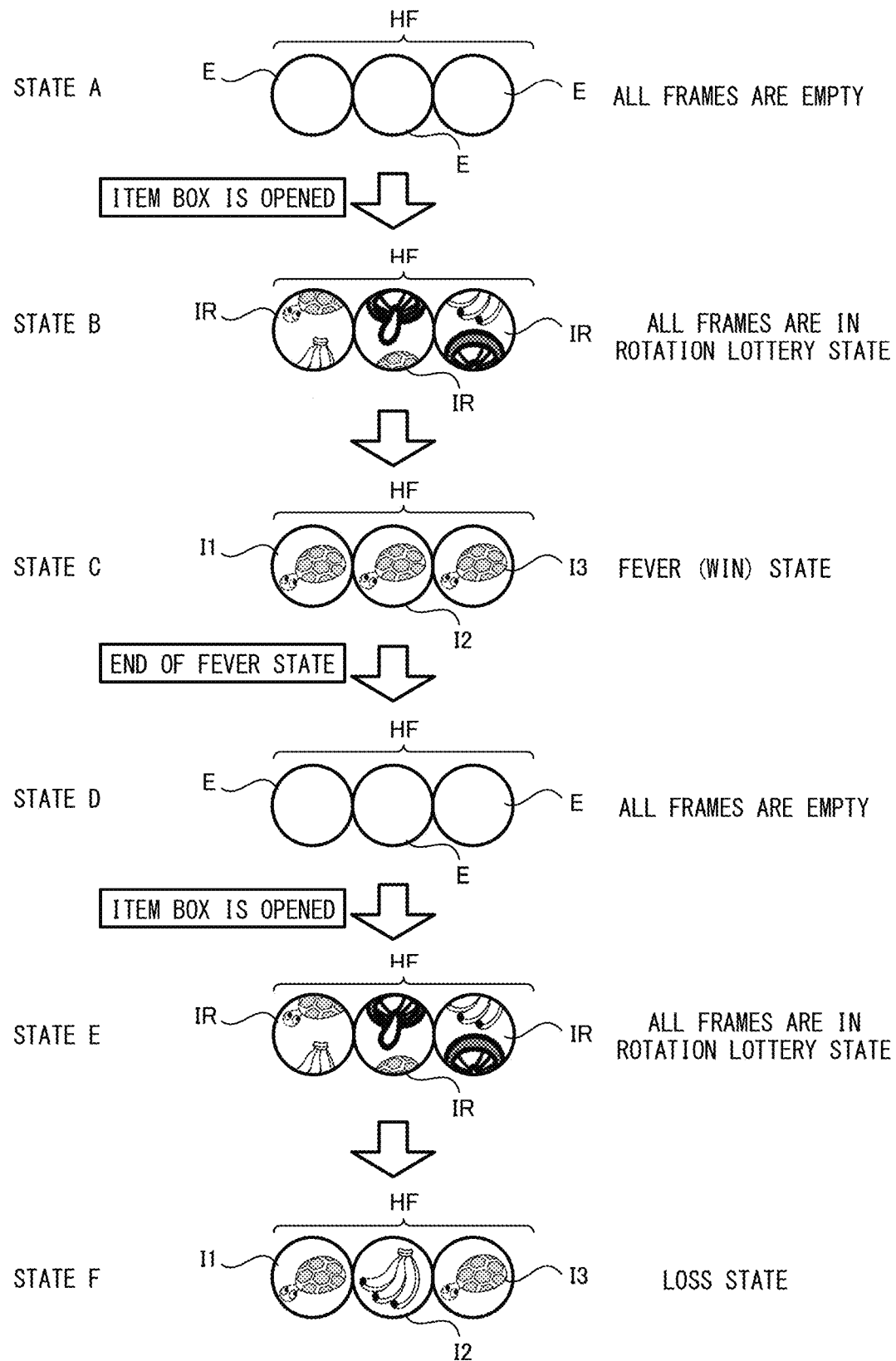
FIG. 12 is a diagram showing a non-limiting example of state transition of items I possessed in possession frames HF.
Figure 13:
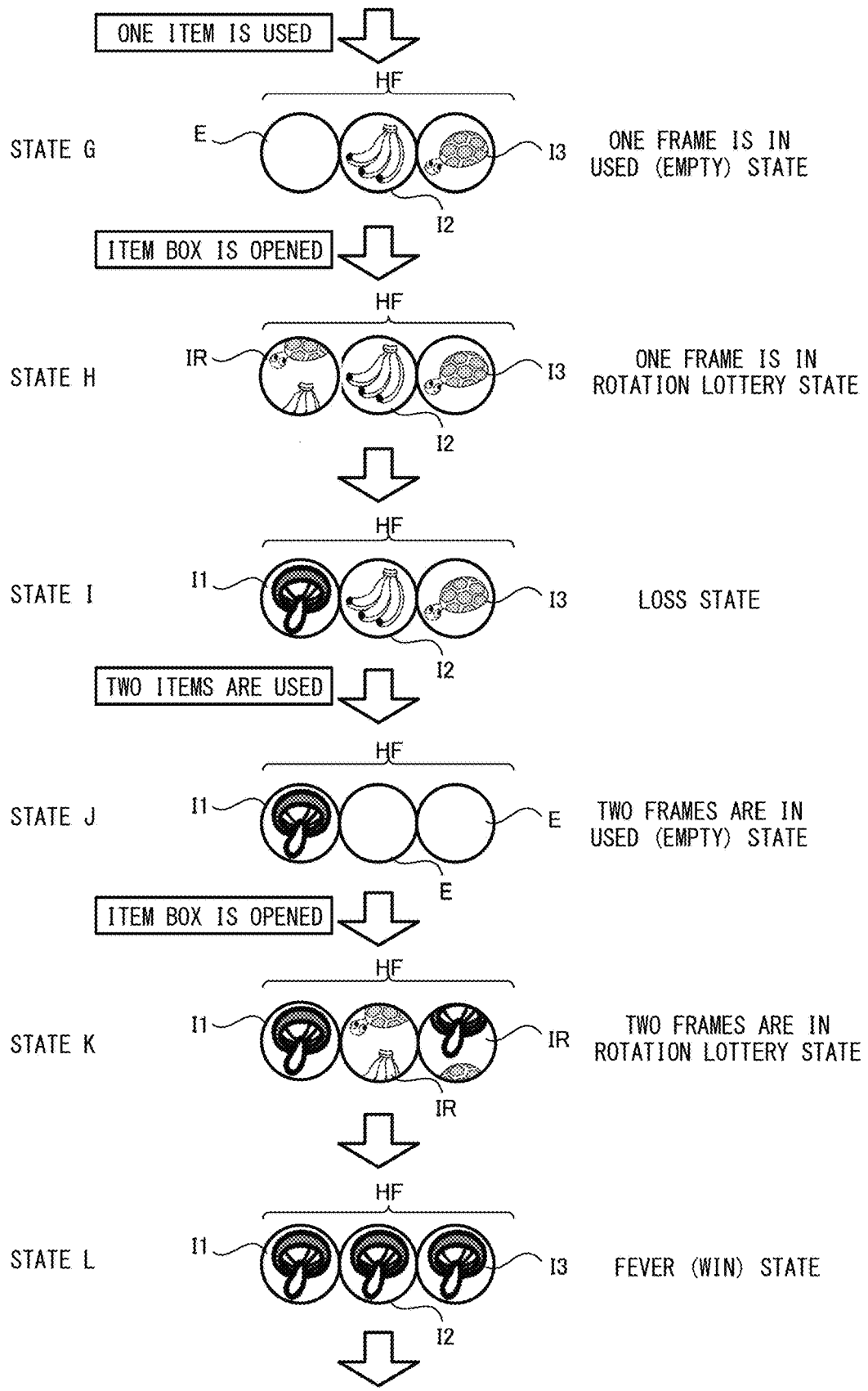
FIG. 13 is a diagram showing another non-limiting example of state transition of items I possessed in possession frames HF.

Next, a first item lottery process non-limiting example performed in the information processing system 1 will be outlined with reference to FIGS. 10-14. In the first item lottery process non-limiting example, if items I (game objects) possessed by the player object PO satisfy a predetermined combinational condition, an effect relatively advantageous to progression of a game is given to the player object PO. Note that FIG. 10 is a diagram showing a non-limiting example game image displayed on the display unit 35 of the information processing apparatus 3. FIG. 11 is a diagram showing a non-limiting example game image displayed on the display unit 35 of the information processing apparatus 3. FIG. 12 is a diagram showing a non-limiting example state transition of items I possessed in the possession frames HF. FIG. 13 is a diagram showing another non-limiting example state transition of items I possessed in the possession frames HF. FIG. 14 is a diagram showing a non-limiting example lottery table.

As in FIGS. 4 and 5, in FIG. 10, a game image corresponding to a game played in the information processing apparatus 3 is displayed on the display unit 35 of the information processing apparatus 3. As a non-limiting example, FIG. 10 shows a scene that the player object PO performs a racing game. For example, in the game, the player object PO is sitting on and driving a cart on a course provided in a virtual world, and can acquire a new item I by passing by or through an item box IB placed on the course and thereby opening the item box IB. Note that the player object PO can acquire a new item I only if there is a possession frame HF that is an empty frame E.

When the player object PO passes by or through an item box IB and thereby opens the item box IB, a lottery event for acquiring a new item I is performed. For example, a lottery event display (hereinafter referred to a rotation lottery display) that a plurality of types of items I are shuffled and successively displayed in a possession frame HF that is an empty frame E in a drum-spin or flip fashion, and thereafter, any one of the items I is displayed in a stationary state in the possession frame HF, showing that the item I displayed in a stationary state in the possession frame HF is finally acquired in the lottery. For example, FIG. 10 shows a non-limiting example in which in response to the player object PO passing by or through an item box IB, rotating display items IR indicating that a plurality of types of items I are successively displayed and a lottery is being performed are displayed, i.e., the rotation lottery display is being performed, in all the possession frames HF (three frames). Note that the lottery for acquiring an item I is not performed for a possession frame HF in which an item I is already displayed. Specifically, when a possession frame HF that is an empty frame E and a possession frame HF that is displaying an item I coexist, the lottery is performed only for the empty frame E. When there is no possession frame HF that is an empty frame E, the lottery is not performed, and therefore, in this situation, the player object PO cannot acquire a new item I by a lottery. Note that even when the player object PO has not yet reached a position where an item box IB is placed, a lottery event for acquiring a new item I may be performed if the specific position where the item box IB is placed and the position of the player object PO have a predetermined positional relationship. For example, when the player object PO reaches within a predetermined distance of an item box IB, passes above or below an item box IB, or passes through a ring-shaped item box IB, a lottery event for acquiring a new item I may be performed. Note that an item box IB may be placed at a specific position on the course, or may appear on the course at any suitable position as time passes.

Items I that are displayed in a stationary state in possession frames HF are finally acquired by the player object PO through a lottery. After the acquisition, the items I can be used by the player object PO one by one in a predetermined order (e.g., the order in which the items I have been acquired). By using an item I, the player object PO can obtain an effect advantageous to progression of a race.

As shown in FIG. 11, in the non-limiting example, if the same items I are finally displayed in all the possession frames HF in a lottery, the user wins a so-called "fever state" and can obtain an effect more advantageous to progression of a race performed by the player object PO. As a non-limiting example, when the player object PO is in the "fever state," an item that has caused the "fever state" can be continuously used for a predetermined fever period of time. Note that as can be seen from the description below, a unique object ID is set for each item I, and whether or not the "fever state" has been established is determined using objects ID set in the possession frames HF. Note that the fever period may be varied, depending on equipment or the like used by the player object PO.

For example, in the non-limiting example of FIG. 11, the item I1 that is a carapace is displayed in a stationary state in the leftmost possession frame HF, the item I2 that is a carapace is displayed in a stationary state in the middle possession frame HF, and the item I3 that is a carapace is displayed in a stationary state in the rightmost possession frame HF, i.e., the same carapace item I is finally displayed in all the possession frames HF in a lottery. In this case, the "fever state" caused by carapace items is continued for a predetermined period of time, and an advantageous effect obtained by using a carapace item is given to the player object PO only during the predetermined fever period. For example, in the "fever state" caused by carapace items, a plurality of carapace items IF are disposed around the player object PO, indicating the "fever state" caused by carapace items to the user. When the user is performing a certain touch operation on the touch panel, a projectile carapace item IM is continually fired toward the front of the player object PO at predetermined intervals. Thus, while a single projectile carapace item IM can be fired from the player object PO when a carapace item I is used in a normal state, multiple projectile carapace items IM can be continually fired from the player object PO in the "fever state" caused by carapace items. In the "fever state," a projectile carapace item IM is continually fired at predetermined intervals without performing a swipe operation for firing the item. Therefore, an item can be repeatedly used while controlling the movement direction of the player object PO by a touch operation. Furthermore, while an item I can be used once for each possession frame HF in the normal state, i.e., the same number of items I as the possession frames HF (e.g., three) can be used, an indefinite number of items (i.e., greater than or equal to the number of possession frames HF, e.g., four or more) can be continually used without being limited to the number of possession frames HF during the fever period in which the "fever state" caused by the same three items I is continued. Therefore, the fever state is more advantageous to the user than in the normal state.

Note that in the "fever state," the direction of the projectile item IM fired from the player object PO may be fixed to a predetermined direction (e.g., the direct forward direction of the player object PO), or may be fired in a random direction around the player object PO each time. When, in the "fever state," the vector FD satisfying the condition for firing the projectile item IM (i.e., the length of the vector FD is greater than or equal to a predetermined length and the direction of the vector FD is within the forward-direction determination region UA or the backward-direction determination region LA) is set, the projectile item IM may be fired based on the direction of the vector FD each time.

In the "fever state," the number of items IF that are disposed and displayed around the player object PO may be reduced as time passes during the fever period. This allows the user of the information processing apparatus 3 to know the remaining time of the fever period from the number of displayed items IF. Note that an image for notifying the user of the remaining time of the fever period by reducing the number of displayed items IF may not be of a plurality of items IF disposed around the player object PO. For example, the number of items I displayed in the possession frames HF may be reduced as time passes during the fever period.

Next, a non-limiting example progression of a game in which a new item I is acquired through a lottery (the states of possession frames HF transition) will be described with reference to FIGS. 12 and 13.

In FIG. 12, in a state A in which the possession frames HF are in an initial state, all the possession frames HF are an empty frame E. In the state A, when the player object PO passes by or through an item box IB and thereby opens the item box IB, an item lottery is performed for all the possession frames HF. As a result, a state B occurs in which the rotation lottery display of a rotating display item IR is performed in each possession frame HF. Note that in the state B, the probability of winning the "fever state" is controlled, which is described below.

When the item lottery is won to get the "fever state" in the state B, a state C occurs in which the same item I is finally displayed in a stationary state in all the possession frames HF. For example, in the state C, a carapace item I1 is displayed in a stationary state in the leftmost possession frame HF, a carapace item I2 is displayed in a stationary state in the middle possession frame HF, and a carapace item I3 is displayed in a stationary state in the rightmost possession frame HF. Thus, in the state C, it is shown that as a result of the item lottery in the state B, the user has won the "fever state" caused by carapace items in which the same carapace item I is finally displayed in all the possession frames HF. As a result, the player object PO performs a race in the "fever state" caused by carapace items.

When a predetermined fever period has passed since the occurrence of the "fever state" caused by carapace items, a state D occurs in which the "fever state" of the player object PO ends, and all the possession frames HF are an empty frame E. Thus, all the possession frames HF are an empty frame E, and therefore, an item lottery can be performed again for all the possession frames HF.

In the state D, when the player object PO passes by or through another item box IB and thereby opens the item box IB, an item lottery is performed again for all the possession frames HF. As a result, a state E occurs in which the rotation lottery display of a rotating display item IR is performed for all the possession frames HF.

When the item lottery is lost in the state E, a state F occurs in which at least one different item I is finally displayed in a stationary state in all the possession frames HF. For example, in the state F, the same carapace items I1 and I3 are displayed in a stationary state in the leftmost and rightmost possession frames HF, and a different item I2 (banana) is displayed in a stationary state in the middle possession frame HF. Thus, in the state F, it is shown that the item lottery in the state E is lost. The items I1-I3 displayed in the possession frames HF in the state F can be individually used by the player object PO.

In FIG. 13, when the item I1 displayed in the leftmost possession frame HF in the state F has been used, a state G occurs in which the leftmost possession frame HF is an empty frame E. Thus, when at least one possession frame HF is an empty frame E, an item lottery can be performed for the empty frame E.

In the state G, when the player object PO passes by or through another item box IB and thereby opens the item box IB, an item lottery is performed for the empty frame E that is the leftmost possession frame HF. As a result, a state H occurs in which the rotation lottery display of a rotating display item IR is performed only for the empty frame E that is the leftmost possession frame HF. However, in the state H, the different items I2 and I3 are already finally displayed in the middle possession frame HF and the rightmost possession frame HF, and therefore, the item lottery is lost even when any item I is finally displayed in the empty frame E that is the leftmost possession frame HF, so that a state I occurs in which an item I1 is displayed in a stationary state in the leftmost possession frame HF. As a non-limiting example, the items I displayed in the possession frames HF can be used in a first-in, first-out (FIFO) method. Specifically, in the state I, the item I1 has most recently been acquired of the items I1-I3 displayed in the possession frames HF, and therefore, the item T1 is the last to be used when the player object PO uses the items I1-I3. Note that the order in which the items I displayed in the possession frames HF are used is not limited to the FIFO (first-in, first out) method. For example, an item I to be used may be selected by the user performing an operation of selecting that item displayed in a possession frame HF (e.g., an operation of touching that item I on the touch panel).

When the item I2 displayed in the middle possession frame HF and the item I3 displayed in the rightmost possession frame HF in the state I have been used, a state J occurs in which the middle and rightmost possession frames HF are an empty frame E. Thus, the two possession frames HF are an empty frame E, and therefore, an item lottery can be performed for the two empty frames E.

In the state J, when the player object PO passes by or through another item box IB and thereby opens the item box IB, an item lottery is performed for the empty frames E that are the middle and rightmost possession frames HF. As a result, a state K occurs in which the rotation lottery display of a rotating display item IR is performed for the empty frames E that are the middle and rightmost possession frames HF. Here, although the item I1 is already finally displayed in the leftmost possession frame HF in the state J, the "fever state" can be won if the same type of item I as the item I1 is finally displayed in the empty frames E that are the middle and rightmost possession frames HF.

When the item lottery in the state K is won to get the "fever state," a state L occurs in which the same type of item I as the item I1 is finally displayed in a stationary state in the middle and rightmost possession frames HF. For example, in the state L, the item I1 that is a mushroom is displayed in a stationary state in the leftmost possession frame HF, the item I2 that is a mushroom is displayed in a stationary state in the middle possession frame HF, and the item I3 that is a mushroom is displayed in a stationary state in the rightmost possession frame HF. Thus, in the state L, it is shown that as a result of the item lottery in the state K, the "fever state" caused by mushroom items in which the same mushroom item I is finally displayed in all the possession frames HF is won. As a result, the player object PO performs a race in the "fever state" caused by mushroom items.

Thus, in the first item lottery process non-limiting example performed in the information processing system 1, at least one is selected from items I included in a plurality of possession frames and is used, and therefore, an in-game effect can be obtained based on the type of the selected item I, and a possession frame in which that item I is displayed is changed to an empty frame E after the occurrence of the in-game effect. In addition, when the condition that all items I included in the plurality of possession frames are the same item is satisfied in an item lottery, the above in-game effect can provide a more advantageous in-game effect.

Next, a non-limiting example lottery table that sets probabilities of winning the "fever state" will be described with reference to FIG. 14.

In FIG. 14, the lottery table describes, the probability of winning the "fever state" is described for each combination of the number of possession frames HF that are an empty frame E and the type of an item I that causes the "fever state." In the lottery table, the total probability of winning that is the sum of the probabilities of the items I, is also described.

For example, in the lottery table of FIG. 14, in an item lottery in which all the possession frames HF are an empty frame E and are in a rotation lottery state (all-frame rotation), the probability of winning using a carapace item is set to 10%, the probability of winning using a banana item is set to 10%, and the probability of winning using a mushroom item is set to 10%. In the lottery table, in an item lottery in which a carapace item I is finally displayed in one or two possession frames HF, and the remaining possession frames HF are an empty frame E (i.e., a possession frame HF that is an empty frame E and a possession frame HF in which a carapace item I is finally displayed coexists) and are in a rotation lottery state (non-all-frame rotation), the probability of winning using a carapace item is set to 10%, and the probability of winning using each of banana and mushroom items is set to 0%. Also, in the lottery table, in an item lottery in which a banana item I is finally displayed in one or two possession frames HF, and the remaining possession frames HF are an empty frame E (i.e., a possession frame HF that is an empty frame E and a possession frame HF in which a banana item I is finally displayed coexists) and are in a rotation lottery state (non-all-frame rotation), the probability of winning using a banana item is set to 10%, and the probability of winning using each of carapace and mushroom items is set to 0%. Also, in the lottery table, in an item lottery in which a mushroom item I is finally displayed in one or two possession frames HF, and the remaining possession frames HF are an empty frame E (i.e., a possession frame HF that is an empty frame E and a possession frame HF in which a mushroom item I is finally displayed coexists) and are in a rotation lottery state (non-all-frame rotation), the probability of winning using a mushroom item is set to 10%, and the probability of winning using each of carapace and banana items is set to 0%.

In the lottery table, the probability of winning using any item in all-frame rotation is set to 30%, and the probability of winning using any item in non-all-frame rotation is set to 10%. Thus, in the case where the lottery table is used, the probability of winning the "fever state" is highest when an item lottery is performed in which all the possession frames HF are an empty frame E. This is because the probability of winning an item lottery in any state is the same for all items. Therefore, by the use of such a lottery table, the strategy of leaving an item I that is desired by the user finally displayed in a possession frame HF and thereby increasing the winning probability using that item I can be prevented.

Note that the lottery table may be managed by the server 200, and when a game is started in the information processing apparatus 3, the lottery table may be transmitted from the server 200 to the information processing apparatus 3. In this case, the server 200 may transmit a different lottery table, depending on the timing of gameplay, the level of the user of the information processing apparatus 3, etc. The server 200 may set a different lottery table to be used, depending on the situation of a game. For example, the server 200 may set a different lottery table, depending on the number of laps in a race, the standing in a race, the type of a course or a race, the type of the player object PO, etc. As a non-limiting example, in the lottery table, the probability of winning the "fever state" may be set higher as a race is closer to the end or as the number of laps finished increases. As another non-limiting example, a different lottery table may be set, depending on equipment used in a race by the player object PO. For example, when the player object PO uses a special piece of equipment, the probability of winning the "fever state" may be set higher in a lottery table.

When the "fever state" is won, the effect of an item I causing the win as well as another effect may be given to the player object PO. As a non-limiting example, when the "fever state" caused by carapace items is won, the effect of continually firing a projectile carapace item IM as well as the effect of increasing or decreasing the traveling speed of the player object PO may be given to the player object PO during the fever period. As another non-limiting example, when the "fever state" caused by carapace items is won, the effect of continually firing a projectile carapace item IM as well as the defensive effect of keeping the player object PO traveling without an influence even when being attacked by the opponent object EO or colliding with other objects, may be given to the player object PO during the fever period. As a non-limiting example, even when a projectile carapace item IM fired by the player object PO is returned to the player object PO itself, the player object PO repels or avoids the projectile carapace item IM so that the traveling of the player object PO is not affected, and therefore, in the "fever state," the user can fire a projectile carapace item IM without caring an influence on the player object PO itself.

A special item (e.g., a "lucky 7" item) may be set which provides the effects of a plurality of types of items I. For example, in the above item lottery, when the special item is finally displayed in all the possession frames HF and the "fever state" caused by the special items is won, the effect of successively giving the effects of a plurality of items appearing in the game is given to the player object PO during the fever period. Meanwhile, when the item lottery is lost with the special item existing in at least one possession frame HF, the special item is removed from that possession frame HF without getting the effect of the special item that would be obtained when used alone, and the possession frame HF is changed to an empty frame E.

In the non-limiting example, the player object PO can acquire a new item I only if there is a possession frame HF that is an empty frame E. Alternatively, even when there is no possession frame HF that is an empty frame E, a new item I may be able to be acquired. In this case, even when there is no possession frame HF that is an empty frame E, an item lottery can be performed, and the possession frames HF in which an item I is being displayed are put into the rotation lottery state. When an empty frame E and a frame in which an item I is being displayed coexist among the possession frames HF, not only the empty frame E but also the possession frame HF in which an item I is being displayed may be put into the rotation lottery state in an item lottery. When a possession frame HF in which an item I is being displayed is put into the rotation lottery state and an item lottery is performed, the possession frame HF may not be changed to an empty frame E after the item I is used.

In the above non-limiting example, the "fever state" is won if all possession frames HF have the same item I. Alternatively, the condition under which the "fever state" is won using items I may be other combinational conditions. As a non-limiting example, in the case where there are four possession frames HF, the "fever state" is won if at least three of the possession frames HF have the same item I. As another non-limiting example, the "fever state" may be won if three possession frames HF have a specific combination of items I (e.g., mushroom-carapace-banana).

After the "fever state" is won, the player object PO may be put into the "fever state" immediately or a predetermined period of time after the user is notified of the win. Alternatively, after the "fever state" is won, the player object PO may be put into the "fever state" in response to the user's predetermined operation.

The probability of winning the "fever state" and the types of items I that are displayed in a stationary state in possession frames HF may be controlled according to a rule that is different from the control performed based on the lottery table. For example, the probability of winning the "fever state" and the types of items I that are displayed in a stationary state in possession frames HF may be controlled randomly or based on the timing at which an item box IB is opened, or such that items I are displayed in a stationary state in possession frames HF in a predetermined order.

Figure 15:
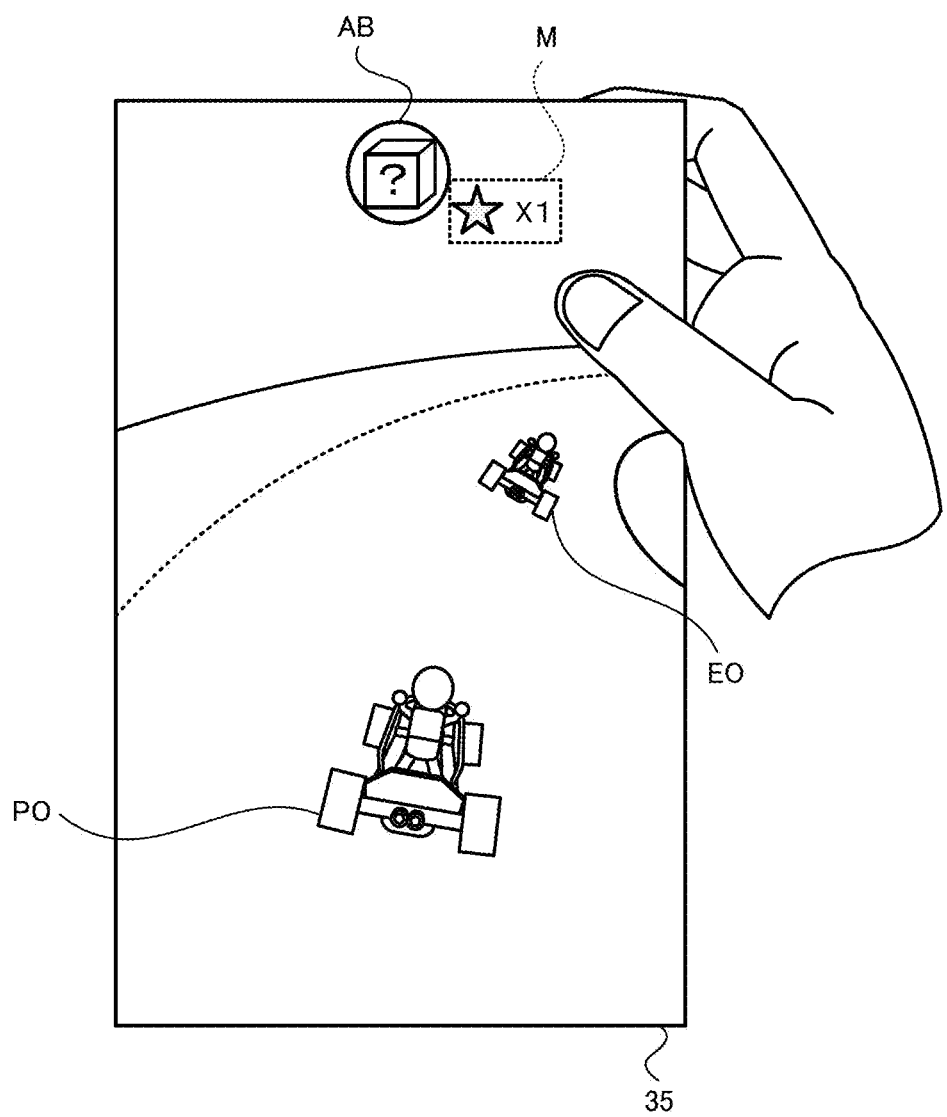
FIG. 15 is a diagram showing a non-limiting example game image displayed on the display unit 35 of the information processing apparatus 3.
Figure 17:
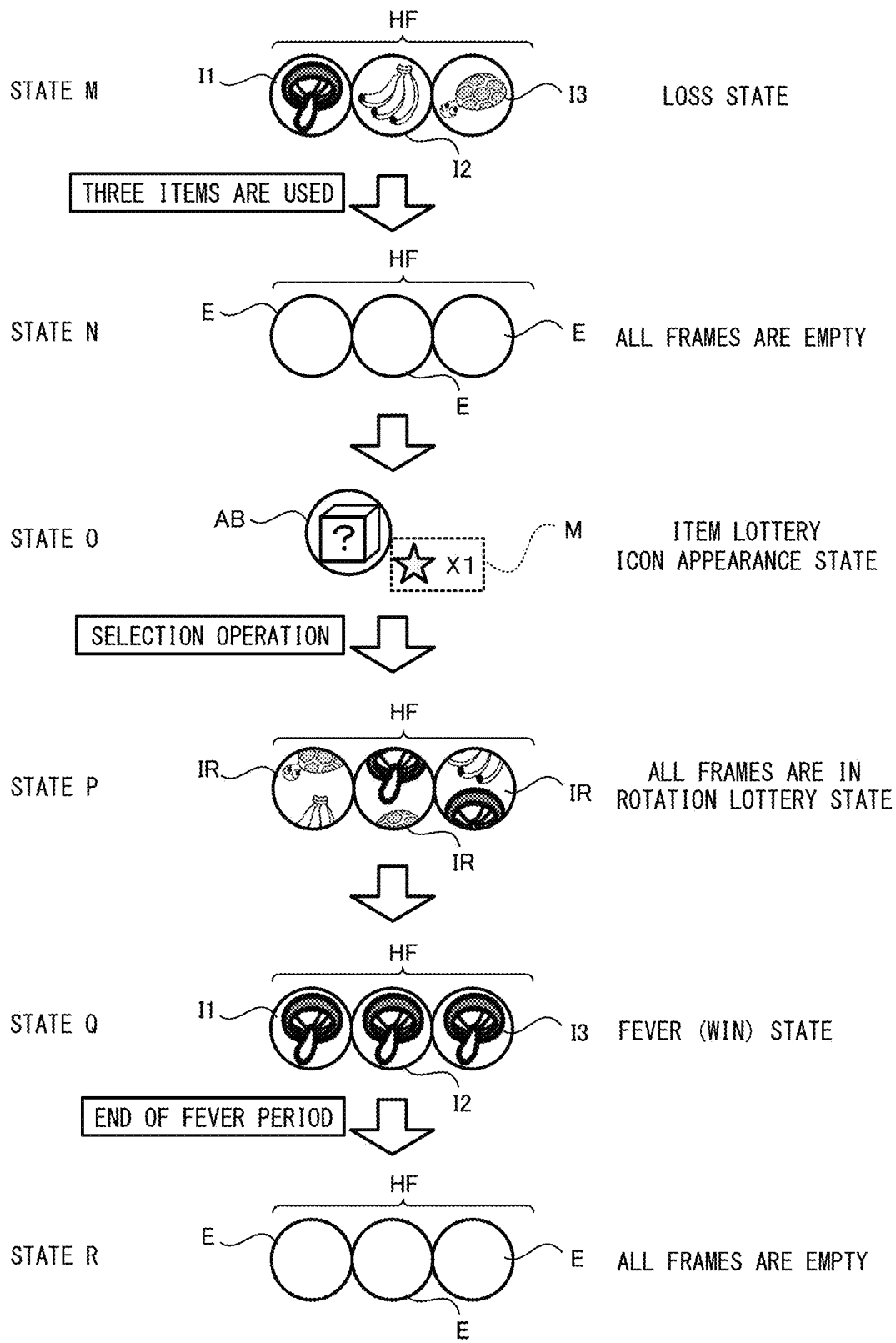
FIG. 17 is a diagram showing a non-limiting example of state transition of items I possessed in possession frames HF and an item lottery icon AB.
Figure 18:
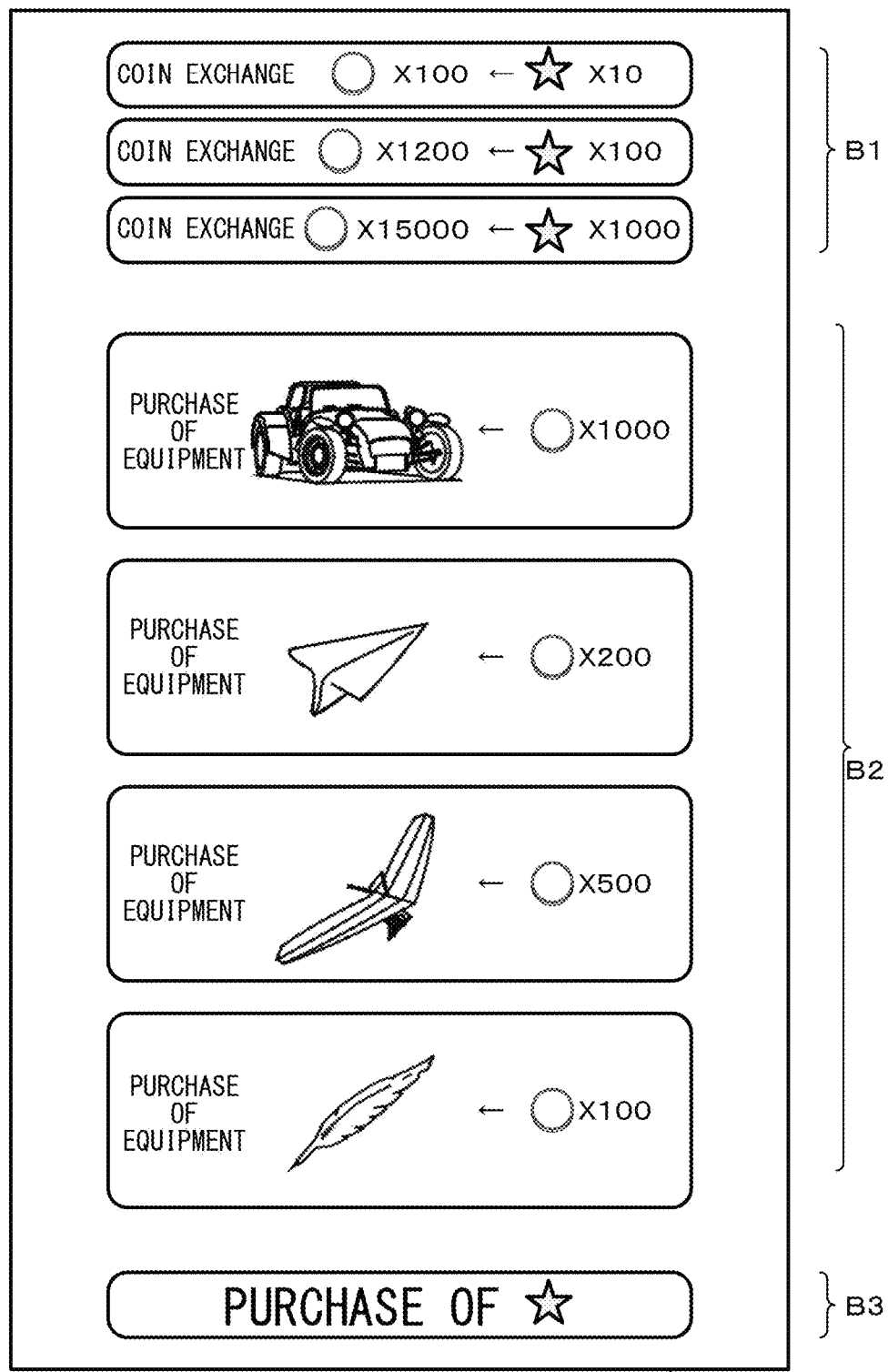
FIG. 18 is a diagram showing a non-limiting example game image displayed on the display unit 35 of the information processing apparatus 3.

Next, a second item lottery process non-limiting example that is performed in the information processing system 1 will be outlined with reference to FIGS. 15-18. In the second item lottery process non-limiting example, an item lottery can be performed without opening an item box IB provided in a race if a predetermined condition is satisfied. Note that FIG. 15 is a diagram showing a non-limiting example game image displayed on the display unit 35 of the information processing apparatus 3. FIG. 16 is a diagram showing a non-limiting example game image displayed on the display unit 35 of the information processing apparatus 3. FIG. 17 is a diagram showing a non-limiting example state transition of items I possessed in possession frames HF and an item lottery icon AB. FIG. 18 is a diagram showing a non-limiting example game image displayed on the display unit 35 of the information processing apparatus 3.

As in FIGS. 4 and 5, in FIG. 15, the display unit 35 of the information processing apparatus 3 displays a game image corresponding to a game played in the information processing apparatus 3. As a non-limiting example, FIG. 15 shows a scene in which the player object PO performs a racing game. For example, in the game, the player object PO is sitting on and driving a cart on a course provided in a virtual world. If a predetermined condition is satisfied when the player object PO is traveling, an item lottery icon AB appears instead of the possession frames HF.

The item lottery icon AB functions as an operation instruction button that is selected and executed by the user's touch operation. Money amount information M that indicates the amount of virtual money that is consumed when the item lottery icon AB is selected and executed is provided near the item lottery icon AB. In the non-limiting example of FIG. 15, the money amount information M indicates that when the item lottery icon AB is used, a piece of star-shaped virtual money that can be acquired by the user by payment is consumed. Note that the item lottery icon AB and the money amount information M appear if all the possession frames HF are an empty frame E, and do not appear if the number of times of use exceeds a limit (e.g., once a race) due to consumption or if the user does not have enough virtual money to use the item lottery icon AB. For example, when the item lottery icon AB is used by a touch operation (e.g., a tap operation) on the item lottery icon AB displayed on the touch panel, an item lottery event for acquiring a new item I is started. Note that the state in which the item lottery icon AB does not appear may be such that the item lottery icon AB is not displayed on the display screen, or such that the item lottery icon AB may be displayed grayed-out or translucent. Even in a state in which the item lottery icon AB is not allowed to be selected, the item lottery icon AB may be displayed on the display screen. In this case, even when the user performs an operation of selecting the item lottery icon AB, the item lottery icon AB provokes no response.

As shown in FIG. 16, when the item lottery icon AB is used, the possession frames HF appear instead of the item lottery icon AB and the money amount information M. As in the first item lottery process non-limiting example, a rotating display item IR indicating the rotation lottery display state is displayed in all the possession frames HF, and thereafter, any item I is displayed in a stationary state in each frame, indicating that the items I have finally been displayed in a stationary state and acquired in a lottery.

Even in an item lottery triggered by using the item lottery icon AB, items I that are displayed in a stationary state in possession frames HF are finally acquired by the player object PO through the lottery, and after the acquisition, the player object PO can use the acquired items one by one in a predetermined order using the above operation method. The player object PO can obtain an advantageous effect to progression of the game using the items I.

Even in an item lottery triggered by using the item lottery icon AB, when the same item I is finally displayed in all the possession frames HF through the lottery, the "fever state" is won and the player object PO can obtain a more advantageous effect to progression of a race. As in the first item lottery process non-limiting example, when the player object PO wins the "fever state," an item causing the "fever state" can be continually used only during a predetermined fever period.

Thus, in an item lottery triggered by using the item lottery icon AB, a new item I can be acquired or the "fever state" can be won, as in an item lottery triggered by opening an item box IB provided on the course. Therefore, the user can start a new item lottery whenever the item lottery icon AB appears, in addition to the situation where an item box IB is placed on the course. Note that an item lottery triggered by using the item lottery icon AB and an item lottery triggered by opening an item box IB may include more elements different therebetween.

As a first non-limiting example, a period of time for which an item lottery triggered by using the item lottery icon AB is performed (a rotation lottery event of an item I is performed) may be set shorter than a period of time for which an item lottery triggered by opening an item box IB is performed. As a result, when the item lottery icon AB is used, the time it takes for the player object PO to obtain an effect provided by acquiring a new item I or winning the "fever state" can be reduced, and as a result, the player object PO can obtain an advantageous effect earlier.

As a second non-limiting example, the probability of winning an item lottery triggered by using the item lottery icon AB to get the "fever state" may be set higher than the probability of winning an item lottery triggered by opening an item box IB to get the "fever state." As a result, when the item lottery icon AB is used, the probability that the player object PO obtains an effect provided by the "fever state" is increased, and therefore, the possibility that the player object PO can obtain an advantageous effect is increased. Note that the magnitude of an increase in the probability of winning the "fever state" may be changed, depending on the amount of virtual money consumed when the item lottery icon AB is selected and executed. As a non-limiting example, as the amount of virtual money consumed when the item lottery icon AB is selected and executed increases, the probability may be increased. In this case, as the number of times of selection and execution of the item lottery icon AB in a race increases, the amount of virtual money consumed by the execution may be increased, and the probability may be increased with an increase in the consumed virtual money amount. Compared to when an item lottery triggered by opening an item box IB is won to get the "fever state," the probability of winning using an item having a higher effect may be increased when an item lottery triggered by using the item lottery icon AB is won to get the "fever state."

Next, a non-limiting example progression of a game in which a lottery for a new item I is triggered by using the item lottery icon AB will be described with reference to FIG. 17.

In FIG. 17, in a state M that is a non-limiting example state of the possession frames HF, all items I displayed in the possession frames HF are different, i.e., a loss state. When all the items I1-I3 displayed in the possession frames HF in the state M have been used, a state N occurs in which all the possession frames HF are an empty frame E. If all the possession frames HF are an empty frame E, one of conditions for causing the item lottery icon AB is satisfied.

In the state N, if the number of times of selection and execution of the item lottery icon AB has not reached a limit, and the user possesses virtual money that is consumed when the execution is performed, a state O occurs in which the item lottery icon AB and the money amount information M appear instead of the possession frames HF. In this case, when a touch operation is performed on the item lottery icon AB displayed on the touch panel, control proceeds to the process of selecting and executing the item lottery icon AB, and an item lottery is performed for all the possession frames HF. As a result, a state P occurs in which the rotation lottery display of a rotating display item IR is performed for all the possession frames HF.

When the item lottery in the state P is won to get the "fever state," a state Q occurs in which the same item I is displayed in a stationary state in all the possession frames HF. For example, in the state Q, a mushroom item I1 is displayed in a stationary state in the leftmost possession frame HF, a mushroom item I2 is displayed in a stationary state in the middle possession frame HF, and a mushroom item I3 is displayed in a stationary state in the rightmost possession frame HF. Thus, as a result of the item lottery in the state P, it is shown in the state Q that the same mushroom item I is finally displayed in all the possession frames HF, and therefore, the "fever state" caused by mushroom items is won. As a result, the player object PO can perform a race in the "fever state" caused by mushroom items.

When a predetermined fever period has passed since the occurrence of the "fever state" caused by mushroom items, the "fever state" of the player object PO ends, and a state R occurs in which all the possession frames HF are an empty frame E. When all the possession frames HF are thus an empty frame E, an item lottery can be performed for all the possession frames HF again. Note that in the state R in which all the possession frames HF are an empty frame E, if the number of times of selection and execution of the item lottery icon AB has not yet reached a limit, and the user possesses virtual money that can be consumed in the execution, the state that the item lottery icon AB and the money amount information M appear instead of the possession frames HF may occur. If the above conditions are not satisfied, the item lottery icon AB does not appear again in the race.

Next, a non-limiting example of virtual money consumed by selection and execution of the item lottery icon AB will be described. For example, in the non-limiting example, star-shaped virtual money can be purchased by the user using real money, i.e., payment. For example, when the user has performed a process of purchasing star-shaped virtual money by paying real money using the information processing apparatus 3, information about payment for the purchase is transmitted to the server 200, and a predetermined authentication process is performed before the payment is settled between the server 200 and the user. When the information processing apparatus 3 is notified of the settlement for the purchase of the star-shaped virtual money by the server 200, the information processing apparatus 3 adds the purchased star-shaped virtual money to the user's possession. Note that star-shaped virtual money managed in the user's possession may be usable in other games. As used herein, the term "purchase" refers to a situation in which virtual money can be acquired by paying real money. Specifically, when a user has to pay to use software for a game, or a user has to play a game itself, or a user has to play to use a predetermined action in a game, etc., then if the user acquires virtual money by paying real money, it can be considered that the user acquires virtual money by purchase. Needless to say, when software for performing a game is free, or playing a game itself is free, or a predetermined action in a game is free, etc., then if a user acquires virtual money by paying real money, it can be considered that the user acquires virtual money by purchase. The above purchase using real money may be settled by a means previously purchased by a user, or delayed payment. For example, virtual money may be purchased using a prepaid card previously purchased by a user, or a credit card, which a user uses to pay later.

Star-shaped virtual money purchased by payment as described above can be exchanged for various things in the game. For example, in a purchase scene which can be viewed before the start of the racing game or after the end of the racing game, i.e., a game scene different from those appearing during a race, pieces of equipment used in a race, in-game coins, etc., can be purchased using star-shaped virtual money. For example, as shown in FIG. 18, in a purchase screen displayed in the purchase scene, displayed are purchase buttons B1 that can be used to purchase in-game coins using star-shaped virtual money, purchase buttons B2 that can be used to purchase a piece of equipment for use in a race using in-game coins, and a purchase button B3 that can be used to purchase star-shaped virtual money by payment.

Specifically, the purchase buttons B1 include a button for exchanging 10 pieces of star-shaped virtual money for 100 in-game coins, a button for exchanging 100 pieces of star-shaped virtual money for 1200 in-game coins, and a button for exchanging 1000 pieces of star-shaped virtual money for 15000 in-game coins. Here, in-game coins function as a parameter that can be acquired as a consideration for an achievement in the racing game, or can be acquired by acquiring a predetermined item in the racing game. Typically, in-game coins can be acquired and used in the racing game. In-game coins can also be purchased with (or exchanged for) virtual money possessed by the user by selecting and executing a purchase button B1 desired by the user in the purchase screen.

The purchase buttons B2 include a button for purchasing first equipment that can be used in the race by consuming 1000 in-game coins, a button for purchasing second equipment that can be used in the race by consuming 200 in-game coins, a button for purchasing third equipment that can be used in the race by consuming 500 in-game coins, and a button for purchasing fourth equipment that can be used in the race by consuming 100 in-game coins. Here, a piece of equipment that can be used in the race is such that when the player object PO participates in the race using the equipment, a specific ability of the equipment is given to the player object PO, and the player object PO can acquire an in-game effect advantageous to progression of the race using the equipment. As a non-limiting example, by the use of a piece of equipment, the player object PO can acquire a specific ability of the equipment such as increasing the traveling speed or acceleration, improving steering properties, increasing places where traveling is allowed, or enhancing defensive power. The player object PO can continue to use purchased equipment in a plurality of races, and therefore, as long as the equipment is effective, the equipment functions as an item that gives a continual in-game effect to the player object PO. Meanwhile, even if the possession of an item I can be carried over to another race, the in-game effect caused by the use of the item I or the in-game effect caused by the "fever state" is limited to a partial period of time in a race in which the effect occurs, and is not continued into another race, and therefore, equipment can be said to be an item that gives a temporary in-game effect to the player object PO.

As can be seen from the purchase buttons B1 and B2, after exchanging star-shaped virtual money for in-game coins, the user can purchase equipment using the in-game coins. Therefore, the user can purchase equipment using star-shaped virtual money through in-game coins. Although, in the above purchase screen non-limiting example, star-shaped virtual money needs to be once exchanged for in-game coins in order to purchase equipment, equipment may be purchased directly using star-shaped virtual money without exchanging for in-game coins. In some games in which star-shaped virtual money is not set, in-game coins may be purchasable directly by payment. In this case, in such games, star-shaped virtual money does not exist, and only in-game coins exist, and therefore, equipment may be purchasable by the use of in-game coins, and a predetermined number of (e.g., 1000) of in-game coins may be consumed when the item lottery icon AB is used. In the case where only in-game coins exist, the in-game coins may not necessarily be purchasable directly by payment.

In the above non-limiting example game, when the item lottery icon AB is selected and executed, star-shaped virtual money is consumed. Alternatively, in-game coins that can be exchanged for star-shaped virtual money in the purchase screen may be consumed upon the execution. Thus, even in the case where in-game coins are consumed when the item lottery icon AB is selected and executed, after star-shaped virtual money is once exchanged for in-game coins, the item lottery icon AB can be executed using the in-game coins. Therefore, it can be said that star-shaped virtual money can be used to execute the item lottery icon AB.

In the purchase screen, an "item lottery icon AB execution right" that allows the item lottery icon AB to be selected and executed may be purchasable by the use of star-shaped virtual money or in-game coins exchangeable for star-shaped virtual money. For example, if the user has purchased and possesses the "item lottery icon AB execution right," then when the item lottery icon AB appears, the user can select and execute the item lottery icon AB by using and consuming the "item lottery icon AB execution right." Thus, even in the case where the "item lottery icon AB execution right" is consumed when the item lottery icon AB is selected and executed, after star-shaped virtual money or in-game coins are once exchanged for the "item lottery icon AB execution right," the item lottery icon AB can be executed using the "item lottery icon AB execution right." Therefore, it can be said that star-shaped virtual money can be used to execute the item lottery icon AB.

Thus, in the second item lottery process non-limiting example performed in the information processing system 1, in a purchase scene in which in-game coins, equipment, etc., can be purchased, when equipment is purchased using star-shaped virtual money or in-game coins changed from the virtual money, the amount of possessed virtual money is reduced, and the player object PO can obtain an effect of the equipment that continues to be effective in a plurality of races. When the player object PO comes into contact with an item box IB disposed on the course in a race, the player object PO can obtain a temporary effect that is effective in that race by the use of an item I. Furthermore, when the item lottery icon AB is selected and executed in a race, the amount of possessed virtual money is consumed and reduced by the execution, and the player object PO can obtain the above temporary effect that is effective in that race by the use of an item I or a temporary effect of winning the "fever state". Therefore, star-shaped virtual money and in-game coins function as items that give various effects to the player object PO, and therefore, the user can be more motivated to acquire star-shaped virtual money or in-game coins.

Note that in the above non-limiting example, only when all the possession frames HF are an empty frame E, the item lottery icon AB appears. Alternatively, the item lottery icon AB may appear even when none of the possession frames HF is an empty frame E or when a portion of the possession frames HF are an empty frame E. In this case, even when none of the possession frames HF is an empty frame E or when a portion of the possession frames HF are an empty frame E, an item lottery can be triggered by selecting the item lottery icon AB, and a possession frame HF in which an item I is being displayed is also put into the rotation lottery state. When an item lottery is performed by selecting the item lottery icon AB in a situation that an empty frame E and a frame in which an item I is being displayed coexist among the possession frames HF, the empty frame E as well as the possession frame HF in which an item I is being displayed may be put into the rotation lottery state.

In the above description, when the player object PO comes into contact with an item box IB disposed on the course in a race, the player object PO can obtain a temporary effect that is effective in that race by the use of an item I. Alternatively, the temporary effect may be obtained without such a contact with an item box IB. For example, instead of a lottery event for a new item I that is triggered when the player object PO comes into contact with an item box IB, a lottery event for a new item I may be automatically performed at predetermined intervals. In this case, by selecting the item lottery icon AB, a new item I may be allowed to be acquired through a lottery even during the predetermined interval.

The probability of winning the "fever state" in the case of selection of the item lottery icon AB and the type of an item I that is displayed in a stationary state in a possession frame HF may be controlled according to a rule different from that for the control performed based on the lottery table. For example, the probability of winning the "fever state" in the case of selection of the item lottery icon AB and the type of an item I that is displayed in a stationary state in a possession frame HF may be controlled randomly or based on the timing of selection of the item lottery icon AB, or such that items I are displayed in a stationary state in possession frames HF in a predetermined order.

The number of possession frames HF may be changed, depending on the type of the player object PO. As a non-limiting example, the number of possession frames HF may be changed, depending on a relationship between the player object PO and a course on which the player object PO travels. Three possession frames HF may be displayed for a course having a good relationship with the player object PO, and one possession frame HF may be displayed for a course having a bad relationship with the player object PO. When a gameplay is performed using a course for which a single possession frame HF is displayed, the player object PO can simultaneously have a smaller number of items I, and the "fever state" caused by all the possession frames HF having the same item I does not occur, and therefore, the user is in a disadvantageous condition. Note that even in the case where a course has a bad relationship and a single possession frame HF is displayed, three possession frames HF may appear and a lottery event may be performed for new items I when the item lottery icon AB is selected. In the case where the number of displayed possession frames HF is thus changed, depending on the relationship between the player object PO and a course, the user is motivated to select the type of a player object PO to be used.

Next, processes performed in the information processing apparatus 3 will be described in detail. Firstly, main data used in processes performed in the information processing apparatus 3 will be described with reference to FIG. 19. Note that FIG. 19 is a diagram showing non-limiting example main data and programs stored in the storage unit 32 of the information processing apparatus 3.

Figure 19:
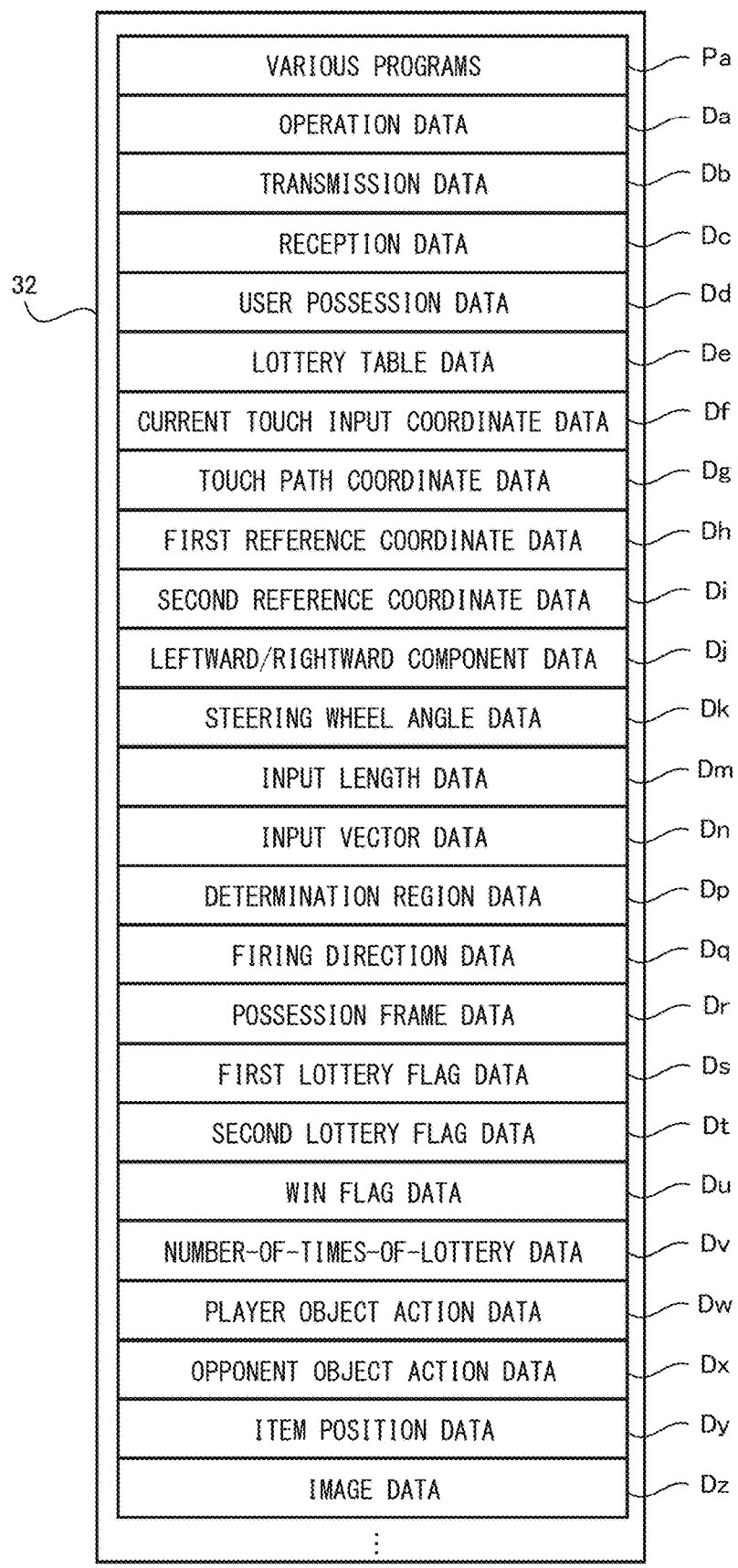
FIG. 19 is a diagram showing a non-limiting example of main data and programs stored in a storage unit 32 of the information processing apparatus 3.

As shown in FIG. 19, the storage unit 32 stores, in a data storage region, operation data Da, transmission data Db, reception data Dc, user possession data Dd, lottery table data De, current touch input coordinate data Df, touch path coordinate data Dg, first reference coordinate data Dh, second reference coordinate data Di, leftward/rightward component data Dj, steering wheel angle data Dk, input length data Dm, input vector data Dn, determination region data Dp, firing direction data Dq, possession frame data Dr, first lottery flag data Ds, second lottery flag data Dt, winning flag data Du, lottery number-of-times data Dv, player object action data Dw, opponent object action data Dx, item position data Dy, and image data Dz, etc. Note that the storage unit 32 stores, in addition to data contained in the information of FIG. 19, data, etc., data required in the process such as data used in an executed application. The storage unit 32 also stores, in a program storage region, various programs Pa including a communication program and an information processing program (game program).

The operation data Da indicates operation information about the user's operation on the information processing apparatus 3. For example, operation data indicating an operation performed on the input unit 34 including the touch panel is acquired at time intervals that are a unit process time (e.g., 1/60 sec) of the information processing apparatus 3, and the operation data Da is updated with the acquired operation data.

The transmission data Db is stored as data to be transmitted to the server 200. The reception data Dc has been received from the server 200.

The user possession data Dd indicates virtual money, in-game coins, equipment, characters, items, an experience point, a play level, a user ID, etc., which are possessed by the user and the player object PO operated by the user, and are managed by the server 200, are received from the server 200, and are set before the start of the game.

The lottery table data De indicates the probability of winning the "fever state" for each type of item I, which is set based on the number of empty frames E, timing, the state of the player object PO, etc. For example, the lottery table data De is managed by the server 200, is received from the server 200 and is set before the start of the game.

The current touch input coordinate data Df indicates the current touch position coordinate point T of a touch operation at a current time on the input unit 34 (touch panel). The touch path coordinate data Dg indicates the records (touch path coordinates) of touch input coordinate points from the time when the touch panel is first touched to the current time. The first reference coordinate data Dh indicates a touch input coordinate point where the touch panel is first touched, and indicates a reference coordinate point (the reference coordinate point R0) that is used to calculate the leftward/rightward component of a swipe input. The second reference coordinate data Di indicates a touch input coordinate point that moves on a touch path in a manner that satisfies a predetermined condition, and indicates a reference coordinate point (the reference coordinate point Rm) that is used to calculate the upward/downward component of a swipe input.

The leftward/rightward component data Dj indicates the leftward/rightward component of a swipe input performed by the user. The steering wheel angle data Dk indicates a steering wheel angle of the player object PO that is calculated based on the leftward/rightward component of a swipe input.

The input length data Dm indicates the length of a path of touch positions input by the user. The input vector data Dn indicates a vector FD from the reference coordinate point Rm toward the current touch position coordinate point T.

The determination region data Dp indicates the determination regions UA and LA for determining the upward or downward direction of a swipe input. The firing direction data Dq indicates the direction of a projectile item IM fired by the player object PO.

The possession frame data Dr indicates the object ID of an item I disposed in each possession frame HF. When a possession frame HF is an empty frame E, data indicating an empty frame E is set for that possession frame HF.

The first lottery flag data Ds indicates a first lottery flag that is set on for a period of time that an item lottery triggered by the player object PO opening an item box IB is being performed. The second lottery flag data Dt indicates a second lottery flag that is set on for a period of time that an item lottery triggered by the user selecting and executing the item lottery icon AB is being performed. The winning flag data Du indicates a winning flag that is set on for a period of time that the "fever state" is being continued. The lottery number-of-times data Dv indicates the number of item lotteries that have been performed by selecting and executing the item lottery icon AB.

The player object action data Dw indicates an action of the player object PO, and includes the position, speed, orientation, number of laps, standing, etc., of the player object PO in a race. The opponent object action data Dx indicates an action of the opponent object EO, and includes the position, speed, orientation, number of laps, standing, etc., of the opponent object EO in a race. The item position data Dy indicates the position of an icon I (the ready-to-use item IP) disposed at the ready-to-use position and the position of a fired icon I (the projectile item IM).

The image data Dz is data for displaying a game image (e.g., an image of the player object PO, an image of the opponent object EO, an image of an item I, an image of a possession frame HF, an image of the item lottery icon AB, an image of another virtual object, a field image of a course, etc.), a background image, etc.) on the display unit 35 of the information processing apparatus 3 in the game.

Figure 20:
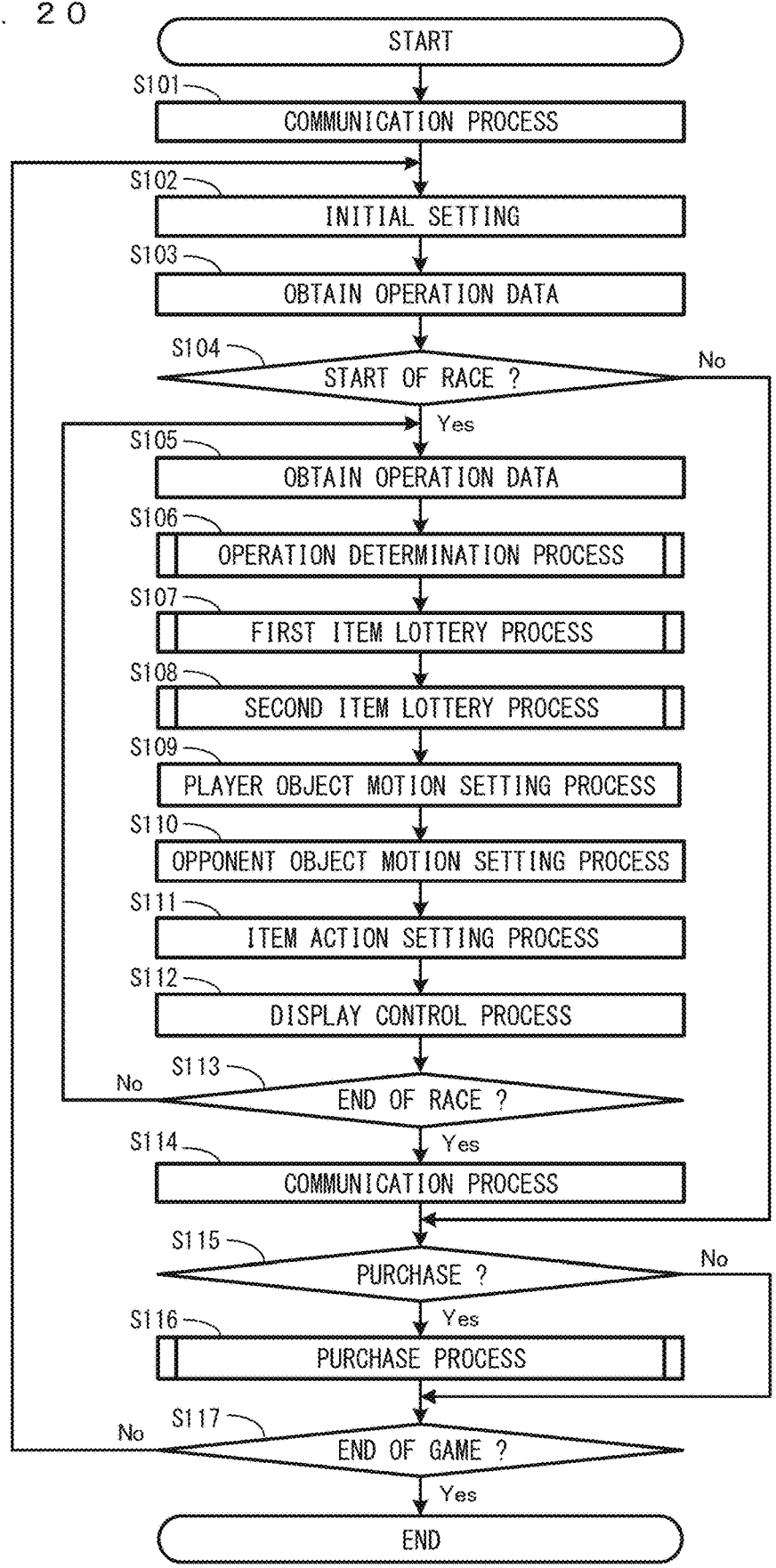
FIG. 20 is a flowchart showing a non-limiting example of a process executed in the information processing apparatus 3.
Figure 21:
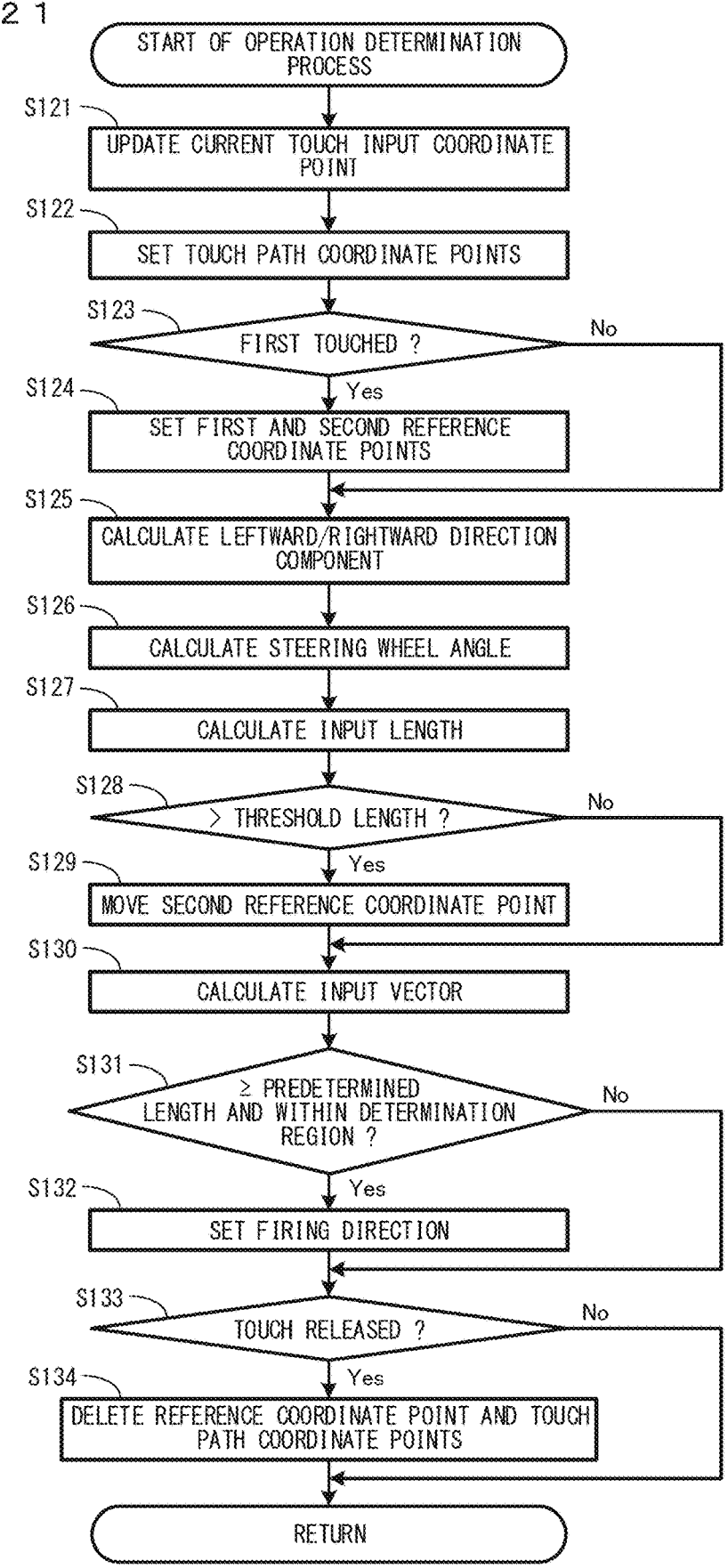
FIG. 21 is a subroutine showing a detailed non-limiting example of an operation determination process in step S106 of FIG. 20.
Figure 22:
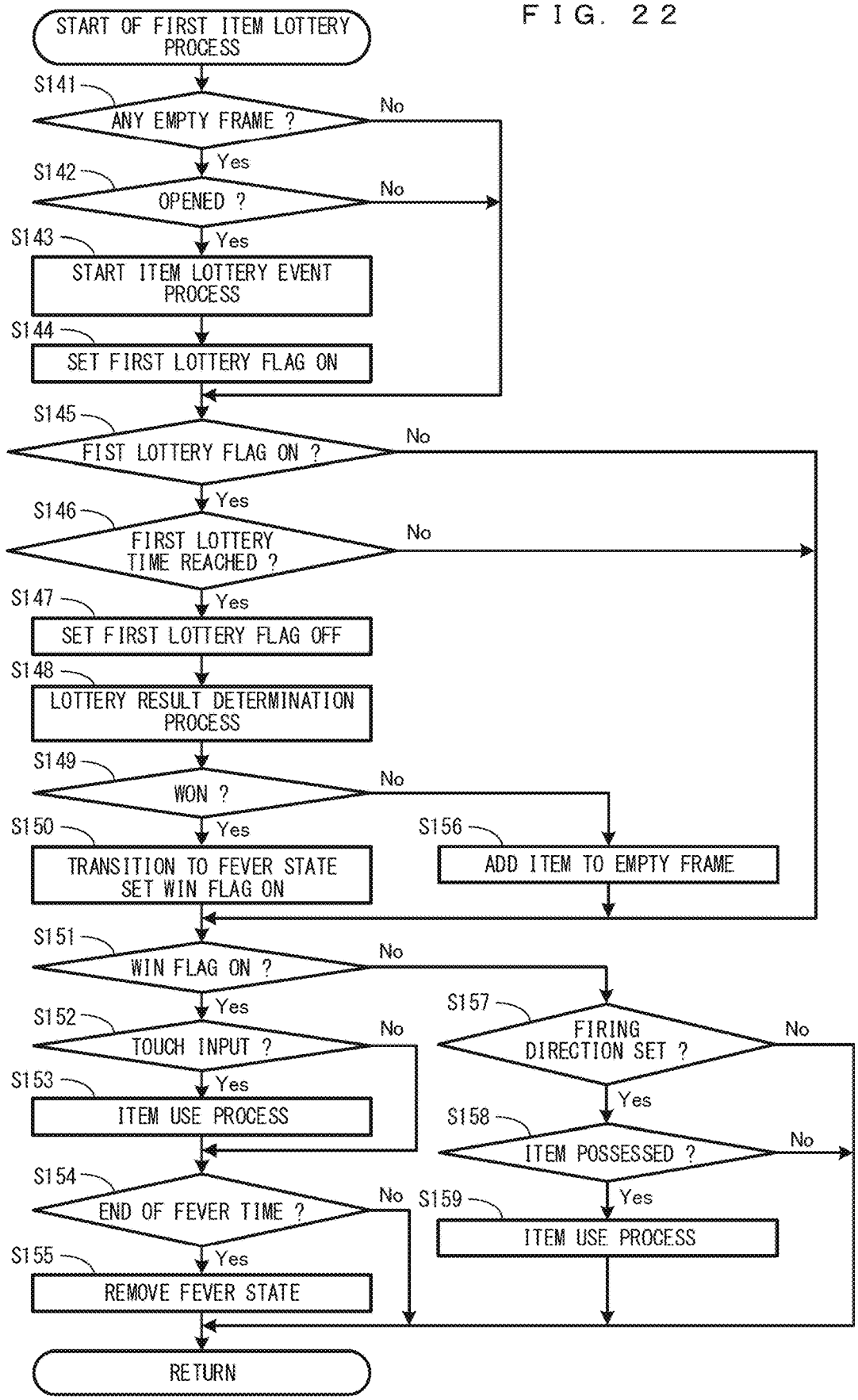
FIG. 22 is a subroutine showing a detailed non-limiting example of a first item lottery process in step S107 of FIG. 20.
Figure 23:
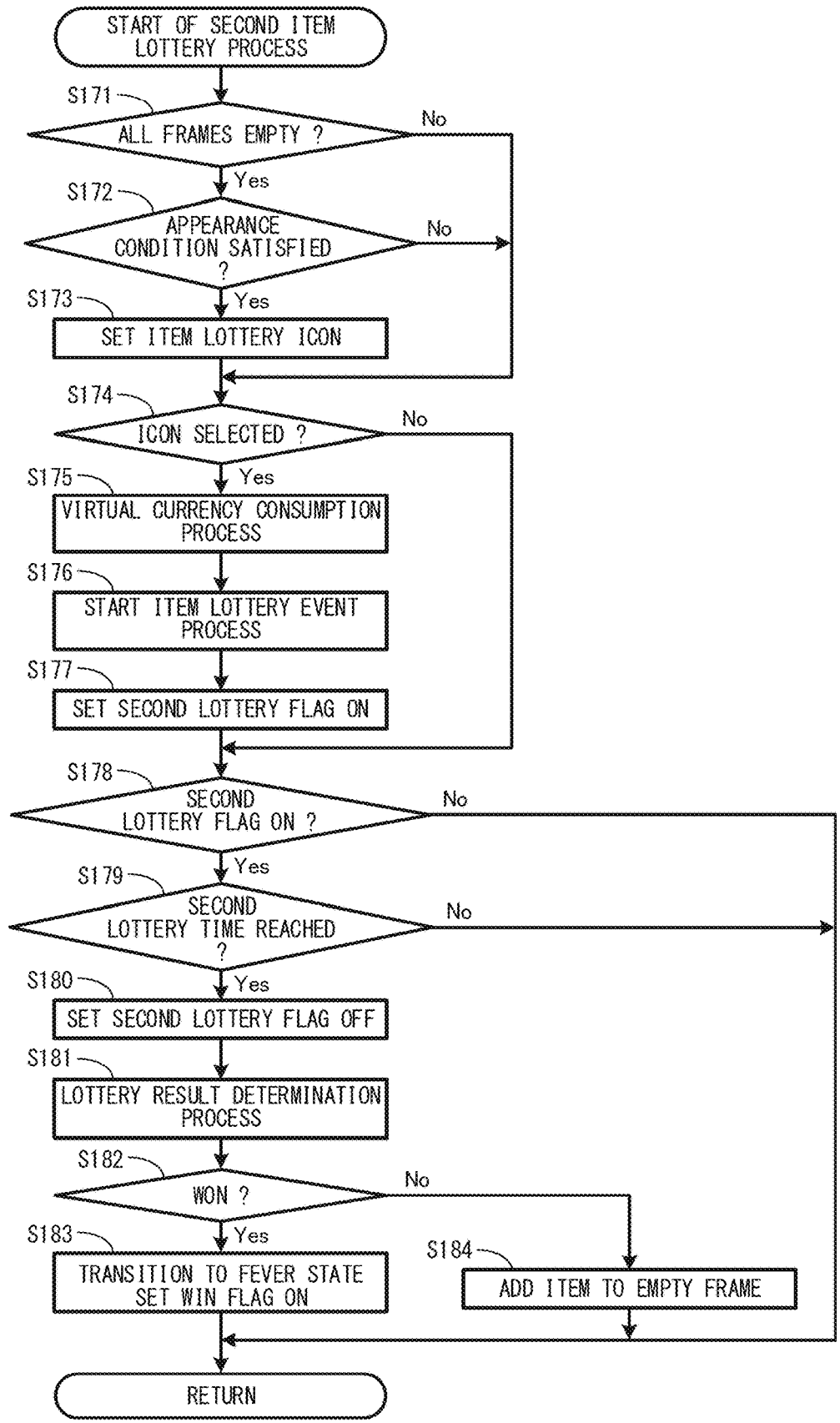
FIG. 23 is a subroutine showing a detailed non-limiting example of a second item lottery process in step S108 of FIG. 20.

Next, processes performed in the information processing apparatus 3 will be described in detail with reference to FIGS. 20-24. Note that FIG. 20 is a flowchart showing a non-limiting example process executed in the information processing apparatus 3. FIG. 21 is a subroutine showing a detailed non-limiting example of an operation determination process in step S106 of FIG. 20. FIG. 22 is a subroutine showing a detailed non-limiting example of a first item lottery process in step S107 of FIG. 20. FIG. 23 is a subroutine showing a detailed non-limiting example of a second item lottery process in step S108 of FIG. 20. FIG. 24 is a subroutine showing a detailed non-limiting example of a purchase process in step S116 of FIG. 20. Here, of the processes of the information processing system 1 in the flowcharts of FIGS. 20-24, game processes involved in an operation on the player object PO, an item lottery, and a purchase process that is performed on an occasion other than a race, will be mainly described as a non-limiting example, and other processes that are not directly involved with these processes will not be described in detail. In FIGS. 20-24, each step executed by the control unit 31 is abbreviated to "S."

In the non-limiting example, steps shown in FIGS. 20-24 are performed by the control unit 31 (CPU) executing a communication program or game program stored in the program storage unit 33. Note that the processes of FIGS. 20-24 are started with any appropriate timing. At this time, all or a portion of the communication program or game program is read from the storage unit 32 with appropriate timing, and is executed by the control unit 31. Thus, the processes of FIGS. 20-24 are started. Note that the communication program and the game program are assumed to be previously stored in the program storage unit 33. In another non-limiting example, the communication program and the game program may be obtained from a storage medium removably attached to the information processing apparatus 3, and stored in the storage unit 32, or may be obtained from another apparatus through a network, such as the Internet, and stored in the storage unit 32.

The steps of the flowcharts of FIGS. 20-24 are merely illustrative, and if a similar result is obtained, the order in which the steps are performed may be changed, and another step may be executed in addition to or instead of each step. Although, in the non-limiting example, it is assumed that each step of the flowcharts is executed by the control unit 31, all or a portion of the steps of the flowcharts may be executed by a processor other than the CPU of the control unit 31 or a dedicated circuit.

In FIG. 20, the control unit 31 performs a communication process (step S101), and proceeds to the next step. For example, the control unit 31 transmits transmission data (e.g., data for user authentication (e.g., data indicating the user's ID)) stored in the transmission data Db to the server 200 through the network 100. The control unit 31 receives data from the server 200 through the network 100, and updates the reception data Dc using the received data. As a non-limiting example, when a game is played along with another information processing apparatus 3 or in only the information processing apparatus 3 itself, the control unit 31 exchanges data for playing the game with the server 200, as appropriate, in step S101.

Next, the control unit 31 sets initial settings (step S102), and proceeds to the next step. For example, the control unit 31 initially sets parameters for use in the subsequent steps. The control unit 31 also initially sets the user possession data Dd based on contents such as a virtual object and an item that are currently possessed by the player object PO. For example, in step S101, the control unit 31 receives, from the server 200, data possessed by the user, data related to the player object PO operated by the user (e.g., data related to virtual money, in-game coins, equipment, characters, items, an experience point, a play level, etc.), data for progression of a racing game described below (e.g., lottery table data), etc. Thereafter, the control unit 31 initially sets the user possession data Dd and the lottery table data De based on the data received from the server 200 and the data stored in the information processing apparatus 3. In steps S101 and S102, the amounts of virtual money and in-game coins possessed by the user, a lottery table for performing an item lottery, etc., are initially set.

Next, the control unit 31 acquires operation data from the input unit 34 and updates the operation data Da (step S103), and proceeds to the next step.

Next, the control unit 31 determines whether or not to start a racing game (step S104). For example, if the user has performed an operation of starting a racing game or a predetermined start condition for starting the racing game is satisfied, the result of the determination by the control unit 31 of step S104 is positive. If the control unit 31 determines to start a racing game, the control unit 31 proceeds to step S105. Otherwise, i.e., if the control unit 31 determines not to start a racing game, the control unit 31 proceeds to step S115.

In step S105, the control unit 31 obtains operation data from the input unit 34 and updates the operation data Da, and proceeds to the next step.

Next, the control unit 31 performs an operation determination process (step S106), and proceeds to step S107. The operation determination process performed in step S106 will now be described with reference to FIG. 21.

In FIG. 21, the control unit 31 updates a current touch position coordinate point based on the most recent operation data obtained in step S105 (step S121), and proceeds to the next step. For example, the control unit 31 defines, in the display screen of the display unit 35, a display screen coordinate system in which an X-axis extending in the leftward/rightward direction of the display screen (the rightward direction is the positive direction of the X-axis) and a Y-axis extending in the upward/downward direction of the display screen (the upward direction is the positive direction of the Y-axis) are set. The control unit 31 obtains, from the most recent operation data obtained in step S105, a touch input coordinate point of the display screen coordinate system at which a touch operation is being performed on the touch panel of the information processing apparatus 3, as a current touch input coordinate point T, and updates the current touch input coordinate data Df using the current touch input coordinate point T. Note that if the most recent operation data obtained in step S105 does not contain a touch input coordinate point at which a touch operation is being performed on the touch panel, the control unit 31 determines that the user has released a touch from the touch panel, and updates the current touch input coordinate data Df using data indicating the release of a touch.

Next, the control unit 31 adds the current touch input coordinate point T updated in step S121 to touch path coordinate points (step S122), and proceeds to the next step. For example, the control unit 31 adds the current touch input coordinate point T updated in step S121 to touch path coordinate points indicated by the touch path coordinate data Dg, and updates the touch path coordinate data Dg using the touch path coordinate points after the addition. Note that if the current touch input coordinate data Df indicates that a touch has been released, the control unit 31 does not update the touch path coordinate data Dg, and proceeds to the next step.

Next, the control unit 31 determines whether or not the touch panel of the information processing apparatus 3 has been changed to a no-touch state to an initial-touch state (step S123). Thereafter, if the touch panel has been changed from the no-touch state to the initial-touch state, the control unit 31 proceeds to step S124. Otherwise, i.e., if the touch panel has not been changed from the no-touch state to the initial-touch state (e.g., the touch panel is not touched or a touch operation is continued after an initial touch), the control unit 31 proceeds to step S125.

In step S124, the control unit 31 sets a first reference coordinate point and a second reference coordinate point, and proceeds to step S125. For example, the control unit 31 obtains the current touch input coordinate point T updated in step S121 by referring to the current touch input coordinate data Df, and sets the current touch input coordinate point T as a first reference coordinate point R0 and a second reference coordinate point Rm of the display screen coordinate system. Thereafter, the control unit 31 updates the first reference coordinate point data Dh using the set first reference coordinate point R0, and updates the second reference coordinate point data Di using the set second reference coordinate point Rm.

In step S125, the control unit 31 calculates the leftward/rightward component of an input of swiping the touch panel, and proceeds to the next step. For example, the control unit 31 obtains the reference coordinate point R0(X0, Y0) and the current touch position coordinate point T(Xt, Yt) in the display screen coordinate system by referring to the first reference coordinate point data Dh and the current touch input coordinate data Df. Thereafter, the control unit 31 calculates Xt−X0 as the magnitude of the leftward/rightward component (X-axis-direction component) of the swipe input in the display screen, and updates the leftward/rightward component data Dj using the calculated Xt−X0.

Next, the control unit 31 calculates a steering wheel angle of the player object PO (step S126), and proceeds to the next step. For example, if the leftward/rightward component Xt−X0 calculated in step S125 has a positive value, the control unit 31 calculates a rightward steering wheel angle corresponding to the absolute value of Xt−X0, and updates the steering wheel angle data Dk using the steering wheel angle. If the leftward/rightward component Xt−X0 calculated in step S125 has a negative value, the control unit 31 calculates a leftward steering wheel angle corresponding to the absolute value of Xt−X0, and updates the steering wheel angle data Dk using the steering wheel angle. Note that when a touch is released from the touch panel, the control unit 31 changes and returns the steering wheel angle to the straight-ahead position at a predetermined rate, and updates the steering wheel angle data Dk.

Next, the control unit 31 calculates an input length between the second reference coordinate point Rm and the current touch input coordinate point T (step S127), and proceeds to the next step. For example, the control unit 31 calculates an input length along the touch input path between the second reference coordinate point Rm and the current touch position coordinate point T by referring to the current touch input coordinate data Df, the touch path coordinate data Dg, and the second reference coordinate point data Di, and updates the input length data Dm using the input length.

Next, the control unit 31 determines whether or not the input length calculated in step S127 is greater than a predetermined threshold L (step S128). If the input length is greater than the predetermined threshold L, the control unit 31 proceeds to step S129. Otherwise, i.e., if the input length is smaller than or equal to the predetermined threshold L, the control unit 31 proceeds to step S130.

In step S129, the control unit 31 moves the second reference coordinate point Rm such that the input length becomes smaller than or equal to the threshold L, and proceeds to step S130. For example, in order to reduce the input length calculated in step S127 at a predetermined rate to a length smaller than or equal to the threshold L, the control unit 31 sequentially deletes records of touch position coordinate points T that are beyond the threshold L based on the predetermined rate, and after the deletion process, sets the position of the most previous touch position coordinate point T as the second reference coordinate point Rm. As a result, the control unit 31 moves the second reference coordinate point Rm along the touch input path in the direction of the current touch position coordinate point T, and updates the second reference coordinate point data Di using the moved second reference coordinate point Rm.

In step S130, the control unit 31 calculates the input vector FD, and proceeds to the next step. For example, the control unit 31 calculates the input vector FD from the second reference coordinate point Rm to the current touch position coordinate point T in the display screen coordinate system by referring to the current touch input coordinate data Df and the second reference coordinate point data Di, and updates the input vector data Dn using the input vector FD.

Next, the control unit 31 determines whether or not the length of the input vector FD is greater than or equal to a predetermined length and the direction of the input vector FD is within a predetermined determination region (step S131). If the length of the input vector FD is greater than or equal to the predetermined length and the direction of the input vector FD is within the determination region, the control unit 31 proceeds to step S132. Otherwise, i.e., if the control unit 31 determines that the length of the input vector FD is not greater than or equal to the predetermined length or the direction of the input vector FD is not within the determination region, the control unit 31 deletes the firing direction indicated by the firing direction data Dq, and proceeds to step S133. For example, the control unit 31 obtains the forward-direction determination region UA that is a predetermined angle range around the positive direction of the Y-axis as a center thereof, and the backward-direction determination region LA that is a predetermined angle range around the negative direction of the Y-axis as a center thereof, by referring to the determination region data Dp. If the length of the input vector FD calculated in step S130 is greater than or equal to the predetermined length, and the direction of the input vector FD is within the forward-direction determination region UA or the backward-direction determination region LA, the result of the determination by the control unit 31 in step S131 is positive.

In step S132, the control unit 31 sets the firing direction, and proceeds to step S133. For example, if the direction of the input vector FD calculated in step S130 is within the forward-direction determination region UA, the control unit 31 sets the direct forward direction of the player object PO as the firing direction, and updates the firing direction data Dq using the firing direction. If the direction of the input vector FD calculated in step S130 is within the backward-direction determination region LA, the control unit 31 sets the direct backward direction of the player object PO as the firing direction, and updates the firing direction data Dq using the firing direction. Note that the control unit 31 may set, as the firing direction, a direction that deviates from the direct forward direction or direct backward direction of the player object PO by the difference in angle between the Y-axis direction and the direction of the input vector FD.

In step S133, the control unit 31 determines whether or not the touch operation performed on the touch panel of the information processing apparatus 3 has been changed to the no-touch state. If the touch operation performed on the touch panel has been changed to the no-touch state, the control unit 31 proceeds to step S134. Otherwise, i.e., if the touch operation performed on the touch panel has not been changed to the no-touch state (e.g., a touch operation is not being continued after a touch is released, the touch panel is first touched, and a touch operation is being continued after the touch panel is first touched), the control unit 31 ends the process of the subroutine.

In step S134, the control unit 31 deletes the first reference coordinate point R0, the second reference coordinate point Rm, and the touch path coordinate points, and ends the process of the subroutine. For example, the control unit 31 deletes the first reference coordinate point R0 indicated by the first reference coordinate point data Dh, the second reference coordinate point Rm indicated by the second reference coordinate point data Di, and the touch path coordinate points indicated by the touch path coordinate data Dg.

Referring back to FIG. 20, after the operation determination process in step S106, the control unit 31 performs the first item lottery process (step S107), and proceeds to step S108. The first item lottery process performed in step S107 will now be described with reference to FIG. 22.

In FIG. 22, the control unit 31 determines whether or not the possession frames HF include an empty frame E (step S141). For example, the control unit 31 obtains an object ID set for each possession frame HF by referring to the possession frame data Dr, and if there is data indicating that at least one of the possession frames HF is an empty frame E, the result of the determination by the control unit 31 in step S141 is positive. If the possession frames HF include an empty frame E, the control unit 31 proceeds to step S142. Otherwise, i.e., if the possession frames HF include no empty frame E, that is, the object ID of an item I is set in all the possession frames HF, the control unit 31 proceeds to step S145.

In step S142, the control unit 31 determines whether or not the player object PO has passed by or through an item box IB disposed on the course and thereby opened the item box IB. For example, if the control unit 31 determines that the player object PO's action of passing by or through an item box IB is set, by referring to the player object action data Dw, etc., the result of the determination by the control unit 31 in step S142 is positive. If the player object PO has opened an item box IB, the control unit 31 proceeds to step S143. Otherwise, i.e., if the player object PO has not opened an item box IB, the control unit 31 proceeds to step S145.

In step S143, the control unit 31 starts an item lottery event process, and proceeds to the next step. For example, the control unit 31 starts an item lottery event process in which an item lottery event is displayed on the display unit 35. In the item lottery event, the rotation lottery display of a plurality of types of items I in a possession frame(s) HF that is an empty frame E is performed, and thereafter, any one of the items I is displayed in a stationary state in the possession frame HF. The control unit 31 also starts measuring a first lottery event elapsed time upon the start of the item lottery event process.

Next, the control unit 31 sets the first lottery flag on (step S144), and proceeds to step S145. For example, the control unit 31 sets the first lottery flag indicated by the first lottery flag data Ds on, and updates the first lottery flag data Ds.

In step S145, the control unit 31 determines whether or not the first lottery flag is on. For example, the control unit 31 performs the determination of step S145 by referring the first lottery flag indicated by the first lottery flag data Ds. If the first lottery flag is on, the control unit 31 proceeds to step S146. Otherwise, i.e., if the first lottery flag is off, the control unit 31 proceeds to step S151.

In step S146, the control unit 31 determines whether or not a first elapsed time has been reached. For example, the control unit 31 determines whether or not the first lottery event elapsed time that has been measured since step S143 has reached a predetermined first lottery time. If the first lottery time has been reached, the control unit 31 proceeds to step S147. Otherwise, i.e., if the first lottery time has not been reached, the control unit 31 proceeds to step S151.

In step S147, the control unit 31 sets the first lottery flag off, and proceeds to the next step. For example, the control unit 31 set the first lottery flag indicated by the first lottery flag data Ds off, and updates the first lottery flag data Ds.

Next, the control unit 31 performs an item lottery result determination (step S148), and proceeds to the next step. For example, the control unit 31 determines whether or not the "fever state" is won, based on a lottery table indicted by the lottery table data De. For example, the control unit 31 extracts a lottery table that is to be used for the item lottery result determination, from the lottery table data De, based on the number of empty frames E, the number of laps in a race, a standing in the race, a course, the type of the race, the type of the player object PO, etc. Thereafter, based on a winning probability described in the extracted lottery table, the control unit 31 determines whether or not the "fever state" is won in the item lottery result determination of step S148, and what item I is used to win the "fever state" (i.e., an item I common to all the possession frames HF). If the lottery is lost in the item lottery result determination of step S148, the control unit 31 determines an item I that is displayed in a stationary state in each possession frame HF.

In the non-limiting example, the item lottery result determination is performed after the first lottery time has passed. Alternatively, the item lottery result determination may be performed at other timings such as at the start of or during counting of the first lottery event elapsed time, if the timing is before notification of the item lottery result.

Next, the control unit 31 determines whether or not the item lottery result determination of step S148 indicates the win of the lottery (step S149). If the item lottery result determination of step S148 indicates the win of the lottery, the control unit 31 proceeds to step S150. Otherwise, i.e., if the item lottery result determination of step S148 indicates the loss of the lottery, the control unit 31 proceeds to step S156.

In step S150, the control unit 31 performs an item lottery result notification process for indicating the win of the lottery, transitions to the fever state, and proceeds to step S151. For example, the control unit 31 performs an item lottery result notification process in which the item I determined in step S148 is displayed in a stationary state in all the possession frames HF, and an item lottery result notification event for notifying the user of the win of the "fever state" is displayed on the display unit 35. Thereafter, the control unit 31 sets the winning flag on, updates the winning flag data Du, starts measuring a fever elapsed time, and sets the object ID of the item I that is displayed in a stationary state in all the possession frames HF in the possession frame data Dr. The control unit 31 sets the action of the player object PO to an action performed in the fever state caused by the item I displayed in a stationary state, and updates the player object action data Dw.

Otherwise, i.e., if the item lottery result determination indicates the loss of the lottery, the control unit 31 performs an item lottery result notification process for indicating the loss of the lottery in step S156, and thereafter, proceeds to step S151. For example, the control unit 31 performs an item lottery result notification process that displays an item lottery result notification event on the display unit 35. In the item lottery result notification event, the user is notified of the item I that is displayed in a stationary state in a possession frame HF that was an empty frame E and the loss of the lottery. The control unit 31 also sets the object ID of the item I that is displayed in a stationary state in the possession frame HF in the possession frame data Dr.

In step S151, the control unit 31 determines whether or not the winning flag is on. For example, the control unit 31 performs the determination of step S151 by referring to the winning flag indicated by the winning flag data Du. If the winning flag is on, the control unit 31 proceeds to step S152. Otherwise, i.e., if the winning flag is off, the control unit 31 proceeds to step S157.

In step S152, the control unit 31 determines whether or not there is a touch input has been performed on the touch panel of the information processing apparatus 3. For example, if a current touch input coordinate point T has been set in the current touch input coordinate data Df, the result of the determination by the control unit 31 in step S152 is positive. If a touch input has been performed on the touch panel, the control unit 31 proceeds to step S153. Otherwise, i.e., if a touch input has not been performed on the touch panel, the control unit 31 proceeds to step S154.

In step S153, the control unit 31 performs an item use process, and proceeds to step S154. For example, the control unit 31 performs a process of continually using an item that has caused the "fever state" which is allowed only during the fever period. As a non-limiting example, when the "fever state" is caused by carapace items, the control unit 31 performs the item use process in which a plurality of carapace items IF are disposed around the player object PO, and a projectile carapace item IM is continually fired toward the front of the player object PO at predetermined intervals according to the user's touch operation, and updates the player object action data Dw and the item position data Dy, etc.

In step S154, the control unit 31 determines whether or not the fever period has been reached. For example, the control unit 31 determines whether or not the fever elapsed time that has been measured since step S150 and step S183 described below has reached the predetermined fever period. If the fever period has been reached, the control unit 31 proceeds to step S155. Otherwise, i.e., if the fever period has not been reached, the control unit 31 ends the process of the subroutine.

In step S155, the control unit 31 performs a process of removing the fever state, and ends the process of the subroutine. For example, the control unit 31 sets an empty frame E in all the possession frames HF in the possession frame data Dr, sets the winning flag off, and updates the winning flag data Du. The control unit 31 sets the action of the player object PO to an action in the normal state, and updates the player object action data Dw.

Otherwise, i.e., if the control unit 31 determines, in step S151, that the winning flag is off, the control unit 31 determines whether or not the item firing direction has been set (step S157). For example, if the firing direction has been set in the firing direction data Dq, the result of the determination by the control unit 31 in step S157 is positive. If the firing direction has been set, the control unit 31 proceeds to step S158. Otherwise, i.e., if the firing direction has not been set, the control unit 31 ends the process of the subroutine.

In step S158, the control unit 31 determines whether or not an item I is possessed in a possession frame HF. For example, if an object ID has been set for an item in at least one possession frame HF in the possession frame data Dr, the result of the determination by the control unit 31 in step S158 is positive. If an item I is possessed in a possession frame HF, the control unit 31 proceeds to step S159. Otherwise, i.e., if no item I is possessed in any possession frame HF, the control unit 31 ends the process of the subroutine.

In step S159, the control unit 31 performs the item use process, and ends the process of the subroutine. For example, the control unit 31 selects an item I that is to be used from items I displayed in possession frames HF in a first-in, first out (FIFO) method. If the selected item I is allowed to be fired in the firing direction set in the firing direction data Dq, the control unit 31 performs the item use process in which the item I is fired as the projectile item IM singly from near the player object PO, and is moved, and updates the player object action data Dw and the item position data Dy, etc. If the selected item I is a type of item that is used by the player object PO itself, the control unit 31 performs the item use process in which the item is used by the player object PO itself, so that the effect of the item I is obtained, and updates the player object action data Dw, etc. After the use of the item I, the control unit 31 also changes the possession frame HF in which the item I was displayed, into an empty frame E, and updates the possession frame data Dr using the changed state of the possession frame HF.

Note that in step S159, after the use of the item I, the control unit 31 may delete the firing direction indicated by the firing direction data Dq and the second reference coordinate point Rm indicated by the second reference coordinate point data Di, or may maintain them unchanged. In the former case, in order to use the item I again, it is necessary to first touch the touch panel again and perform a drag operation into a direction in which the item I is to be used. In the latter case, at the time that the item I is made available, the item I is immediately used based on the maintained firing direction and second reference coordinate point Rm.

In the case where the ready-to-use item IP is allowed to be used when a touch operation (tap operation) is performed on the ready-to-use item IP disposed at the ready-to-use position, the result of the determination in step S157 is positive not only if the firing direction has been set but also if a touch operation has been performed. In step S159, the item use process is performed in which the ready-to-use item IP on which a touch operation has been performed is used by the player object PO itself or the ready-to-use item IP is fired as the projectile item IM in a default direction.

Referring back to FIG. 20, after the first item lottery process in step S107, the control unit 31 performs the second item lottery process (step S108), and proceeds to step S109. The second item lottery process performed in step S108 will now be described with reference to FIG. 23.

In FIG. 23, the control unit 31 determines whether or not all the possession frames HF are an empty frame E (step S171). For example, if the control unit 31 determines that there is data indicating that all the possession frames HF are an empty frame E, by referring to the possession frame data Dr, the result of the determination by the control unit 31 in step S171 is positive. If all the possession frames HF are an empty frame E, the control unit 31 proceeds to step S172. Otherwise, i.e., if the object ID of an item I has been set in at least one possession frame HF or the rotation lottery display is being performed in at least one possession frame HF, then when the item lottery icon AB is being displayed, the control unit 31 removes the item lottery icon AB from the display screen, and proceeds to step S174.

In step S172, the control unit 31 determines whether or not a condition under which the item lottery icon AB appears is satisfied. For example, if the number of times of a lottery has not yet reached the limit of the number of times of selection and execution of the item lottery icon AB that is indicated by the lottery number-of-times data Dv, and the amount of possessed virtual money indicated by the user possession data Dd is greater than or equal to the amount of virtual money that is to be consumed by the execution, the control unit 31 determines that the condition is satisfied. If the condition under which the item lottery icon AB appears is satisfied, the control unit 31 proceeds to step S173.

Otherwise, i.e., if the condition under which the item lottery icon AB appears is not satisfied, the control unit 31 proceeds to step S174.

In step S173, the control unit 31 sets settings for causing the item lottery icon AB to appear on the display unit 35, and proceeds to step S174. For example, the control unit 31 sets the money amount information M indicating the amount of virtual money required to select the item lottery icon AB, and sets settings for displaying the item lottery icon AB on the display unit 35.

In step S174, the control unit 31 determines whether or not an operation of selecting and executing the item lottery icon AB has been performed. For example, if a touch operation (tap operation) has been performed on the item lottery icon AB displayed on the display unit 35, the control unit 31 determines that an operation of selecting and executing the item lottery icon AB has been performed. If an operation of selecting and executing the item lottery icon AB has been performed, the control unit 31 proceeds to step S175. Otherwise, i.e., if an operation of selecting and executing the item lottery icon AB has not been performed, the control unit 31 proceeds to step S178.

In step S175, the control unit 31 performs a process of consuming virtual money in response to selection and execution of the item lottery icon AB, and proceeds to the next step. For example, the control unit 31 subtracts the amount of virtual money consumed by selection and execution of the item lottery icon AB from the amount of virtual money possessed by the user that is indicated by the user possession data Dd, and updates the user possession data Dd using the virtual money amount obtained by the subtraction.

Next, the control unit 31 starts the item lottery event process (step S176), and proceeds to the next step. For example, the control unit 31 starts the item lottery event process in which an item lottery event is displayed on the display unit 35. In the item lottery event, the rotation lottery display of a plurality of types of items I is performed in all the possession frames HF that are an empty frame E, and thereafter, any one of the items I is displayed in a stationary state in each possession frame HF. The control unit 31 also starts measuring the second lottery event elapsed time upon the start of the item lottery event process.

Next, the control unit 31 sets the second lottery flag on (step S177), and proceeds to step S178. For example, the control unit 31 sets the second lottery flag indicated by the second lottery flag data Dt on, and updates the second lottery flag data Dt.

In step S178, the control unit 31 determines whether or not the second lottery flag is on. For example, the control unit 31 performs the determination of step S178 by referring to the second lottery flag indicated by the second lottery flag data Dt. If the second lottery flag is on, the control unit 31 proceeds to step S179. Otherwise, i.e., if the second lottery flag is off, the control unit 31 ends the process of the subroutine.

In step S179, the control unit 31 determines whether or not the second elapsed time has been reached. For example, the control unit 31 determines whether or not the second lottery event elapsed time that has been measured since step S176 has reached a predetermined second lottery time. If the second lottery time has been reached, the control unit 31 proceeds to step S180. Otherwise, i.e., if the second lottery time has not been reached, the control unit 31 ends the process of the subroutine. Note that the control unit 31 sets the second elapsed time shorter than the first elapsed time.

In step S180, the control unit 31 sets the second lottery flag off, and proceeds to the next step. For example, the control unit 31 sets the second lottery flag indicated by the second lottery flag data Dt off, and updates the second lottery flag data Dt.

Next, the control unit 31 performs the item lottery result determination (step S181), and proceeds to the next step. For example, the control unit 31 determines whether or not the "fever state" is won, based on a lottery table indicated by the lottery table data De. For example, the control unit 31 extracts a lottery table that is to be used for the item lottery result determination, from the lottery table data De, based on the number of empty frames E, the number of laps in a race, a standing in the race, a course, the type of the race, the type of the player object PO, etc. When an item lottery triggered by selection and execution of the item lottery icon AB is performed, a different lottery table may be extracted, depending on the number of times of an item lottery performed in the same race or the amount of consumed virtual money, or a lottery table based on which a lottery is won with a higher probability than that of an item lottery caused by opening of an item box IB may be extracted. Thereafter, based on the winning probability described in the extracted lottery table, the control unit 31 determines whether or not the "fever state" is won in the item lottery result determination of step S181, and determines an item I that provides a win (i.e., an item I common to all the possession frames HF).

In the non-limiting example, the item lottery result determination is performed after the second lottery time has passed. Alternatively, the item lottery result determination may be performed at other timings such as at the start of or during counting of the second lottery event elapsed time, if the timing is before notification of the item lottery result.

Next, the control unit 31 determines whether or not the item lottery result determination of step S181 indicates the win of the lottery (step S182). If the item lottery result determination of step S181 indicates the win of the lottery, the control unit 31 proceeds to step S183. Otherwise, i.e., if the item lottery result determination of step S181 indicates the loss of the lottery, the control unit 31 proceeds to step S184.

In step S183, the control unit 31 performs an item lottery result notification process for indicating the win of the lottery, transitions to the fever state, and ends the process of the subroutine. For example, the control unit 31 performs an item lottery result notification process in which the item I determined in step S181 is displayed in a stationary state in all the possession frames HF, and an item lottery result notification event for notifying the user of the win of the "fever state" is displayed on the display unit 35. Thereafter, the control unit 31 sets the winning flag on, updates the winning flag data Du, starts measuring a fever elapsed time, and sets the object ID of the item I that is displayed in a stationary state in all the possession frames HF in the possession frame data Dr. The control unit 31 also sets the action of the player object PO to an action performed in the fever state caused by the item I displayed in a stationary state, and updates the player object action data Dw.

Otherwise, i.e., if the item lottery result determination indicates the loss of the lottery, the control unit 31 performs an item lottery result notification process for indicating the loss of the lottery in step S184, and thereafter, ends the process of the subroutine. For example, the control unit 31 performs an item lottery result notification process that displays an item lottery result notification event on the display unit 35. In the item lottery result notification event, the user is notified of the item I that is displayed in a stationary state in a possession frame HF that was an empty frame E and the loss of the lottery. The control unit 31 also sets the object ID of the item I that is displayed in a stationary state in the possession frame HF in the possession frame data Dr.

Referring back to FIG. 20, after the second item lottery process in step S108, the control unit 31 performs a process of setting an action of the player object PO (step S109), and proceeds to the next step. For example, the control unit 31 sets the position and orientation of the player object PO, taking into account a steering wheel angle indicated by the steering wheel angle data Dk, an influence from another virtual object, etc., and determines the action, position, orientation, etc., of the player object PO, taking into account the state of the player object PO set in the player object action data Dw, and updates the player object action data Dw.

Next, the control unit 31 performs a process of setting an action of the opponent object EO (step S110), and proceeds to the next step. As a non-limiting example, in the case where the action of the opponent object EO is controlled by the control unit 31, the control unit 31 causes the opponent object EO to perform an action according to a predetermined algorithm, and updates opponent object data Dx based on the action. As another non-limiting example, in the case where the action of the opponent object EO is controlled by another user, the control unit 31 causes the opponent object EO to perform an action based on the other user's operation in a manner similar to that of the player object PO, and updates the opponent object data Dx based on the action.

Next, the control unit 31 performs a process of setting an action of an item (step S111), and proceeds to the next step. For example, the control unit 31 performs a process of moving the projectile item IM that has been set for use and fired from the player object PO by the above process, based on the firing direction data Dq, and updates the item position data Dy based on the position and orientation after the movement of the projectile item IM.

Next, the control unit 31 performs a display control process of generating and displaying a display image on the display unit 35 (step S112), and proceeds to the next step. For example, the control unit 31 generates a display image corresponding to the result of a process in each step, based on the player object action data Dw, the opponent object data Dx, and the item position data Dy, etc., and displaying the display image on the display unit 35.

Next, the control unit 31 determines whether or not to end the race (step S113). A condition under which a race is ended is, for example, that a condition for ending the race is satisfied, that an operation for ending a race has been performed by the user, etc. If the control unit 31 continues the race, the control unit 31 returns to and repeats step S105. If the control unit 31 ends the race, the control unit 31 proceeds to step S114.

In step S114, the control unit 31 performs a communication process, and proceeds to the next step. For example, the control unit 31 transmits transmission data (e.g., data indicating results of game processes such as the increase or decrease in the amounts of virtual money and in-game coins, and the result of a race) stored in the transmission data Db to the server 200 through the network 100. The control unit 31 also receives data from the server 200 through the network 100, and updates the reception data Dc using the received data.

Next, the control unit 31 determines whether or not to perform a purchase process (step S115). For example, if the operation data obtained in step S103 indicates that the user is going to perform purchase, or if a condition for performing purchase is satisfied, the result of the determination by the control unit 31 in step S115 is positive. If the control unit 31 determines to perform the purchase process, the control unit 31 proceeds to step S116. Otherwise, i.e., if the control unit 31 determines not to perform the purchase process, the control unit 31 proceeds to step S117.

In step S116, the control unit 31 performs the purchase process, and proceeds to step S117. The purchase process performed in step S116 will now be described with reference to FIG. 24.

In FIG. 24, the control unit 31 performs a communication process (step S190), and proceeds to the next step. For example, the control unit 31 transmits transmission data (e.g., data for user authentication (e.g., data indicating a user ID)) stored in the transmission data Db to the server 200. The control unit 31 also receives data (e.g., data required for the purchase process, that is managed by the server 200, such as equipment purchasable at the current time, exchange rates, and the amounts of virtual money and in-game coins possessed by the user) from the server 200 through the network 100, and updates the reception data Dc using the received data.

Next, the control unit 31 obtains operation data from the input unit 34, updates the operation data Da (step S191), and proceeds to the next step.

Next, the control unit 31 performs a purchase process (step S192), and proceeds to the next step. For example, the control unit 31 displays a screen (see FIG. 18) for allowing the user to select equipment, in-game coins, virtual money, etc., to be purchased, based on the reception data received in step S190, and prompts the user to perform selection. If the operation data obtained in step S191 indicates the user's operation of determining to perform purchase, the control unit 31 puts the equipment, in-game coins, virtual money, etc., selected by the user into the user's possession, performs a process of reducing the consideration thereof from the user's possession, and updates the user possession data Dd.

Next, the control unit 31 determines whether or not to end the purchase process (step S193). For example, if the operation data obtained in step S191 indicates that the user is going to end the purchase process, or if a condition for ending the purchase process is satisfied, the result of the determination by the control unit 31 in step S193 is positive. If the control unit 31 ends the purchase process, the control unit 31 proceeds to step S194. Otherwise, i.e., if the control unit 31 continues the purchase process, the control unit 31 proceeds to step S191.

In step S194, the control unit 31 performs a communication process, and ends the process of the subroutine. For example, the control unit 31 transmits transmission data (e.g., data indicating what has been purchased in the purchase process of step S193) stored on the transmission data Db to the server 200 through the network 100. The control unit 31 also receives data from the server 200 through the network 100, and updates the reception data Dc using the received data.

Referring back to FIG. 20, in step S117, the control unit 31 determines whether or not to end the game process. A condition under which the game process is ended is, for example, that a condition for ending the game process is satisfied, that an operation for ending the game process has been performed by the user, etc. If the control unit 31 continues the game process, the control unit 31 returns to and repeats step S102. If the control unit 31 ends the game process, the control unit 31 ends the process of the flowchart.

Thus, in the information processing system 1 that performs the above game process, the single input unit 34

(touch panel) can be used to perform the operation of controlling the movement direction of the player object PO, and control the action of a virtual object (an item I) different from the player object PO, and therefore, a variety of processes involved with the user's operations can be performed. In addition, in the information processing system 1 that performs the above game process, a new in-game effect (the win of the "fever state") is caused by a combination of game items possessed in the possession frames HF, and therefore, the amusingness of dealing with game items possessed by the user can be enhanced. Furthermore, in the information processing system 1 that performs the above game process, the item lottery triggered by selection and execution of the item lottery icon AB can be performed using an item (e.g., virtual money, in-game coins, etc.) that can be acquired by consideration or payment used in a game, and therefore, the user's motivation to acquire the consideration or item can be enhanced.

Note that the above game process using the information processing system 1 includes the communication process between the information processing apparatus 3 and the server 200. Alternatively, the information processing apparatus 3 may perform the game process alone without connecting to the server 200. In particular, a racing game in which the user operates the player object PO can be executed without through the server 200, and therefore, can be carried out by an internal process of the information processing apparatus 3. In addition, even in a racing game in which a plurality of information processing apparatuses 3 participate, the game process may be carried out by communication between the information processing apparatuses 3 or between the information processing apparatuses 3 and other apparatuses without through the server 200. A portion of the process of performing a racing game according to the user's operation of the player object PO may be executed by the server 200. As a result, processes in a plurality of information processing apparatuses 3 can be managed by the server 200 in a centralized fashion.

In the foregoing, the information process and the communication process are performed in the information processing apparatus 3. Alternatively, at least a portion of the steps in the processes may be performed in another apparatus. For example, steps in the processes may be executed in cooperation with the server 200 or another apparatus (e.g., another server, another game apparatus, or another mobile terminal) that can communicate with the information processing apparatus 3. Thus, processes similar to the above processes can be performed by the server 200 or another apparatus performing a portion of the steps of the processes. The above processes may be executed by a single processor or a plurality of cooperating processors included in an information processing system including at least one information processing apparatus. In the above non-limiting example, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above variation, this non-limiting example can be implanted in a so-called cloud computing system form or distributed wide-area and local-area network system forms. For example, in a distributed local-area network system, the above processes can be executed by cooperation between a stationary information processing apparatus (stationary game apparatus) and a mobile information processing apparatus (handheld game apparatus). Note that, in these system forms, each of the above steps may be performed by any suitable one of the apparatuses, and this non-limiting example may be implemented by assigning the steps to the apparatuses in any suitable manner.

The order of steps, setting values, conditions for determination, etc., used in the above information process are merely for illustrative purposes, and other order of steps, setting values, conditions for determination, etc., may be used to implement this non-limiting example.

The above information processing program may be supplied to the information processing apparatus 3 not only through an external storage medium, such as an external memory, but also through a wired or wireless communication line. The program may be previously stored in a non-volatile storage device in the information processing apparatus 3. Examples of an information storage medium storing the program may include non-volatile memories, and in addition, CD-ROMs, DVDs, optical disk-shaped storage media similar thereto, and flexible disks, hard disks, magneto-optical disks, magnetic tapes, etc. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertain. If there is any inconsistency or conflict, the present specification (including the definitions) shall prevail.

As described above, this non-limiting example is useful for, for example, information processing programs, information processing apparatuses, information processing systems, and information processing methods, etc., for the purpose of improving, for example, the versatility of processes with respect to a user's operation using a single operational user interface.

What is claimed is:

1. A non-transitory computer-readable storage medium having stored therein an information processing program for use with a computer included in an apparatus for performing a process based on a user's operation, wherein the program comprises instructions that are configured to cause the computer to perform operations comprising:

executing a video game that includes at least moving a moving object in a moving direction within a virtual game space;

processing a first input operation that has been provided, via an input device, by the user, the first input operation including multiple coordinate inputs;

adjusting the moving direction of the moving object to a new direction by using a component in a first axial direction of a coordinate change of the first input operation that has been continuously performed, wherein the coordinate change is with reference to a first reference coordinate point that is based on at least one of the coordinate inputs of the first input operation;

determining a direction of a game operation based on a component in a second axial direction of the first input operation that has been continuously performed, wherein the direction of the game operation that is determined is different from the moving direction in which the moving object is moving;

executing the game operation in the determined direction within the virtual space, wherein the game operation includes moving another virtual object in the determined direction and away from where the moving object is located within the virtual space;

processing a second input operation that has been provided, via the input device, by the user, wherein the second input operation does not include a coordinate change; and based on second input operation, causing the determined direction to be set to a default direction in which the another virtual object will be moved through the virtual game space.

2. The non-transitory computer-readable storage medium of claim 1, wherein the second input operation is a tap operation.

3. The non-transitory computer-readable storage medium of claim 1, wherein the first input operation is a swipe or drag operation.

4. The non-transitory computer-readable storage medium of claim 1, wherein each of the first input operation and the second input operation include at least one coordinate input of a touch input device.

5. The non-transitory computer-readable storage medium of claim 1, wherein the operations further include:
determining that a coordinate change of the first input operation with reference to a second reference coordinate point is greater than or equal to a reference value; and
setting the reference value based on whether the direction of the coordinate change, with reference to the second reference coordinate point, is a positive direction or a negative direction in the second axial direction.

6. The non-transitory computer-readable storage medium of claim 5, wherein a coordinate point on a path that is based on received coordinate inputs of the first input operation is used as the second reference coordinate point.

7. The non-transitory computer-readable storage medium of claim 6, wherein the second reference coordinate point is moved on the path toward a more recent one of the coordinate inputs during continuation of the first input operation.

8. The non-transitory computer-readable storage medium of claim 6, wherein as the second reference coordinate point is a starting coordinate input of the first input operation.

9. The non-transitory computer-readable storage medium of claim 1, wherein the operations further include:
changing the first axial direction depending on a direction of the moving object.

10. The non-transitory computer-readable storage medium of claim 1, wherein when the first axial direction component of the coordinate change of the first input operation, with reference to the first reference coordinate point, is greater than or equal to a threshold, the reference value is changed in comparison to when the first axial direction component is smaller than the threshold.

11. The non-transitory computer-readable storage medium of claim 1, wherein the operations further comprise:
setting an angle condition based on the moving direction of the moving object; and
determining a coordinate change direction of the first input operation satisfies the angle condition.

12. The non-transitory computer-readable storage medium of claim 11, wherein execution of the game operation is further based on the determination that the coordinate change direction satisfies the angle condition.

13. The non-transitory computer-readable storage medium of claim 1, wherein the operations further comprise:
determining a rate of change for the first input operation, wherein determination of the direction of the game operation is further based on the determination that the rate of change is higher than or equal to a threshold.

14. The non-transitory computer-readable storage medium of claim 1, wherein the first axial direction is a leftward and a rightward direction as viewed from the user, and
the second axial direction is an upward and a downward direction as viewed from the user.

15. The non-transitory computer-readable storage medium of claim 1, wherein the moving object is moved irrespective of whether or not a user input operation is provided.

16. The non-transitory computer-readable storage medium of claim 1, wherein a movement speed of the another virtual object is set based on an input speed of the first input operation with reference to a reference coordinate point.

17. An information processing apparatus comprising:
a processing system comprising computer executable instructions that, when executed by at least one hardware processor of the processing system, cause the at least one hardware processor to perform operations comprising:
executing a video game that includes at least moving a moving object in a moving direction within a virtual game space;
processing a first input operation that has been provided, via an input device, by a user, the first input operation including multiple coordinate inputs;
adjusting the moving direction of the moving object to a new direction by using a component in a first axial direction of a coordinate change of the first input operation that has been continuously performed, wherein the coordinate change is with reference to a first reference coordinate point that is based on at least one of the coordinate inputs of the first input operation;
determining a direction of a game operation based on a component in a second axial direction of the first input operation that has been continuously performed, wherein the direction of the game operation that is determined is different from the moving direction in which the moving object is moving;
executing the game operation in the determined direction within the virtual space, wherein the game operation includes moving another virtual object in the determined direction and away from where the moving object is located within the virtual space;

processing a second input operation that has been provided, via the input device, by the user, wherein the second input operation does not include a coordinate change; and based on second input operation, causing the determined direction to be set to a default direction in which the another virtual object will be moved through the virtual game space.

18. A method comprising:

executing a video game that includes at least moving a moving object in a moving direction within a virtual game space;

processing a first input operation that has been provided, via an input device, by a user, the first input operation including multiple coordinate inputs;

adjusting the moving direction of the moving object to a new direction by using a component in a first axial direction of a coordinate change of the first input operation that has been continuously performed, wherein the coordinate change is with reference to a first reference coordinate point that is based on at least one of the coordinate inputs of the first input operation;

determining a direction of a game operation based on a component in a second axial direction of the first input operation that has been continuously performed, wherein the direction of the game operation that is determined is different from the moving direction in which the moving object is moving;

executing the game operation in the determined direction within the virtual space, wherein the game operation includes moving another virtual object in the determined direction and away from where the moving object is located within the virtual space;

processing a second input operation that has been provided, via the input device, by the user, wherein the second input operation does not include a coordinate change; and based on second input operation, causing the determined direction to be set to a default direction in which the another virtual object will be moved through the virtual game space.

* * * * *